(12) United States Patent
Prather et al.

(10) Patent No.: US 11,787,900 B2
(45) Date of Patent: Oct. 17, 2023

(54) BIODEGRADABLE SUSTAINABLE POLYESTERS

(71) Applicant: Massachusetts Institute of Technology, Cambridge, MA (US)

(72) Inventors: Kristala L. Jones Prather, Cambridge, MA (US); Desiree Plata, Cambridge, MA (US); Bradley D. Olsen, Cambridge, MA (US); Wontae Joo, Cambridge, MA (US); Sarah Av-Ron, Cambridge, MA (US); K'yal Rasean Bannister, Cambridge, MA (US); Omar Tantawi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/983,206

(22) Filed: Nov. 8, 2022

(65) Prior Publication Data

US 2023/0151142 A1    May 18, 2023

Related U.S. Application Data

(60) Provisional application No. 63/276,680, filed on Nov. 8, 2021.

(51) Int. Cl.
*C08G 63/06* (2006.01)

(52) U.S. Cl.
CPC .................................. *C08G 63/06* (2013.01)

(58) Field of Classification Search
USPC ........................................................ 528/361
See application file for complete search history.

(56) References Cited

U.S. PATENT DOCUMENTS

| | | |
|---|---|---|
| 2,831,832 A | 4/1958 | Caldwell |
| 2008/0293845 A1 | 11/2008 | Xie |
| 2011/0003919 A1 | 1/2011 | Yamanaka et al. |
| 2013/0065046 A1 | 3/2013 | Krishnaswamy |

FOREIGN PATENT DOCUMENTS

| | | | |
|---|---|---|---|
| EP | 4059979 A1 * | 9/2022 | |
| KR | 10-1411009 B1 | 6/2014 | |

* cited by examiner

*Primary Examiner* — Terressa Boykin
(74) *Attorney, Agent, or Firm* — Foley Hoag LLP; Dana M. Gordon; Alexander J. Chatterley

(57) ABSTRACT

Disclosed is a copolymer comprising a hydroxyacid, wherein the copolymer is biodegradable with a decomposition temperature is substantially higher than its melting temperature. Also disclosed is a method of synthesis of a poly(pivalolactone-co-caprolactone) copolymer.

20 Claims, 31 Drawing Sheets

BIODEGRADABLE SUSTAINABLE POLYESTERS

RELATED APPLICATIONS

This application claims the benefit of priority to U.S. Provisional Patent Application No. 63/276,680, filed Nov. 8, 2021.

BACKGROUND

Estimates are that approximately 5.25 trillion macro and micro pieces of plastics are in the ocean. Due to systematic failures, or complete lack of waste management in some nations, approximately 57% of all plastics produced since 1950 has accumulated in the environment, including landfills and oceans. Indeed, all industrial chemicals and materials have some release to the environment, and without implicit degradation that exceeds the rate of input, accumulation will occur. Despite the importance of the challenge, current understanding of the fate of polymeric materials in the marine environment is not sufficiently well established to inform design-for-environment rules. This is due to a limited capacity to accurately simulate natural systems in lab experiments, the complexity of natural environments, and a lack of systematic data collection that can relate fundamental physicochemical properties to environmental degradation rate.

Polymers from renewable feed stocks have attracted significant attention in recent decades due to environmental issues and the recognition of limited petroleum resources. One of the most popular biopolymers, polylactide (PLA), is a thermoplastic aliphatic polyester derived from renewable resources. It is widely used thanks to its low glass transition temperature ($T_g$), which makes it easy to process and it is also bio-compatible and biodegradable at certain conditions. PLA finds its use as a feedstock material for 3D printing, medical implants, packaging materials, drug carriers and so on. Thanks to the discovery of ring-opening polymerization of lactide as a cyclic monomer, chemists now can more easily access high molecular weight PLA products. Another good example of biopolymers is polyhydroxyalkanoate (PHA). PHAs are produced in nature by various microorganisms, and more than 150 different monomers can be combined within this family to give materials with different properties. PHAs are renewable because their synthesis involves biological conversion of sugars or other biomass derived feed stocks to a polymer, and they are biodegradable because native producers can also depolymerize and metabolize PHA back to raw biomass. However, PHAs are not perfect materials. They fall behind in some criteria, for example, PLA does not biodegrade in soil or in sea water, and it is not stable enough at high temperature, which limits its use in high performance application. Poly-3-hydroxybutyrate (P3HB), probably the most common type of PHA, addresses some of the issues, like biodegradability in soil or in sea water, and has an improved mechanical property, but still suffers from thermal instability. It decomposes over 160° C. by producing crotonic acid derivatives and this is the major hurdle that limits it thermal stability.

Therefore, there is an unmet demand for a biodegradable polymer platform that is not only derived from bio-sources but also has robust mechanical properties with good thermal stability.

SUMMARY OF THE INVENTION

In one aspect, the present disclosure provides copolymers comprising a plurality of repeat units derived from two or more hydroxy acid(s).

In another aspect, the present disclosure provides methods of synthesizing the copolymers disclosed herein comprising: contacting a first hydroxy acid with a second hydroxy acid, thereby forming a mixture of two acids; and contacting the mixture of two acids with a polymerization initiator, thereby forming a copolymer disclosed herein.

BRIEF DESCRIPTION OF THE DRAWINGS

In FIG. 29A, PET is poly(ethylene) terephthalate; PP is polypropylene; PS is polystyrene; LDPE is low density polyethylene; PHA is Polyhydroxyalkanoate straw fragment; MA is malodexterin: acrylic acid polymer; TR is tire rubber; P3HB is Poly(3-Hydroxybutyrate); NPLA is Nature Works PLA. In FIG. 29B, polymers of variable hydroxypivalic acid (3HP) and hexanoic acid (6HA) loading were prepared, and the shorthand P(3HP$_x$-6HA$_y$) indicates the relative proportions (by mass) of 3HP (given by x) and 6HA (given by y) in a series of poly[(hydroxypivalic acid)-r-(hexanoic acid)]; circles symbolize these polymers, where the gradient corresponds to increasing proportions of 6HA. Squares indicate pure 3HP and pure 6HA. A 1:1 relationship is shown by the solid dark line. Error bars represent standard deviation on triplicate measures.

In FIGS. 31A and 31B, bioavailability is defined as the percent of carbon from the original test material that was consumed by marine microorganisms for biomass/uptake and energy production ($CO_2$). In FIGS. 31C and 31D, bioavailability is defined as the percent of carbon from the original test material that was converted to $CO_2$. In FIGS. 31A and 31C, PET is poly(ethylene) terephthalate; PP is polypropylene; PS is polystyrene; LDPE is low density polyethylene; PHA is Polyhydroxyalkanoate straw fragment; MA is malodexterin: acrylic acid polymer; TR is tire rubber; P3HB is Poly(3-Hydroxybutyrate); NPLA is Nature Works PLA. In FIGS. 31B and 31D, polymers of variable hydroxypivalic acid (3HP) and hexanoic acid (6HA) loading were prepared, and the shorthand P(3HPx-6HAy) indicates the relative proportions (by mass) of 3HP (given by x) and 6HA (given by y) in a series of poly[(hydroxypivalic acid)-r-(hexanoic acid)]. Error bars represent standard deviation on triplicate measures.

In FIG. 32A, PET is poly(ethylene) terephthalate; PP is polypropylene; PS is polystyrene; LDPE is low density polyethylene; PHA is Polyhydroxyalkanoate straw fragment; MA is malodexterin: acrylic acid polymer; TR is tire rubber; P3HB is Poly(3-Hydroxybutyrate); NPLA is Nature Works PLA. In FIG. 32B, polymers of variable hydroxypivalic acid (3HP) and hexanoic acid (6HA) loading were prepared, and the shorthand P(3HP$_x$-6HA$_y$) indicates the relative proportions (by mass) of 3HP (given by x) and 6HA (given by y) in a series of poly[(hydroxypivalic acid)-r-(hexanoic acid)]. Circles symbolize these polymers, where the gradient corresponds to increasing proportions of 6HA. Squares indicate pure 3HP and pure 6HA. Error bars represent standard deviation on triplicate measures.

DETAILED DESCRIPTION OF THE INVENTION

Figure 1:
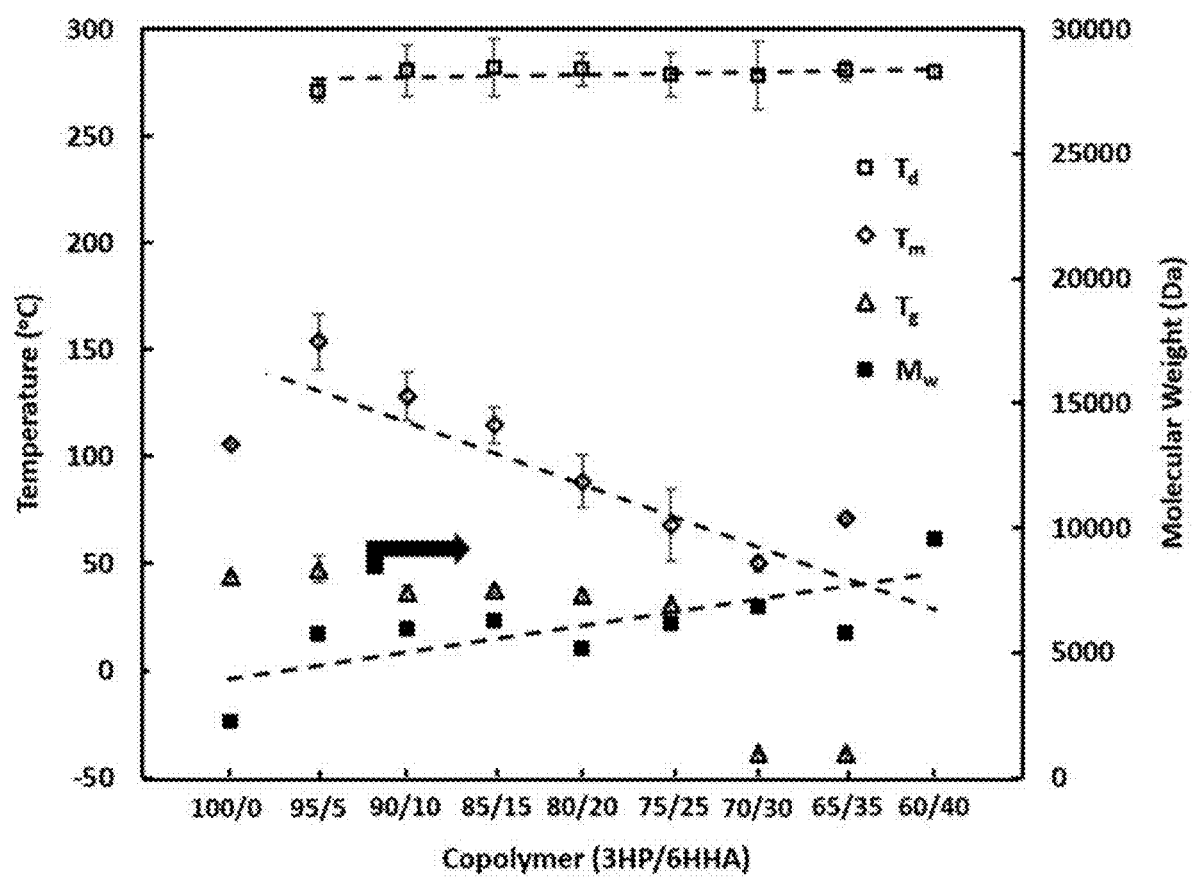
FIG. 1 shows the characterization of poly[3HP$_x$-co-6HA$_y$] showing molecular weight, decomposition temperature, melting temperature, and glass transition temperature of poly[3HP$_x$-co-6HA$_y$] as a function of co-monomer feed ratio.

One of the greatest challenges facing the world today is accumulation of plastic waste in the environment. It has become essential to discover and develop new biodegradable and biomass-based polymer platforms with suitable performance to meet societal needs, reduce environmental accumulation, and reduce the greenhouse impact of plastic use. Herein, the development of a new polyester based on 3-hydroxypivalic acid (3HP), a monomer that can be produced by biological machinery, is disclosed. Although efforts to synthesize high molecular weight P[3HP] were challenging due to its high crystallinity, exemplary copolymers of 3-hydroxypivalic acid and 6-hydroxyhexanoic acid yielded modest molecular weights and good thermal properties, and the thermal processing window was systematically widened by tuning the copolymer composition. The copolymers exhibited good stability against thermal degradation, and this was attributed to the high thermal stability of 3-hydroxypivalic acid, which does not have thermally labile α-hydrogens. Total organic carbon (TOC) analysis after photo-weathering suggested initial hydrolysis of the copolymer in the marine environment. A separate biodegradation assay using a soil bacterium, Paucimonas lemoignei, indicated successful yet slow degradation that depended on copolymer composition. The results from biological discovery, chemical synthesis and environmental degradation screenings indicated that polyesters made from 3HP copolymers could meet the need for polymers with enhanced thermal stability and improved sustainability.

In one aspect, the present disclosure provides copolymers comprising a plurality of repeat units derived from two or more hydroxy acid(s).

In certain embodiments the repeat units are derived from two distinct hydroxy acids. In certain embodiments, the repeat units are derived from three distinct hydroxy acids. In certain embodiments, the repeat units are derived from four distinct hydroxy acids. In certain embodiments, the repeat units are derived from five distinct hydroxy acids. In certain embodiments, the repeat units are derived from six distinct hydroxy acids. In certain embodiments, the hydroxy acids are naturally occurring.

In certain embodiments, the copolymer further comprises a plurality of repeat units derived from a non-hydroxy acid (e.g., caprolactone or pivalolactone).

In certain embodiments, the copolymer consists essentially of a plurality of repeat units derived from two or more hydroxyl acid(s). In certain embodiments, the copolymer consists of a plurality of repeat units derived from two or more hydroxy acid(s).

In certain embodiments, copolymer comprises a plurality of repeat units derived from a first hydroxyl acid and a second hydroxy acid. In certain embodiments, the copolymer consists essentially of a plurality of repeat units derived from a first hydroxyl acid and a second hydroxy acid. In certain embodiments, the copolymer consists of a plurality of repeat units derived from a first hydroxyl acid and a second hydroxy acid.

In certain embodiments, the ratio of the first hydroxy acid to second hydroxy acid is about 90:10, about 80:20, about 70:30, about 60:40, about 50:50, about 40:60, about 30:70, about 20:80, or about 10:90. In certain embodiments, the ratio of the first hydroxy acid to second hydroxy acid is about 95:5, 90:10, 85:15, 80:20, 75:25, 70:30, about 65:35, or about 60:40. In certain embodiments, the ratio of the first hydroxy acid to second hydroxy acid is about 95:5, 90:10, 85:15, 80:20, or 85:25.

In certain embodiments, the polymer comprises 25-500 repeat units. In certain embodiments, the polymer comprises 25-250 repeat units. In certain embodiments, the polymer comprises 75-125 repeat units. In certain embodiments, the polymer comprises about 50, about 60, about 70, about 80, about 90, about 100 repeat units. In certain embodiments, the polymer comprises about 100 repeat units.

In certain embodiments, the hydroxy acid(s) are selected from the group consist of 2-hydroxybutanedioic acid, 2-hydroxypropanoic acid, 2-hydroxybutanoic acid, 2-hydroxy-3-methylbutanoic acid, 2-hydroxypentanoic acid, 2-hydroxy-3-methylpentanoic acid, 2-hydroxy-4-methylpentanoic acid, 2-hydroxyacetic acid, 2,3-dihydroxybutanoic acid, 2,4-dihydroxybutanoic acid, 2,3-dihydroxypropanoic acid, 2-hydroxyhexanoic acid, 2-hydroxydecanoic acid, 2-hydroxydodecanoic acid, 2-hydroxytetradecanoic acid, 2-hydroxyhexadecanoic acid, (2R)-2-hydroxypentanedioic acid, 2-hydroxyhexanedioic acid, (2E,4Z)-2-hydroxyhexa-2,4-dienedioic acid, (2R)-2-hydroxyoctadecanoic acid, 2-amino-3-hydroxy-2-(hydroxymethyl)propanoic acid, (2S)-2-ethyl-2-hydroxy-3-oxobutanoic acid, (2S)-2-hydroxy-2-methyl-3-oxobutanoic acid, (2E,4Z)-2-hydroxyhexa-2,4-dienoic acid, 3-hydroxypropanoic acid, 3-hydroxybutyric acid, 3-Hydroxypentanoic acid, 3-hydroxyhexanoic acid, 3-hydroxyheptanoic acid, 3-hydroxyoctanoic acid, 3-hydroxynonanoic acid, 3-hydroxydecanoic acid, 3-hydroxyundecanoic acid, 3-hydroxydodecanoic acid, 3-hydroxytetradecanoic acid, 3-hydroxyhexadecanoic acid, 3-hydroxy-4-pentenoic acid, 3-hydroxyhex-4-enoic acid, 3-hydroxy-5-hexenoic acid, 3-hydroxy-6-octenoic acid, 3-hydroxy-7-octenoic acid, 3-hydroxy-8-nonenoic acid, 3-hydroxy-9-decenoic acid, 3-hydroxy-5-dodecenoic acid, 3-hydroxy-6-dodecenoic acid, 3-hydroxy-5-cis-tetradecanoic acid, 3-hydroxy-7-cis-tetradecanoic acid, 3-hydroxy-5,8-cis,cis-tetradecenoic acid, 3-hydroxy-4-methylpentanoic acid, 3-hydroxy-4-methylhexanoic acid, 3-hydroxy-5-methylhexanoic acid, 3-hydroxy-6-methylheptanoic acid, 3-hydroxy-4-methyloctanoic acid, 3-hydroxy-5-methyloctanoic acid, 3-hydroxy-6-methyloctanoic acid, 3-hydroxy-7-methyloctanoic acid, 3-hydroxy-6-methylnonanoic acid, 3-hydroxy-7-methylnonanoic acid, 3-hydroxy-8-methylnonanoic acid, 3-hydroxy-7-methyldecanoic acid, 3-hydroxy-9-methyldecanoic acid, 3-hydroxy-7-methyl-6-octenoic acid, 3-hydroxy-4-methoxy-4-oxobutanoic acid, 3-hydroxy-6-methoxy-6-oxohexanoic acid, 3-Hydroxy-8-methoxy-8-oxooctanoic acid, 3-hydroxy-10-methoxy-10-oxodecanoic acid, 8-ethoxy-3-hydroxy-8-oxooctanoic acid, 10-ethoxy-3-hydroxy-10-oxodecanoic acid, 3-hydroxy-7-oxo-7-propoxyheptanoic acid, 8-acetoxy-3-hydroxyoctanoic acid, 9-acetoxy-3-hydroxynonanoic acid, 3,12-dihydroxydodecanoic acid, 3,8-dihydroxy-5-cis-tetradecenoic acid, 3-hydroxy-2-methylbutanoic acid, 3-hydroxy-2-methylvaleric acid, 3-hydroxy-2,6-dimethylhept-5-enoic acid, 3-hydroxybut-2-enoic acid, 3,4-dihydroxybutanoic acid, 3,6-dihydroxydodecanoic acid, 3-hydroxy-2,2-dimethylpropanoic acid, 3-hydroxy-7-oxooctanoic acid, 3-hydroxy-5-oxohexanoic acid, 6-acetoxy-3-hydroxyhexanoic acid, 4-acetoxy-3-hydroxybutyric acid, 3-hydroxyoctadecanoic acid, 3-hydroxy-5-methylheptanoic acid, 3-hydroxy-5-methylnonanoic acid, 3-hydroxy-methylpropionic acid, 3-hydroxy-5-methylundecanoic acid, 3-hydroxy-6-methylundecanoic acid, 3-hydroxy-7-methylundecanoic acid, 3-hydroxy-8-methylundecanoic acid, 3-hydroxy-9-methylundecanoic acid, 3-hydroxy-10-methylundecanoic acid, 3-hydroxy-5-methyltridecanoic acid, 3-hydroxy-6-methyltridecanoic acid, 3-hydroxy-7-methyltridecanoic acid, 3-hydroxy-8-methyltridecanoic acid, 3-hydroxy-9-methyltridecanoic acid, 3-hydroxy-10-methyltridecanoic acid, 3-hydroxy-11-methyltridecanoic acid, 3-hydroxy-2-oxopropanoic acid, 3-hydroxy-3-methyl-2-oxobutanoic acid, (R)-3-hydroxy-3-methyl-2-oxopentanoic acid, 5-hydroxypentanoic acid, 6-hydroxydodecanoic acid, 6-hydroxy-3-dodecenoic acid, 7-hydroxyheptanoic acid, 6-hydroxyhexanoic acid, and 5-hydroxy-2,4-dioxopentanoic acid; or a combination of any of the foregoing.

In certain embodiments, the hydroxy acid(s) are selected from 3-hydroxypivalic acid and 6-hydroxy hexanoic acid. In certain embodiments, at least one hydroxy acid is 3-hydroxypivalic acid. In certain embodiments, at least one hydroxy acid is 6-hydroxy hexanoic acid.

In certain embodiments, the copolymer comprises poly[3HP$_x$-co-6HA$_y$], wherein x and y are each independently 1-10,000. In certain embodiments, the copolymer is poly[3HP$_x$-co-6HA$_y$], wherein x and y are each independently 1-10,000.

In certain embodiments, x is about 25, about 50, about 75, about 100, about 200, about 300, about 400, or about 500.

In certain embodiments, y is about 25, about 50, about 75, about 100, about 200, about 300, about 400, or about 500.

In certain embodiments, the ratio of 3HP to 6HA is 95:5, 10:90, 15:85, 20:80, 25:75, or 30:70.

In certain embodiments, the content of 6HA in the copolymer does not exceed 15 w/w %.

In certain embodiments, the content of 6HA in the copolymer does not exceed 20 w/w %.

In certain embodiments, the content of 6HA in the copolymer does not exceed 25 w/w %.

In certain embodiments, the content of 6HA in the copolymer does not exceed 30 w/w %.

In certain embodiments, the molecular weight of the copolymer is about 500 to about 100,000 Daltons. In certain embodiments, the molecular weight of the copolymer is about 500 to about 10,000 Daltons. In certain embodiments, the molecular weight of the copolymer is 2,000 to 10,000 Daltons. In certain embodiments, the molecular weight of the copolymer is about 1,000, about 2,000, about 3,000, about 4,000, about 5,000, about 6,000, about 7,000, about 8,000, about, 9,000, or about 10,000 Daltons. In certain embodiments, the molecular weight of the copolymer is about 5,000, about 6,000, about 7,000, about 8,000, or about 9000 Daltons.

In certain embodiments, the decomposition temperature of the copolymer is above about 230° C. In certain embodiments, the decomposition temperature of the copolymer is above about 250° C. In certain embodiments, the decomposition temperature of the copolymer is about 280° C.

In certain embodiments, the melting point of the copolymer is above about 40° C., above about 60° C., above about 80° C., above about a 100° C., above about 120° C., or above about 150° C.

In certain embodiments, the melting point of the copolymer is about 40° C., about 60° C., about 80° C., about 100° C., about 120° C., or about 150° C. In certain embodiments, the melting point of the copolymer is about 50° C., about 70° C., about 90° C., about 105° C., about 115° C., about 130° C., or about 150° C., or about 175° C.

In certain embodiments, the glass transition point of the copolymer is above about −40° C., above about −20° C., above about 0° C., above about a 20° C., above about 120° C., or above about 40° C. In certain embodiments, the glass transition point of the copolymer is about −40° C. In certain embodiments, the glass transition point of the copolymer is about 30° C. or about 40° C.

In certain embodiments, the crystallization temperature of the copolymer is above about 50° C., above about 70° C., above about 90° C., above about 110° C. or above about 130° C. In certain embodiments, the crystallization temperature of the copolymer is about 50°, about 75° C., about 95° C., about 120° C., 130° C., or about 140° C.

In certain embodiments, the crystallinity of the copolymer is about 10%, about 20%, about 30%, about 40%, about 50%, about 60%, about 70%, or about 80%. In certain embodiments, the crystallinity of the copolymer is about 75% or about 65%. In certain embodiments, the crystallinity of the copolymer is less than 20%. In certain embodiments, the crystallinity of the copolymer is less than 10%. In certain embodiments, the crystallinity of the copolymer is about 20%. In certain embodiments, the crystallinity of the copolymer is about 10%. In certain embodiments, the crystallinity of the copolymer is about 5%. In certain embodiments, the crystallinity of the copolymer is about 1%.

In certain embodiments, the copolymer comprises an amorphous region. In certain embodiments, the copolymer comprises a crystalline region.

In certain embodiments, the copolymer is a sol-like elastomer.

In certain embodiments, the copolymer is biodegradable.

In certain embodiments, the copolymer is biodegradable as measured by incubation with *Paucimonas lemoignei*.

In certain embodiments, the copolymer is photodegradable.

In certain embodiments, the decomposition temperature of the copolymer is higher than the melting temperature of the copolymer temperature.

In certain embodiments, the decomposition temperature of the copolymer is substantially higher than the melting temperature of the copolymer temperature.

In certain embodiments, the copolymer is (P(3HP$_{85}$-6HA$_{15}$), P(3HP$_{75}$-6HA$_{25}$), P(3HP$_{70}$-6HA$_{30}$), P(3HP$_{65}$-6HA$_{35}$), P(3HP$_{60}$-6HA$_{40}$) or P(3HP$_{00}$-6HA$_{100}$).

In certain embodiments, the copolymer is a block copolymer. In certain embodiments, the copolymer is a random or statistical copolymer.

One aspect of the disclosure is a copolymer comprising a bio-sourced hydroxyacid, wherein the copolymer is biodegradable, and wherein its decomposition temperature is substantially higher than its melting temperature. Preferably, the copolymer consists of a mixture polylactide (PLA) and polyhydroxyalkanoate (PHA) or a poly(pivalolactone-co-caprolactone). A particular embodiment of the copolymer is poly[3HP$_x$-co-6HA$_y$], wherein the x is less than 95; and y is greater than 5. In certain embodiments, the sum of x and y is 100.

In one embodiment the copolymer biodegradation is measured by incubation with *Paucimonas lemoignei*.

In another embodiment the ratio of 6HA/3HP of the copolymer is less than 85/15.

In another embodiment, the copolymer comprises greater than 25% 6HA.

In another embodiment, the copolymer is a sol-like elastomer with a melting temperature below 71° C.

In another embodiment, the molecular weight of the copolymer is about 6,000 Da.

In another embodiment, the glass transition temperature is less than 30° C.

In another embodiment, the copolymer is thermally stable at 180° C. for at least one hour.

In another aspect, a biodegradable copolymer is synthesized by copolymerization of 3-hydroxypivalic acid (3HP) and 6-hydroxy hexanoic acid (6HA), with a 6HA feed ratio greater than 10 wt %. In a certain embodiments, the composition is synthesized with the feed ratio of 6HA is higher than 30 wt %. In certain embodiments, the synthesis is in the presence of phosphoric acid.

In another aspect, the present disclosure provides methods of synthesizing the copolymers disclosed herein comprising:
contacting a first hydroxy acid with a second hydroxy acid, thereby forming a mixture of two acids; and
contacting the mixture of two acids with a polymerization initiator, thereby forming a copolymer disclosed herein.

In certain embodiments, the polymerization initiator is an acid. In certain embodiments, the polymerization initiator is a mineral acid. In certain embodiments, the polymerization initiator is phosphoric acid.

In certain embodiments, the feed ratio of the second hydroxy acid is greater than 10 wt %. In certain embodiments, the feed ratio of the second hydroxy acid is greater than 30 wt %.

In certain embodiments, the method further comprises contacting the mixture of two acids with one or more additional hydroxy acids.

In certain embodiments, comprising contacting the mixture of two acids with one or more non-hydroxy acids (e.g., caprolactone or pivalolactone).

Definitions

Unless otherwise defined herein, scientific and technical terms used in this application shall have the meanings that are commonly understood by those of ordinary skill in the art. Generally, nomenclature used in connection with, and techniques of, chemistry, cell and tissue culture, molecular biology, cell and cancer biology, neurobiology, neurochemistry, virology, immunology, microbiology, pharmacology, genetics and protein and nucleic acid chemistry, described herein, are those well known and commonly used in the art.

The methods and techniques of the present disclosure are generally performed, unless otherwise indicated, according to conventional methods well known in the art and as described in various general and more specific references that are cited and discussed throughout this specification. See, e.g. Motulsky, "Intuitive Biostatistics", Oxford University Press, Inc. (1995); Lodish et al., "Molecular Cell Biology, 4th ed.", W. H. Freeman & Co., New York (2000); Griffiths et al., "Introduction to Genetic Analysis, 7th ed.", W. H. Freeman & Co., N. Y. (1999); and Gilbert et al., "Developmental Biology, 6th ed.", Sinauer Associates, Inc., Sunderland, MA (2000).

Chemistry terms used herein, unless otherwise defined herein, are used according to conventional usage in the art, as exemplified by "The McGraw-Hill Dictionary of Chemical Terms", Parker S., Ed., McGraw-Hill, San Francisco, C. A. (1985).

All of the above, and any other publications, patents and published patent applications referred to in this application are specifically incorporated by reference herein. In case of conflict, the present specification, including its specific definitions, will control.

As used herein, the terms "optional" or "optionally" mean that the subsequently described event or circumstance may occur or may not occur, and that the description includes instances where the event or circumstance occurs as well as instances in which it does not. For example, "optionally substituted alkyl" refers to the alkyl may be substituted as well as where the alkyl is not substituted.

It is understood that substituents and substitution patterns on the compounds of the present invention can be selected by one of ordinary skilled person in the art to result chemically stable compounds which can be readily synthesized by techniques known in the art, as well as those methods set forth below, from readily available starting materials. If a substituent is itself substituted with more than one group, it is understood that these multiple groups may be on the same carbon or on different carbons, so long as a stable structure results.

As used herein, the term "optionally substituted" refers to the replacement of one to six hydrogen radicals in a given structure with the radical of a specified substituent including, but not limited to: hydroxyl, hydroxyalkyl, alkoxy, halogen, alkyl, nitro, silyl, acyl, acyloxy, aryl, cycloalkyl, heterocyclyl, amino, aminoalkyl, cyano, haloalkyl, haloalkoxy, —OCO—$CH_2$—O-alkyl, —OP(O)(O-alkyl)$_2$ or —$CH_2$—OP(O)(O-alkyl)$_2$. Preferably, "optionally substituted" refers to the replacement of one to four hydrogen radicals in a given structure with the substituents mentioned above. More preferably, one to three hydrogen radicals are replaced by the substituents as mentioned above. It is understood that the substituent can be further substituted.

As used herein, the term "alkyl" refers to saturated aliphatic groups, including but not limited to $C_1$-$C_{10}$ straight-chain alkyl groups or $C_1$-$C_{10}$ branched-chain alkyl groups. Preferably, the "alkyl" group refers to $C_1$-$C_6$ straight-chain alkyl groups or $C_1$-$C_6$ branched-chain alkyl groups. Most preferably, the "alkyl" group refers to $C_1$-$C_4$ straight-chain alkyl groups or $C_1$-$C_4$ branched-chain alkyl groups. Examples of "alkyl" include, but are not limited to, methyl, ethyl, 1-propyl, 2-propyl, n-butyl, sec-butyl, tert-butyl, 1-pentyl, 2-pentyl, 3-pentyl, neo-pentyl, 1-hexyl, 2-hexyl, 3-hexyl, 1-heptyl, 2-heptyl, 3-heptyl, 4-heptyl, 1-octyl, 2-octyl, 3-octyl or 4-octyl and the like. The "alkyl" group may be optionally substituted.

The term "acyl" is art-recognized and refers to a group represented by the general formula hydrocarbylC(O)—, preferably alkylC(O)—.

The term "acylamino" is art-recognized and refers to an amino group substituted with an acyl group and may be represented, for example, by the formula hydrocarbylC(O)NH—.

The term "acyloxy" is art-recognized and refers to a group represented by the general formula hydrocarbylC(O)O—, preferably alkylC(O)O—.

The term "alkoxy" refers to an alkyl group having an oxygen attached thereto. Representative alkoxy groups include methoxy, ethoxy, propoxy, tert-butoxy and the like.

The term "alkoxyalkyl" refers to an alkyl group substituted with an alkoxy group and may be represented by the general formula alkyl-O-alkyl.

The term "alkyl" refers to saturated aliphatic groups, including straight-chain alkyl groups, branched-chain alkyl groups, cycloalkyl (alicyclic) groups, alkyl-substituted cycloalkyl groups, and cycloalkyl-substituted alkyl groups. In preferred embodiments, a straight chain or branched chain alkyl has 30 or fewer carbon atoms in its backbone (e.g., $C_{1-30}$ for straight chains, $C_{3-30}$ for branched chains), and more preferably 20 or fewer.

Moreover, the term "alkyl" as used throughout the specification, examples, and claims is intended to include both unsubstituted and substituted alkyl groups, the latter of which refers to alkyl moieties having substituents replacing a hydrogen on one or more carbons of the hydrocarbon backbone, including haloalkyl groups such as trifluoromethyl and 2,2,2-trifluoroethyl, etc.

The term "$C_{x-y}$" or "$C_x-C_y$", when used in conjunction with a chemical moiety, such as, acyl, acyloxy, alkyl, alkenyl, alkynyl, or alkoxy is meant to include groups that contain from x to y carbons in the chain. $C_0$alkyl indicates a hydrogen where the group is in a terminal position, a bond if internal. A $C_{1-6}$alkyl group, for example, contains from one to six carbon atoms in the chain.

The term "alkylamino", as used herein, refers to an amino group substituted with at least one alkyl group.

The term "alkylthio", as used herein, refers to a thiol group substituted with an alkyl group and may be represented by the general formula alkylS—.

The term "amido", as used herein, refers to a group

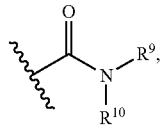

wherein $R^9$ and $R^{10}$ each independently represent a hydrogen or hydrocarbyl group, or $R^9$ and $R^{10}$ taken together with the N atom to which they are attached complete a heterocycle having from 4 to 8 atoms in the ring structure.

The terms "amine" and "amino" are art-recognized and refer to both unsubstituted and substituted amines and salts thereof, e.g., a moiety that can be represented by

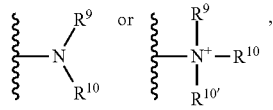

wherein $R^9$, $R^{10}$, and $R^{10'}$ each independently represent a hydrogen or a hydrocarbyl group, or $R^9$ and $R^{10}$ taken together with the N atom to which they are attached complete a heterocycle having from 4 to 8 atoms in the ring structure.

The term "aminoalkyl", as used herein, refers to an alkyl group substituted with an amino group.

The term "aralkyl", as used herein, refers to an alkyl group substituted with an aryl group.

The term "aryl" as used herein include substituted or unsubstituted single-ring aromatic groups in which each atom of the ring is carbon. Preferably the ring is a 5- to 7-membered ring, more preferably a 6-membered ring. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Aryl groups include benzene, naphthalene, phenanthrene, phenol, aniline, and the like.

The term "carbamate" is art-recognized and refers to a group

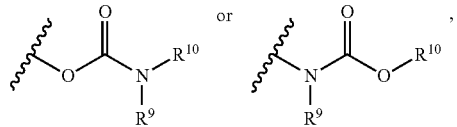

wherein $R^9$ and $R^{10}$ independently represent hydrogen or a hydrocarbyl group.

The term "carbocyclylalkyl", as used herein, refers to an alkyl group substituted with a carbocycle group.

The term "carbocycle" includes 5-7 membered monocyclic and 8-12 membered bicyclic rings. Each ring of a bicyclic carbocycle may be selected from saturated, unsaturated and aromatic rings. Carbocycle includes bicyclic molecules in which one, two or three or more atoms are shared between the two rings. The term "fused carbocycle" refers to a bicyclic carbocycle in which each of the rings shares two adjacent atoms with the other ring. Each ring of a fused carbocycle may be selected from saturated, unsaturated and aromatic rings. In an exemplary embodiment, an aromatic ring, e.g., phenyl, may be fused to a saturated or unsaturated ring, e.g., cyclohexane, cyclopentane, or cyclohexene. Any combination of saturated, unsaturated and aromatic bicyclic rings, as valence permits, is included in the definition of carbocyclic. Exemplary "carbocycles" include cyclopentane, cyclohexane, bicyclo[2.2.1]heptane, 1,5-cyclooctadiene, 1,2,3,4-tetrahydronaphthalene, bicyclo[4.2.0]oct-3-ene, naphthalene and adamantane. Exemplary fused carbocycles include decalin, naphthalene, 1,2,3,4-tetrahydronaphthalene, bicyclo[4.2.0]octane, 4,5,6,7-tetrahydro-1H-indene and bicyclo[4.1.0]hept-3-ene. "Carbocycles" may be substituted at any one or more positions capable of bearing a hydrogen atom.

The term "carbocyclylalkyl", as used herein, refers to an alkyl group substituted with a carbocycle group.

The term "carbonate" is art-recognized and refers to a group —OCO$_2$—.

The term "carboxy", as used herein, refers to a group represented by the formula —CO$_2$H.

The term "cycloalkyl" includes substituted or unsubstituted non-aromatic single ring structures, preferably 4- to 8-membered rings, more preferably 4- to 6-membered rings. The term "cycloalkyl" also includes polycyclic ring systems having two or more cyclic rings in which two or more carbons are common to two adjoining rings wherein at least one of the rings is cycloalkyl and the substituent (e.g., $R^{100}$) is attached to the cycloalkyl ring, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, pyrimidine, denzodioxane, tetrahydroquinoline, and the like.

The term "ester", as used herein, refers to a group —C(O)OR$^9$ wherein R$^9$ represents a hydrocarbyl group.

The term "ether", as used herein, refers to a hydrocarbyl group linked through an oxygen to another hydrocarbyl group. Accordingly, an ether substituent of a hydrocarbyl group may be hydrocarbyl-O—. Ethers may be either symmetrical or unsymmetrical. Examples of ethers include, but are not limited to, heterocycle-O-heterocycle and aryl-O- heterocycle. Ethers include "alkoxyalkyl" groups, which may be represented by the general formula alkyl-O-alkyl.

The terms "halo" and "halogen" as used herein means halogen and includes chloro, fluoro, bromo, and iodo.

The terms "hetaralkyl" and "heteroaralkyl", as used herein, refers to an alkyl group substituted with a hetaryl group.

The terms "heteroaryl" and "hetaryl" include substituted or unsubstituted aromatic single ring structures, preferably 5- to 7-membered rings, more preferably 5- to 6-membered rings, whose ring structures include at least one heteroatom, preferably one to four heteroatoms, more preferably one or two heteroatoms. The terms "heteroaryl" and "hetaryl" also include polycyclic ring systems having two or more cyclic rings in which two or more carbons are common to two adjoining rings wherein at least one of the rings is heteroaromatic, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, and pyrimidine, and the like.

The term "heteroatom" as used herein means an atom of any element other than carbon or hydrogen. Preferred heteroatoms are nitrogen, oxygen, and sulfur.

The term "heterocyclylalkyl", as used herein, refers to an alkyl group substituted with a heterocycle group.

The terms "heterocyclyl", "heterocycle", and "heterocyclic" refer to substituted or unsubstituted non-aromatic ring structures, preferably 3- to 10-membered rings, more preferably 3- to 7-membered rings, whose ring structures include at least one heteroatom, preferably one to four heteroatoms, more preferably one or two heteroatoms. The terms "heterocyclyl" and "heterocyclic" also include polycyclic ring systems having two or more cyclic rings in which two or more carbons are common to two adjoining rings wherein at least one of the rings is heterocyclic, e.g., the other cyclic rings can be cycloalkyls, cycloalkenyls, cycloalkynyls, aryls, heteroaryls, and/or heterocyclyls. Heterocyclyl groups include, for example, piperidine, piperazine, pyrrolidine, morpholine, lactones, lactams, and the like.

The term "hydrocarbyl", as used herein, refers to a group that is bonded through a carbon atom that does not have a =O or =S substituent, and typically has at least one carbon-hydrogen bond and a primarily carbon backbone, but may optionally include heteroatoms. Thus, groups like methyl, ethoxyethyl, 2-pyridyl, and even trifluoromethyl are considered to be hydrocarbyl for the purposes of this application, but substituents such as acetyl (which has a =O substituent on the linking carbon) and ethoxy (which is linked through oxygen, not carbon) are not. Hydrocarbyl groups include, but are not limited to aryl, heteroaryl, carbocycle, heterocycle, alkyl, alkenyl, alkynyl, and combinations thereof.

The term "hydroxyalkyl", as used herein, refers to an alkyl group substituted with a hydroxy group.

The term "lower" when used in conjunction with a chemical moiety, such as, acyl, acyloxy, alkyl, alkenyl, alkynyl, or alkoxy is meant to include groups where there are ten or fewer atoms in the substituent, preferably six or fewer. A "lower alkyl", for example, refers to an alkyl group that contains ten or fewer carbon atoms, preferably six or fewer. In certain embodiments, acyl, acyloxy, alkyl, alkenyl, alkynyl, or alkoxy substituents defined herein are respectively lower acyl, lower acyloxy, lower alkyl, lower alkenyl, lower alkynyl, or lower alkoxy, whether they appear alone or in combination with other substituents, such as in the recitations hydroxyalkyl and aralkyl (in which case, for example, the atoms within the aryl group are not counted when counting the carbon atoms in the alkyl substituent).

The terms "polycyclyl", "polycycle", and "polycyclic" refer to two or more rings (e.g., cycloalkyls, cycloalkenyls, cycloalkynyls, aryls, heteroaryls, and/or heterocyclyls) in which two or more atoms are common to two adjoining rings, e.g., the rings are "fused rings". Each of the rings of the polycycle can be substituted or unsubstituted. In certain embodiments, each ring of the polycycle contains from 3 to 10 atoms in the ring, preferably from 5 to 7.

The term "sulfate" is art-recognized and refers to the group —OSO$_3$H, or a pharmaceutically acceptable salt thereof.

The term "sulfonamido" is art-recognized and refers to the group represented by the general formulae

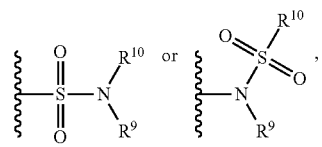

wherein $R^9$ and $R^{10}$ independently represents hydrogen or hydrocarbyl.

The term "sulfoxide" is art-recognized and refers to the group —S(O)—.

The term "sulfonate" is art-recognized and refers to the group SO$_3$H, or a pharmaceutically acceptable salt thereof.

The term "sulfone" is art-recognized and refers to the group —S(O)$_2$—.

The term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain can themselves be substituted, if appropriate.

The term "thioalkyl", as used herein, refers to an alkyl group substituted with a thiol group.

The term "thioester", as used herein, refers to a group —C(O)SR⁹ or —SC(O)R⁹
wherein R⁹ represents a hydrocarbyl.

The term "thioether", as used herein, is equivalent to an ether, wherein the oxygen is replaced with a sulfur.

The term "urea" is art-recognized and may be represented by the general formula

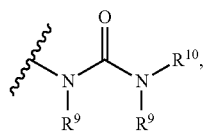

wherein R⁹ and R¹⁰ independently represent hydrogen or a hydrocarbyl.

Many of the compounds useful in the methods and compositions of this disclosure have at least one stereogenic center in their structure. This stereogenic center may be present in a R or a S configuration, said R and S notation is used in correspondence with the rules described in *Pure Appl. Chem.* (1976), 45, 11-30. The disclosure contemplates all stereoisomeric forms such as enantiomeric and diastereoisomeric forms of the compounds, salts, prodrugs or mixtures thereof (including all possible mixtures of stereoisomers). See, e.g., WO 01/062726.

Furthermore, certain compounds which contain alkenyl groups may exist as Z (zusammen) or E (entgegen) isomers. In each instance, the disclosure includes both mixture and separate individual isomers.

EXAMPLES

The invention now being generally described, it will be more readily understood by reference to the following examples which are included merely for purposes of illustration of certain aspects and embodiments of the present invention and are not intended to limit the invention.

Example 1: Synthesis and Degradation of Exemplary Polymers

To identify candidates for biomass-derived poly(hydroxyacids) that would have improved processability while maintaining biodegradability, a number of hydroxyacids that might be accessible by biological synthesis were discovered from the literature. The search was restricted to known 2-, 3-, and ω-hydroxyacids that can be produced from biomass. This approach was taken since the biological machinery (enzymes, cofactors etc.) necessary to produce the hydroxyacids is assumed to be available with little engineering necessary. This list was supplemented with non-natural hydroxyacids produced from engineered pathways found through literature searches. Finally, hydroxyacids produced as intermediates in biological pathways were identified by mining the MetaCyc[39] and KEGG databases. The maximum theoretical yield was calculated for each monomer as a metric for rapidly accessible bioproduction. While this does not provide a final prediction of price, this parameter serves as a readily available initial estimate for the efficiency of monomer synthesis. Subsequently, each of these monomers was scored from 0-5 based on polymerizability scoring rules, which were independently proposed during the search to categorize the potential monomers. An additional limit was imposed due to thermal stability: P3HB, the aforementioned biopolymer, decomposes above 160° C. by producing crotonic acid derivatives, limiting its thermal stability. To prevent formation of a six-membered ring structure that facilitates α-proton abstraction during decomposition, there should be no hydrogen atom on the $C_2$ position of the 3-hydroxyacid. The problem with this limitation is that many candidates do not exist naturally. Among the relatively sparse set, 3-hydroxy-2,2-dimethylpropanoic acid, or simply 3-hydroxypivalic acid, was chosen as a representative model compound because it could be derived from biomass and is readily accessible for testing in a laboratory setting and easy to handle, unlike other 3-hydroxyacids.

Homopolymerization of 3-Hydroxypivalic Acid

Previous polymerizations of 3HP has mainly been achieved by ring-opening polymerization of a corresponding cyclic monomer, pivalolactone, by taking advantage of highly strained ring structure. However, the accessibility of pivalolactone is costly, requires individually developed catalyst, and is not directly obtained from renewable biosources. Poly(3-hydroxypivalic acid) (P[3HP]) directly from 3HP as a monomer was synthesized by using conventional polycondensation as follows.

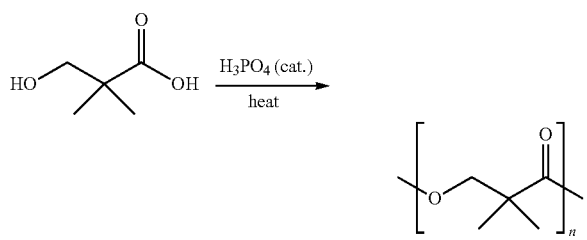

Figure 5:
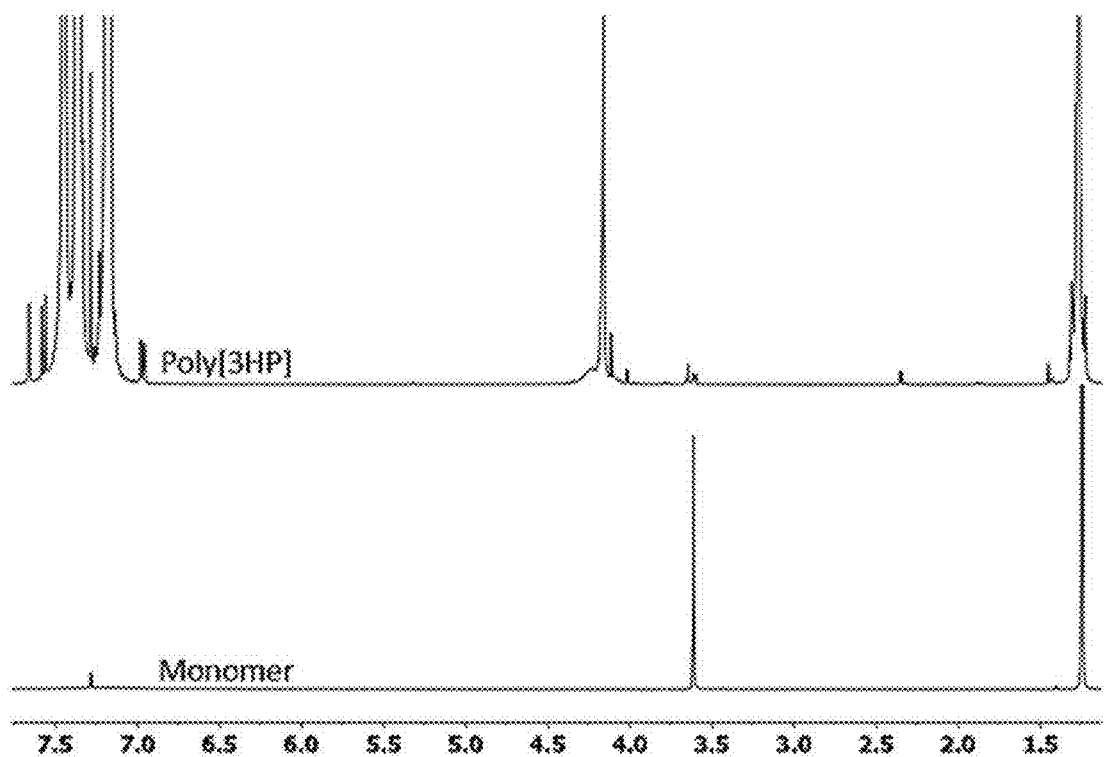
FIG. 5 shows a comparison of $^1$H NMR spectra between 3HP and P[3HP]. New peaks at around δ 4.24 corresponded to the methylene protons from ester linkages.
Figure 6:
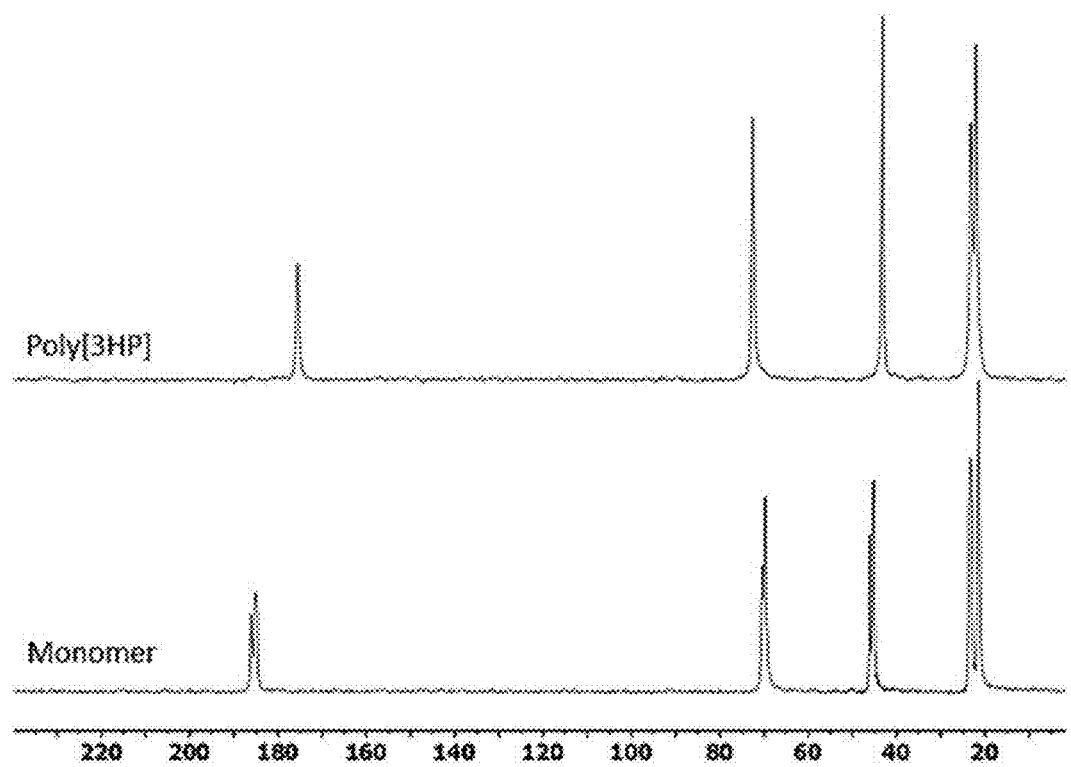
FIG. 6 shows a comparison of the solid state $^{13}$C NMR spectra between 3HP and P[3HP].

The acid-catalyzed polycondensation of 3HP was carried out in the absence of solvent to reduce the formation of cyclic intermediates. The monomer was heated at 120° C. under nitrogen in the presence of phosphoric acid (1 wt %) as catalyst for 4 hours, after which the temperature was raised to 180° C. under vacuum (50 mtorr) for 24 hours. Reaction temperatures above 200° C. are required due to thermal stability of the resulting polyester that tended to severe brown colorization. After completion of the polymerization, the resulting solid product was cooled and recovered without any further purification. The polymer did not dissolve into common organic solvents, such as chloroform, tetrahydrofuran (THF), N,N-dimethylformamide (DMF), which limited the use of analytical tools, such as nuclear magnetic resonance (NMR) or size-exclusion chromatography (SEC). It was possible to obtain the proton NMR spectra by dissolving the product in hot trichlorobenzene (TCB) and quickly mixed an aliquot to the deuterated chloroform (Table 4, entry 2, FIG. 5). The polymer was further analyzed by solid-state carbon NMR to observe upfield-shifted carbonyl peak and it matched well with the literature value (FIG. 6). The molecular weight was very low likely due to high crystallinity of monomer which halted the propagation and resulted in early precipitation.

Figure 7:
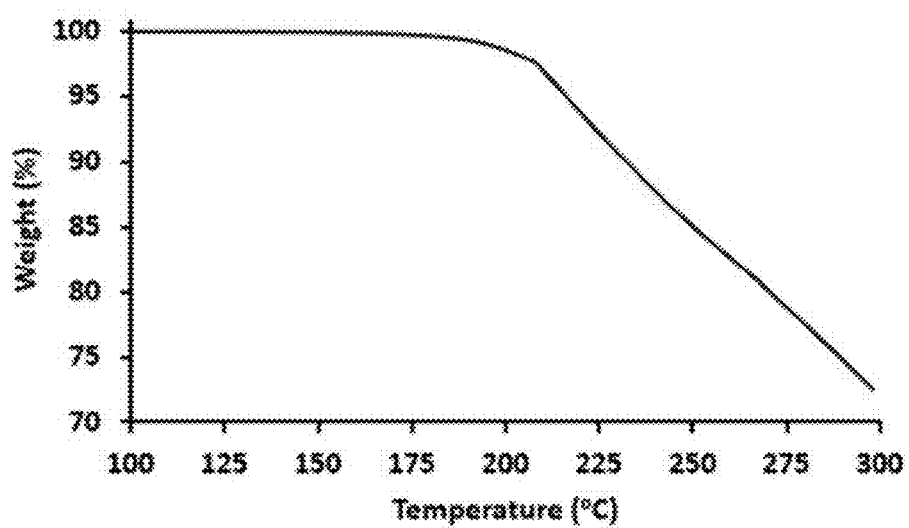
FIG. 7 shows a TGA profile of P[3HP]. The onset temperature was measured at 200° C. and $T_d^5$ was reported at 216° C.
Figure 8:
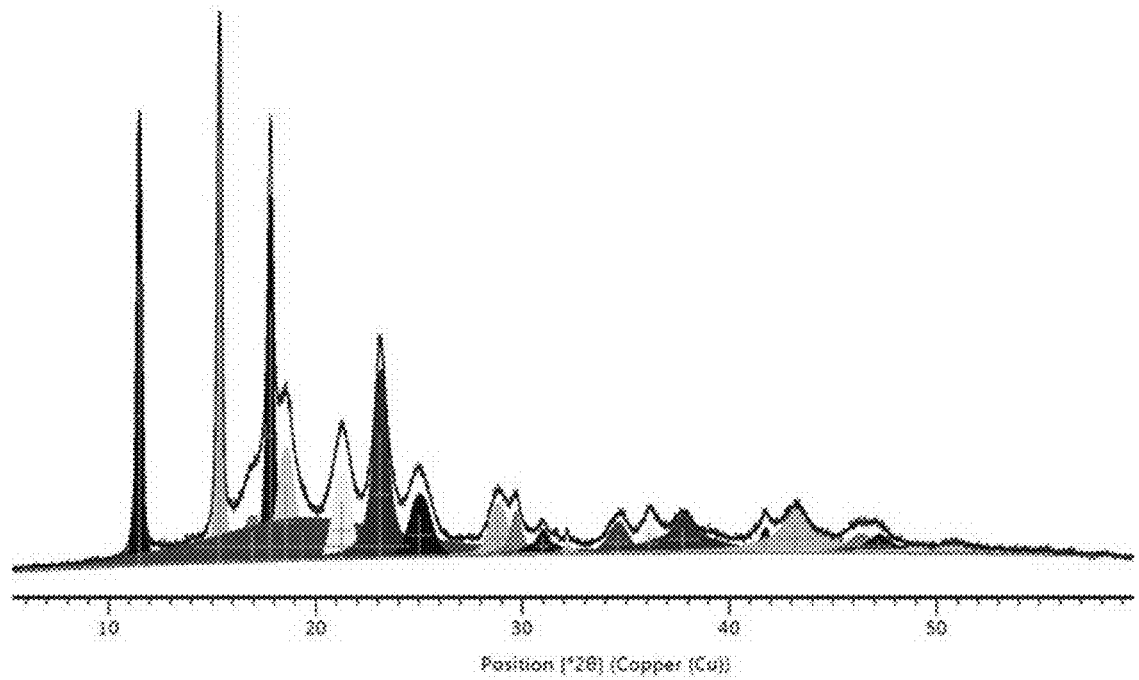
FIG. 8 shows an XPRD spectrum of P[3HP]. Each peak was assigned with separate color. The broad band corresponds to an amorphous region. The degree of crystallinity was calculated as 74%.
Figure 9:
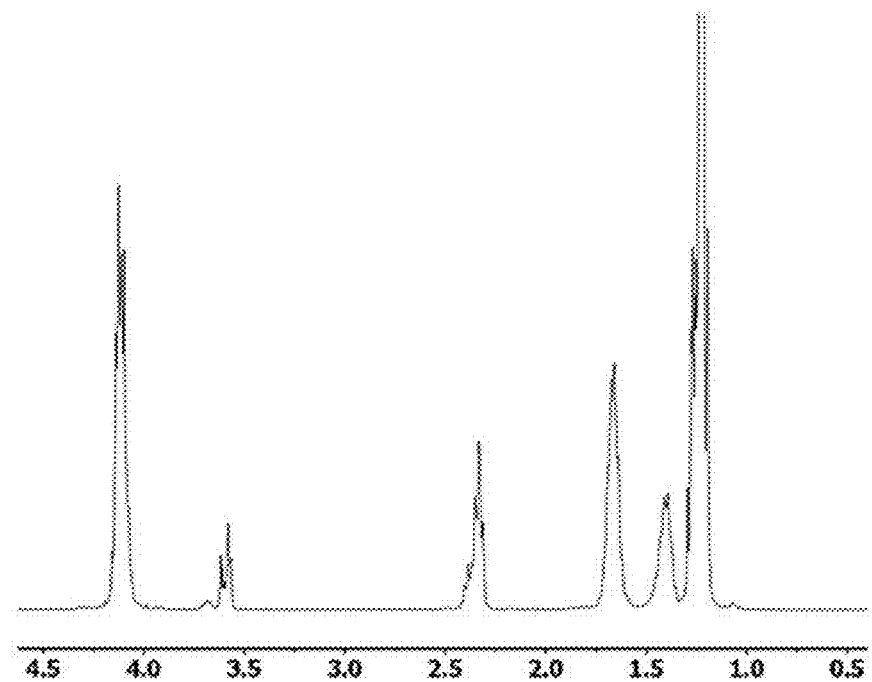
FIG. 9 shows a representative $^1$H NMR spectrum of poly[3HP$_x$-co-6HA$_y$].
Figure 10:
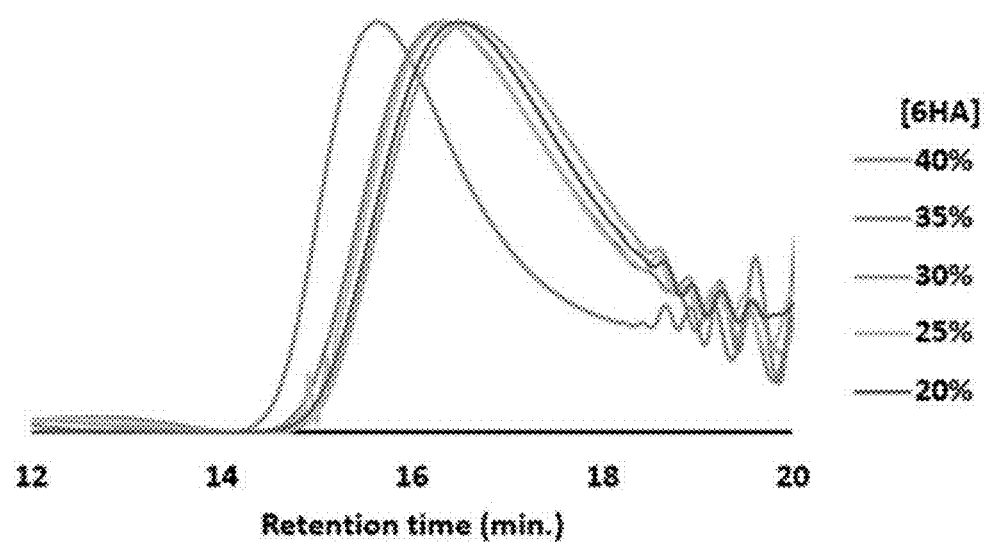
FIG. 10 shows the normalized SEC refractive index (RI) signals of poly[3HP$_x$-co-6HA$_y$], where x:y=60:40, 65:35, 70:30, 75:25, 80:20. Molecular weight ($M_n^{SEC}$) as well as polydispersity index (PDI) were not calculated correctly as there were significant amounts of oligomers that misrepresented the result. Oscillating peaks between 18-20 min. are due to oligomers.

To understand the thermal properties of the P[3HP], thermogravimetric analysis (TGA) analysis was performed to present 5 wt % decomposition temperature ($T_d^5$) at 209-216° C. (FIG. 7). It was not possible to observe melting temperature ($T_m$) or glass transition temperature ($T_g$) below the decomposition temperature from differential scanning calorimetry (DSC). This result aligned with experimental observations; the polymerization occurred until it reached a certain level and it precipitated out and did not proceed furthermore. P[3HP] was further analyzed by X-ray powder diffraction (XRPD) and the crystallinity was determined as 74%, which was very high considering its low molecular weight (FIG. 8). The diffraction patterns also matched well with the reported value. Therefore, it is strongly believed that crystallinity had a significant effect on the preparing a homopolymer of 3HP.

General Methods

Spectroscopy $^1$H NMR and solid state $^{13}$C NMR spectra were collected on a two-channel Bruker Avance-III HD Nanobay spectrometer operating at 400.13 MHz and a three-channel Bruker Avance Neo spectrometer operating at 500.18 MHz, respectively and the recorded data were internally referenced to the residual proton solvent (CDCl$_3$: 1H, δ=7.28 ppm). Coupling constants were expressed in hertz (Hz). Size-exclusion chromatography (SEC) was performed using a Wyatt DAWN HELEOS II multi-angle laser light scattering detector and a Wyatt Optilab T-rEX refractive index detector (Wyatt Technology) platform with an Agilent 1260 Infinity Series isopump and auto sampler. THF was used as an eluent at 1.0 mL/min with two ResiPore HPLC column, calibrated against polystyrene standards. Thermogravimetric analysis (TGA) was performed on a TA Instruments Discovery thermogravimetric analyzer and differential scanning calorimetry (DSC) was performed on a TA Instruments Discovery differential scanning calorimeter at the Institute for Soldier Nanotechnologies. X-ray diffraction (XRD) patterns were collected on a Panalytical Multipurpose Diffractometer at MIT Materials Research Science and Engineering Center. The tube voltage and current were 45 kV and 40 mA, respectively. Samples for PXRD were prepared by placing a thin layer of the appropriate material on a zero-background Si crystal plate. The photoreactor was custom-built with aluminum reflector and five UV-A light lamps (Q-lab 40 W 48" T12 bulbs). Total organic carbon (TOC) was measured by the Vario TOC cube (Elementar). 2.0 megapixel USB camera (ELP-USBFHD06H-SFV (2.8-12 mm)) was used to take photos of clear zone propagation.

Reagents and Materials

All the chemicals were purchased from commercial sources and used as received without further purification. Bacteria strain (*Paucimonas lemoignei*) strain designation: DSM 7445 [LMG 2207, NCTC 10937]) was purchased from ATCC. "Sea salt" ASTM D1141 was used to prepare synthetic seawater and the protocol provided by the commercial vendor was adopted.

TABLE 1

Exemplary list of 2-Hydroxyacids that can be generated by biological synthesis processes

| IUPAC Name | Yield (g/g) Glucose |
| --- | --- |
| 2-hydroxybutanedioic acid | 2.7 |
| 2-hydroxypropanoic acid | 4.0 |
| 2-hydroxybutanoic acid | 2.3 |
| 2-hydroxy-3-methylbutanoic acid | 1.5 |
| 2-hydroxypentanoic acid | 1.5 |
| 2-hydroxy-3-methylpentanoic acid | 1.1 |
| 2-hydroxy-4-methylpentanoic acid | 1.1 |
| 2-hydroxyacetic acid | 9.5 |

TABLE 1-continued

Exemplary list of 2-Hydroxyacids that can be generated by biological synthesis processes

| IUPAC Name | Yield (g/g) Glucose |
| --- | --- |
| 2,3-dihydroxybutanoic acid | 2.3 |
| 2,4-dihydroxybutanoic acid | 2.3 |
| 2,3-dihydroxypropanoic acid | 4.1 |
| 2-hydroxyhexanoic acid | 1.1 |
| 2-hydroxydecanoic acid | 0.4 |
| 2-hydroxydodecanoic acid | 0.3 |
| 2-hydroxytetradecanoic acid | 0.2 |
| 2-hydroxyhexadecanoic acid | 0.2 |
| (2R)-2-hydroxypentanedioic acid | 1.6 |
| 2-hydroxyhexanedioic acid | 1.1 |
| (2E,4Z)-2-hydroxyhexa-2,4-dienedioic acid | 1.4 |
| (2R)-2-hydroxyoctadecanoic acid | 0.1 |
| 2-amino-3-hydroxy-2-(hydroxymethyl)propanoic acid | 2.3 |
| (2S)-2-ethyl-2-hydroxy-3-oxobutanoic acid | 1.1 |
| (2S)-2-hydroxy-2-methyl-3-oxobutanoic acid | 1.6 |
| (2E,4Z)-2-hydroxyhexa-2,4-dienoic acid | 1.3 |

TABLE 2

Exemplary list of 3-Hydroxyacids that can be generated by biological synthesis processes

| IUPAC Name | Yield (g/g) Glucose |
| --- | --- |
| 3-hydroxypropanoic acid | 4.0 |
| 3-hydroxybutyric acid | 2.3 |
| 3-Hydroxypentanoic acid | 1.5 |
| 3-hydroxyhexanoic acid | 1.1 |
| 3-hydroxyheptanoic acid | 0.8 |
| 3-hydroxyoctanoic acid | 0.6 |
| 3-hydroxynonanoic acid | 0.5 |
| 3-hydroxydecanoic acid | 0.4 |
| 3-hydroxyundecanoic acid | 0.4 |
| 3-hydroxydodecanoic acid | 0.3 |
| 3-hydroxytetradecanoic acid | 0.2 |
| 3-hydroxyhexadecanoic acid | 0.2 |
| 3-hydroxy-4-pentenoic acid | 1.7 |
| 3-hydroxyhex-4-enoic acid | 1.2 |
| 3-hydroxy-5-hexenoic acid | 1.2 |
| 3-hydroxy-6-octenoic acid | 0.7 |
| 3-hydroxy-7-octenoic acid | 0.7 |
| 3-hydroxy-8-nonenoic acid | 0.5 |
| 3-hydroxy-9-decenoic acid | 0.4 |
| 3-hydroxy-5-dodecenoic acid | 0.3 |
| 3-hydroxy-6-dodecenoic acid | 0.3 |
| 3-hydroxy-5-cis-tetradecanoic acid | 0.2 |
| 3-hydroxy-7-cis-tetradecanoic acid | 0.2 |
| 3-hydroxy-5,8-cis,cis-tetradecenoic acid | 0.2 |
| 3-hydroxy-4-methylpentanoic acid | 1.1 |
| 3-hydroxy-4-methylhexanoic acid | 0.8 |
| 3-hydroxy-5-methylhexanoic acid | 0.8 |
| 3-hydroxy-6-methylheptanoic acid | 0.6 |
| 3-hydroxy-4-methyloctanoic acid | 0.5 |
| 3-hydroxy-5-methyloctanoic acid | 0.5 |
| 3-hydroxy-6-methyloctanoic acid | 0.5 |
| 3-hydroxy-7-methyloctanoic acid | 0.5 |
| 3-hydroxy-6-methylnonanoic acid | 0.4 |
| 3-hydroxy-7-methylnonanoic acid | 0.4 |
| 3-hydroxy-8-methylnonanoic acid | 0.4 |
| 3-hydroxy-7-methyldecanoic acid | 0.4 |
| 3-hydroxy-9-methyldecanoic acid | 0.4 |
| 3-hydroxy-7-methyl-6-octenoic acid | 0.5 |
| 3-hydroxy-4-methoxy-4-oxobutanoic acid | 1.6 |
| 3-hydroxy-6-methoxy-6-oxohexanoic acid | 0.8 |
| 3-Hydroxy-8-methoxy-8-oxooctanoic acid | 0.5 |
| 3-hydroxy-10-methoxy-10-oxodecanoic acid | 0.3 |
| 8-ethoxy-3-hydroxy-8-oxooctanoic acid | 0.4 |
| 10-ethoxy-3-hydroxy-10-oxodecanoic acid | 0.3 |
| 3-hydroxy-7-oxo-7-propoxyheptanoic acid | 0.4 |
| 8-acetoxy-3-hydroxyoctanoic acid | 0.4 |
| 9-acetoxy-3-hydroxynonanoic acid | 0.3 |

TABLE 2-continued

Exemplary list of 3-Hydroxyacids that can be generated by biological synthesis processes

| IUPAC Name | Yield (g/g) Glucose |
|---|---|
| 3,12-dihydroxydodecanoic acid | 0.3 |
| 3,8-dihydroxy-5-cis-tetradecenoic acid | 0.2 |
| 3-hydroxy-2-methylbutanoic acid | 1.5 |
| 3-hydroxy-2-methylvaleric acid | 1.1 |
| 3-hydroxy-2,6-dimethylhept-5-enoic acid | 0.5 |
| 3-hydroxybut-2-enoic acid | 2.6 |
| 3,4-dihydroxybutanoic acid | 2.3 |
| 3,6-dihydroxydodecanoic acid | 0.3 |
| 3-hydroxy-2,2-dimethylpropanoic acid | 1.5 |
| 3-hydroxy-7-oxooctanoic acid | 0.7 |
| 3-hydroxy-5-oxohexanoic acid | 1.1 |
| 6-acetoxy-3-hydroxyhexanoic acid | 0.6 |
| 4-acetoxy-3-hydroxybutyric acid | 1.0 |
| 3-hydroxyoctadecanoic acid | 0.1 |
| 3-hydroxy-5-methylheptanoic acid | 0.6 |
| 3-hydroxy-5-methylnonanoic acid | 0.4 |
| 3-hydroxy-methylpropionic acid | 2.6 |
| 3-hydroxy-5-methylundecanoic acid | 0.3 |
| 3-hydroxy-6-methylundecanoic acid | 0.3 |
| 3-hydroxy-7-methylundecanoic acid | 0.3 |
| 3-hydroxy-8-methylundecanoic acid | 0.3 |
| 3-hydroxy-9-methylundecanoic acid | 0.3 |
| 3-hydroxy-10-methylundecanoic acid | 0.3 |
| 3-hydroxy-5-methyltridecanoic acid | 0.2 |
| 3-hydroxy-6-methyltridecanoic acid | 0.2 |
| 3-hydroxy-7-methyltridecanoic acid | 0.2 |
| 3-hydroxy-8-methyltridecanoic acid | 0.2 |
| 3-hydroxy-9-methyltridecanoic acid | 0.2 |
| 3-hydroxy-10-methyltridecanoic acid | 0.2 |
| 3-hydroxy-11-methyltridecanoic acid | 0.2 |
| 3-hydroxy-2-oxopropanoic acid | 5.2 |
| 3-hydroxy-3-methyl-2-oxobutanoic acid | 1.6 |
| (R)-3-hydroxy-3-methyl-2-oxopentanoic acid | 1.1 |

TABLE 3

Exemplary list of ω-Hydroxy acids that can be generated by biological synthesis processes

| IUPAC Name | Yield (g/g) Glucose |
|---|---|
| 5-hydroxypentanoic acid | 1.5 |
| 5-hydroxyhexanoic acid | 1.1 |
| 6-hydroxydodecanoic acid | 0.3 |
| 6-hydroxy-3-dodecenoic acid | 0.3 |
| 7-hydroxyheptanoic acid | 0.8 |
| 6-hydroxyhexanoic acid | 1.1 |
| 5-hydroxy-2,4-dioxopentanoic acid | 1.8 |

Experimental Methods

Percent crystallinity of copolymers was calculated by normalizing the observed heat of fusion to that of a 100% crystalline P[3HP]. Enthalpy of fusion of 100% crystalline P[3HP] polymer was reported as 183 J/g.[3]

Photoweathering experiment was conducted with a custom-built photoreactor. Each sample (5 mg) was immersed in synthetic seawater (28 mL) in a 30 mL quartz cuvette (Technical Glass Products, Inc, USA) and placed on an orbital shaker. After 14 days of irradiation, solid particles were filtered through 0.22 um glass fiber filter (Kinesis KX Syringe Filter, Cole-Parmer, USA) and remaining aliquot was examined by TOC analyzer to determine total dissolved organic carbon level.

Clear zone assay was run in 12 well plates, with 6 replicates of polymer and strain, 2 replicates of a polymer only control, 2 replicates of strain only controls, and 2 replicates of controls containing no polymer or strain. These plates were imaged every two days by USB camera, ensuring that pictures were taken at a specific location relative to a well. Once all the wells were imaged, they were analyzed by detecting the center of the growing colony in the well from a cropped grey scale image. The average shade at a given radius was calculated and this curve was plotted to detect a clear zone. Incubated bacteria colony is located and grew at the center on the agar which appears opaque due to the dispersed polymer powder which will then become clear if the bacteria is capable of fragmenting the polymer, so that it can tell whether the polymer was biodegraded or not.

The biodegradation kinetics was calculated as follow. The colonies of each well were detected and their shape was determined. If the diameter of a well is higher than 7 mm, it was discarded and the data was not included in the final average. For other wells, their shading curve was extracted by looking at the average shade of pixels part of a 3 pixel wide donut of increasing radius away from the colony center. For each time measurement, the integrated area of the shading curve was computed between 3.7 and 7 mm. If a sample was in fact degraded, the value of integrated area started to decrease with time. The value of the integrated area of each time measurement was plotted, and a linear approximation was applied at the points that made the highest variation. This coefficient of each linear fit was averaged and gave the value of the degradation rate for that sample. Every sample had 6 replicates.

Copolymerization of 3-Hydroxypivalic Acid with 6-Hydroxy Hexanoic Acid

Figure 2:
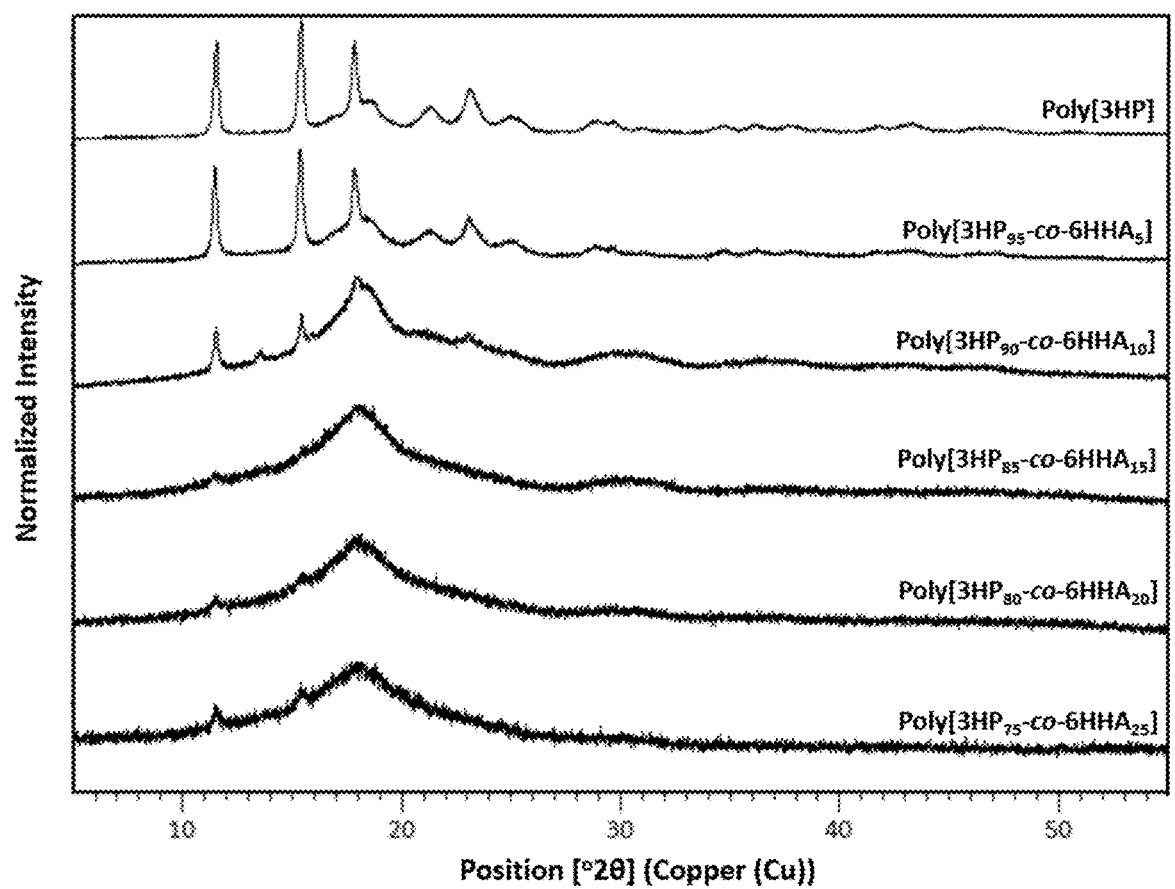
FIG. 2 shows the PXRD patterns of poly[3HP$_x$-co-6HA$_y$].
Figure 11:
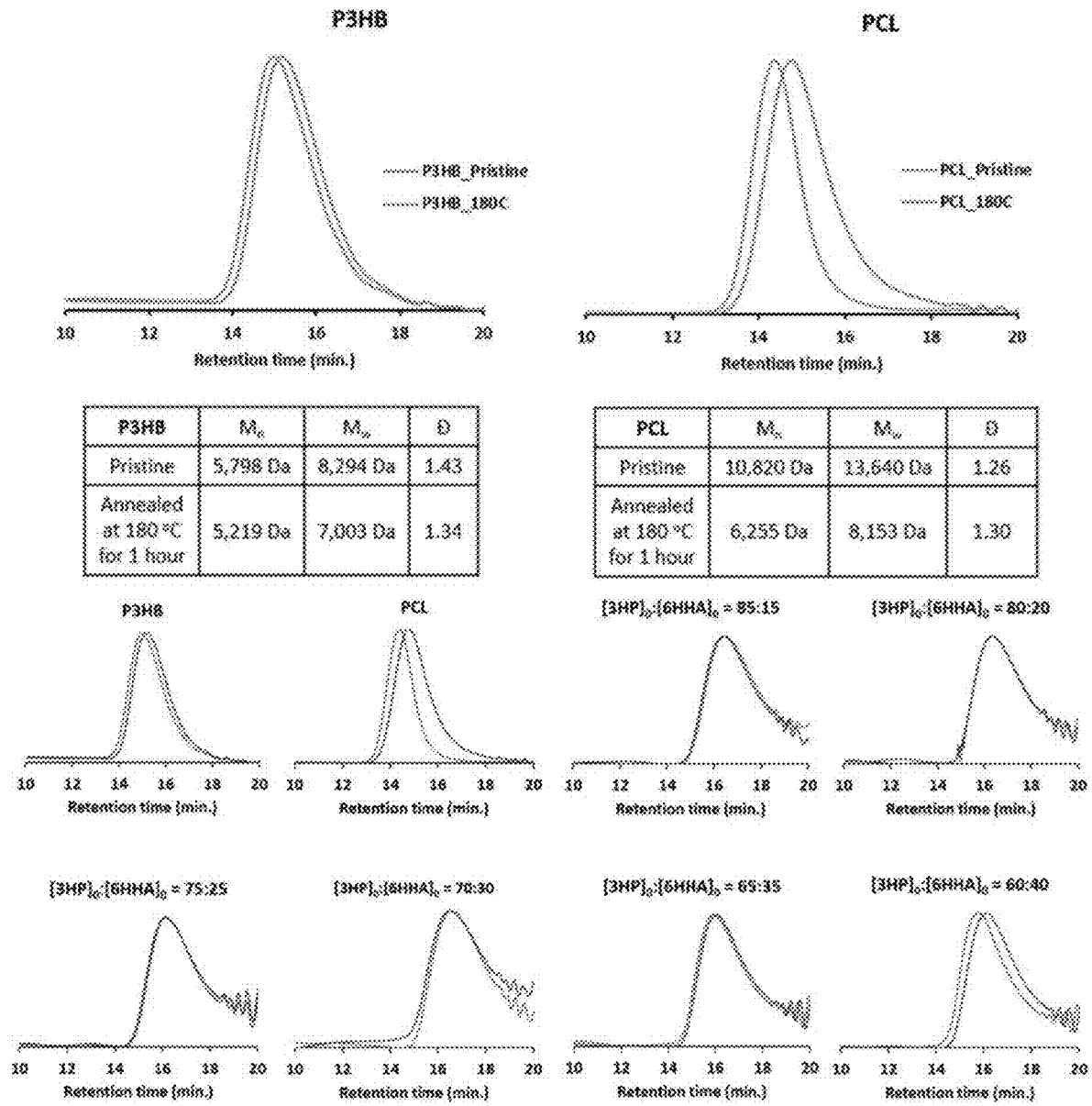
FIG. 11 shows normalized SEC RI signals for P3HB, PCL, and poly[3HP$_x$-co-6HA$_y$](Blue: pristine; red: annealed at 180° C. for 1 hour). SEC profiles for sample [3HP]$_0$:[6HA]$_0$=100:0, 95:5, 90:10, 85:15 were not observed due to their poor solubility toward eluting solvent (THF).
Figure 12:
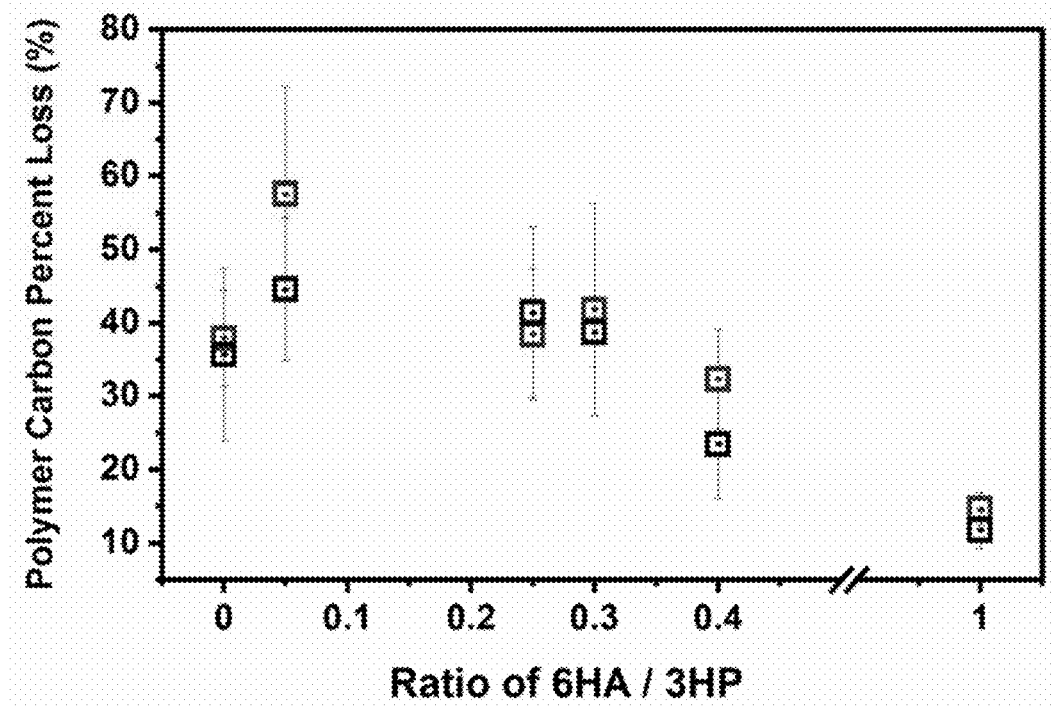
FIG. 12 shows the polymer carbon percent loss after 14 days of irradiation in the photoreactor. Only the total carbon content in the polymer sample was used in the calculation of percent loss. The error bars presented show the standard deviation on the measurements acquired.
Figure 13:
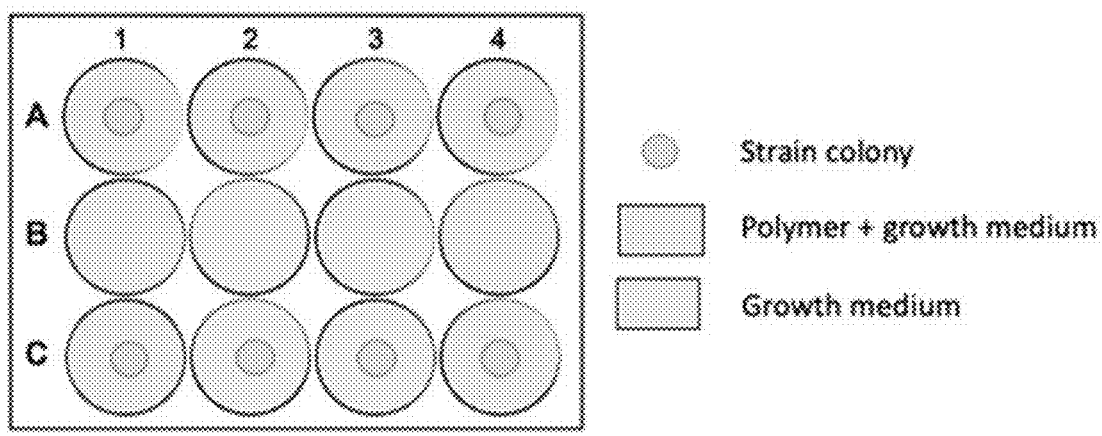
FIG. 13 shows a schematic representation of sample preparation for the clear zone assay in a 12-well flat-bottom plate.
Figure 14:
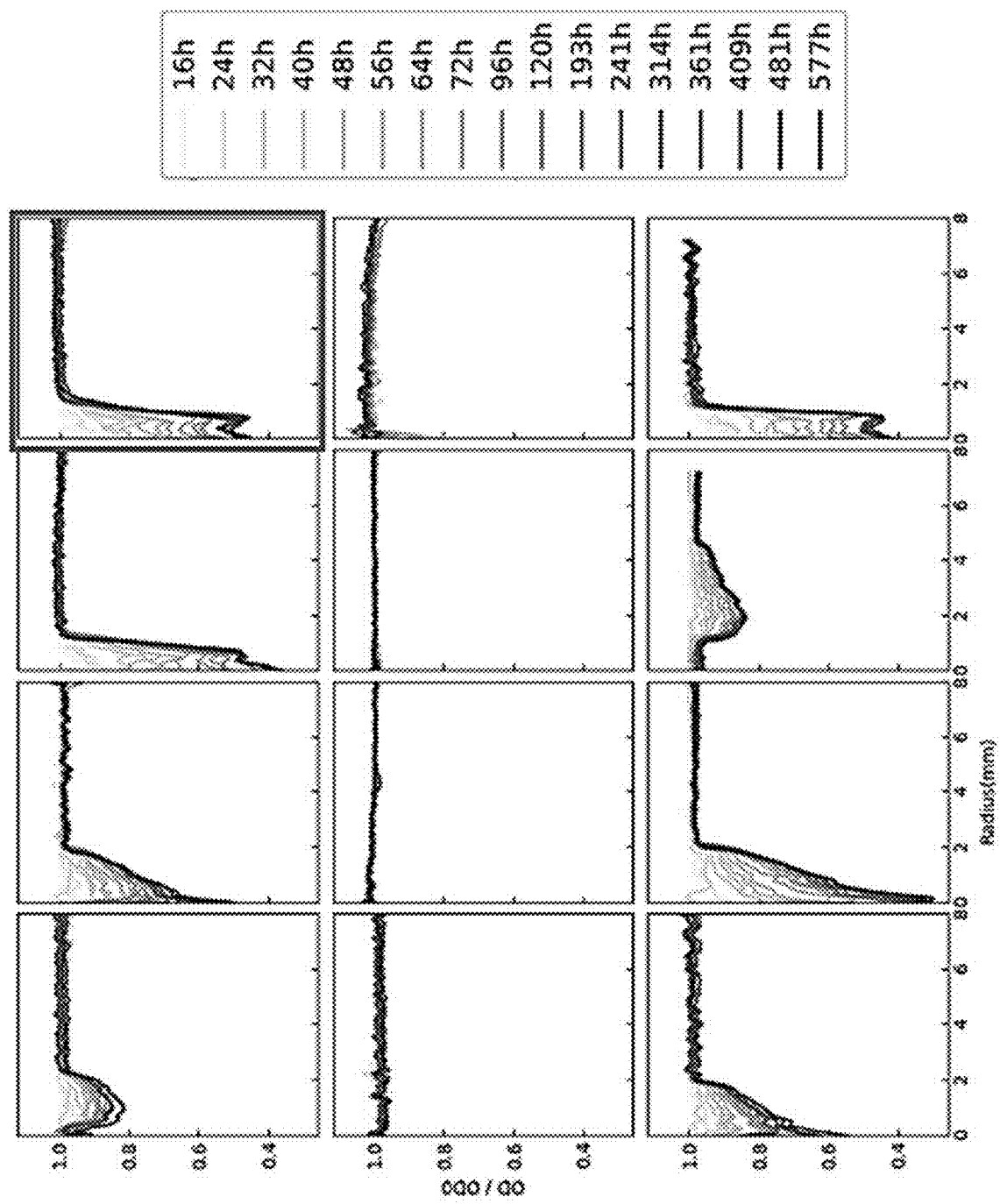
FIG. 14 shows a bacterial clear zone propagation for P[3HP$_{100}$-co-6HA$_0$]. A representative plot is highlighted by the dark grey box (indicated).
Figure 15:
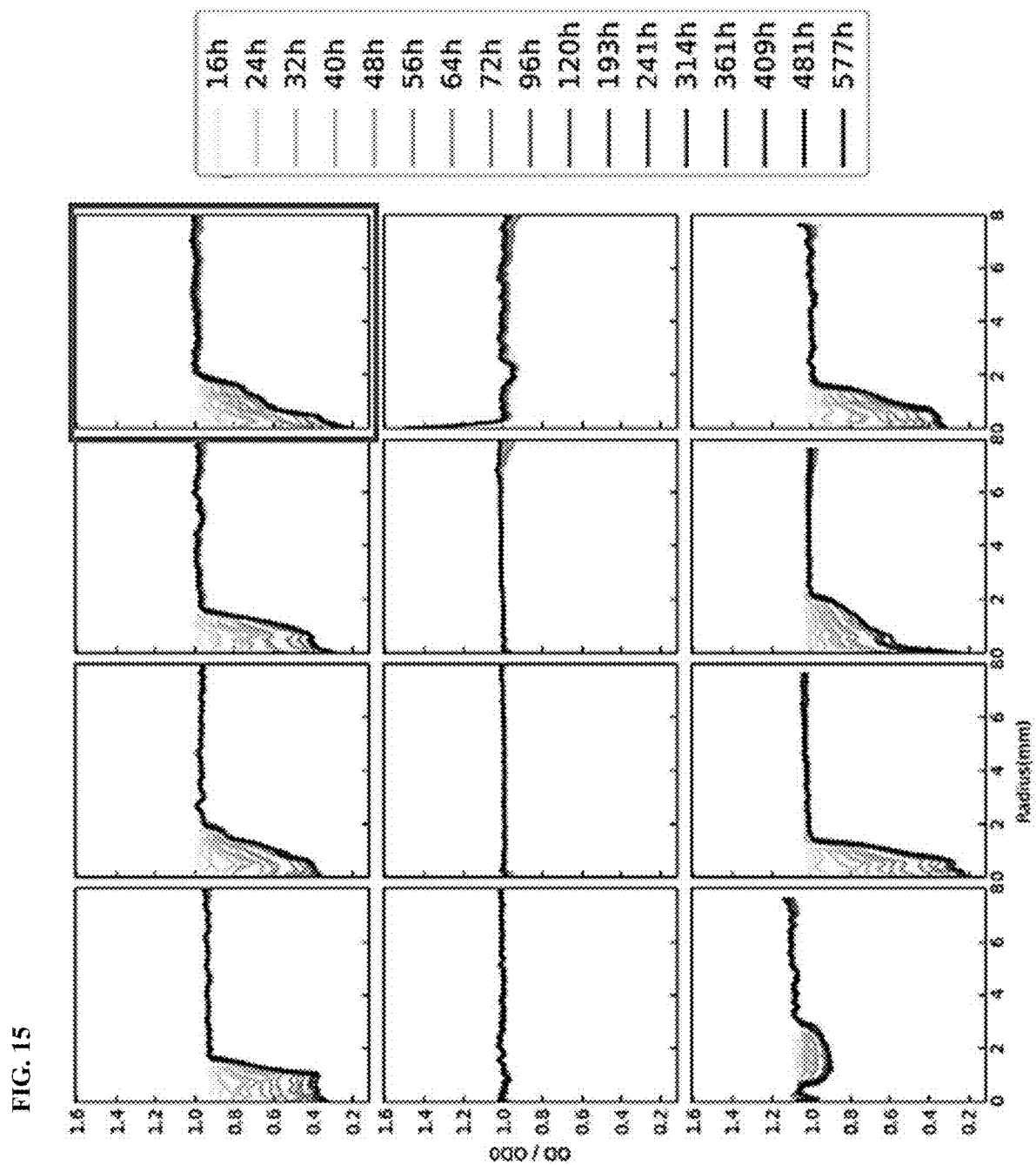
FIG. 15 shows a bacterial clear zone propagation for P[3HP$_{95}$-co-6HA$_5$]. A representative plot is highlighted by the dark grey box (indicated).
Figure 16:
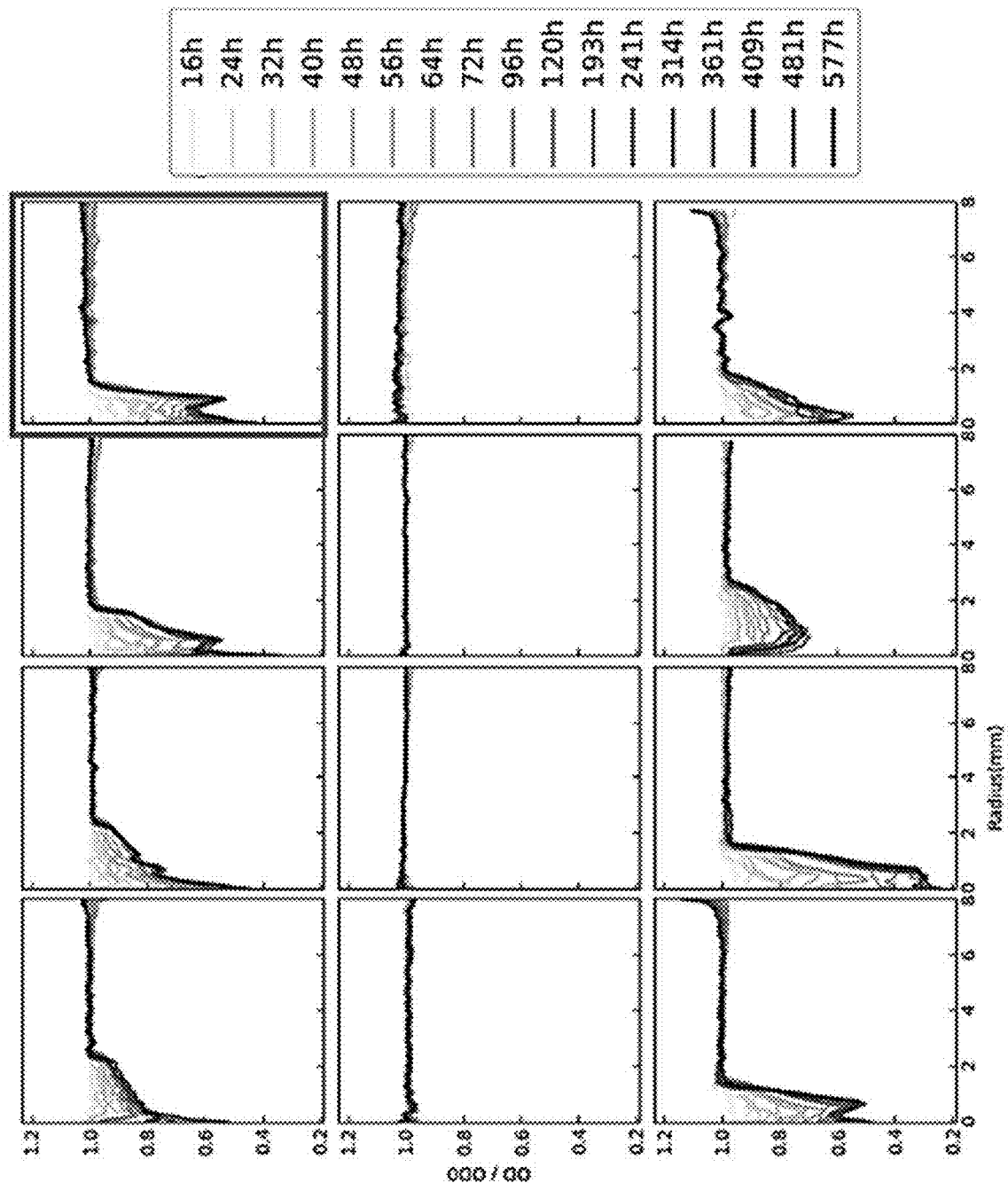
FIG. 16 shows a bacterial clear zone propagation for P[3HP$_{90}$-co-6HA$_{10}$]. A representative plot is highlighted by the dark grey box (indicated).
Figure 17:
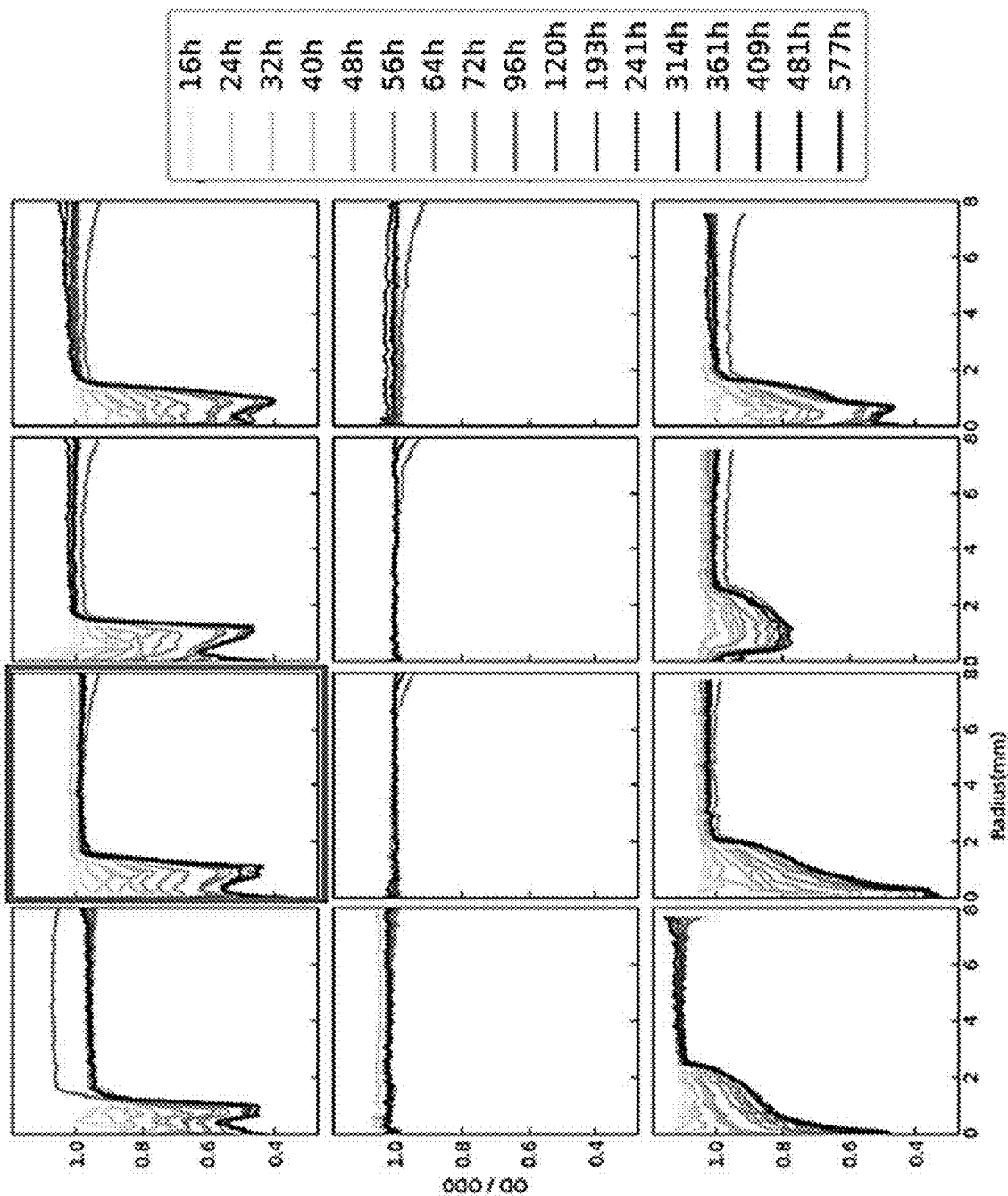
FIG. 17 shows a bacterial clear zone propagation for P[3HP$_{85}$-co-6HA$_{15}$]. A representative plot is highlighted by the dark grey box (indicated).
Figure 18:
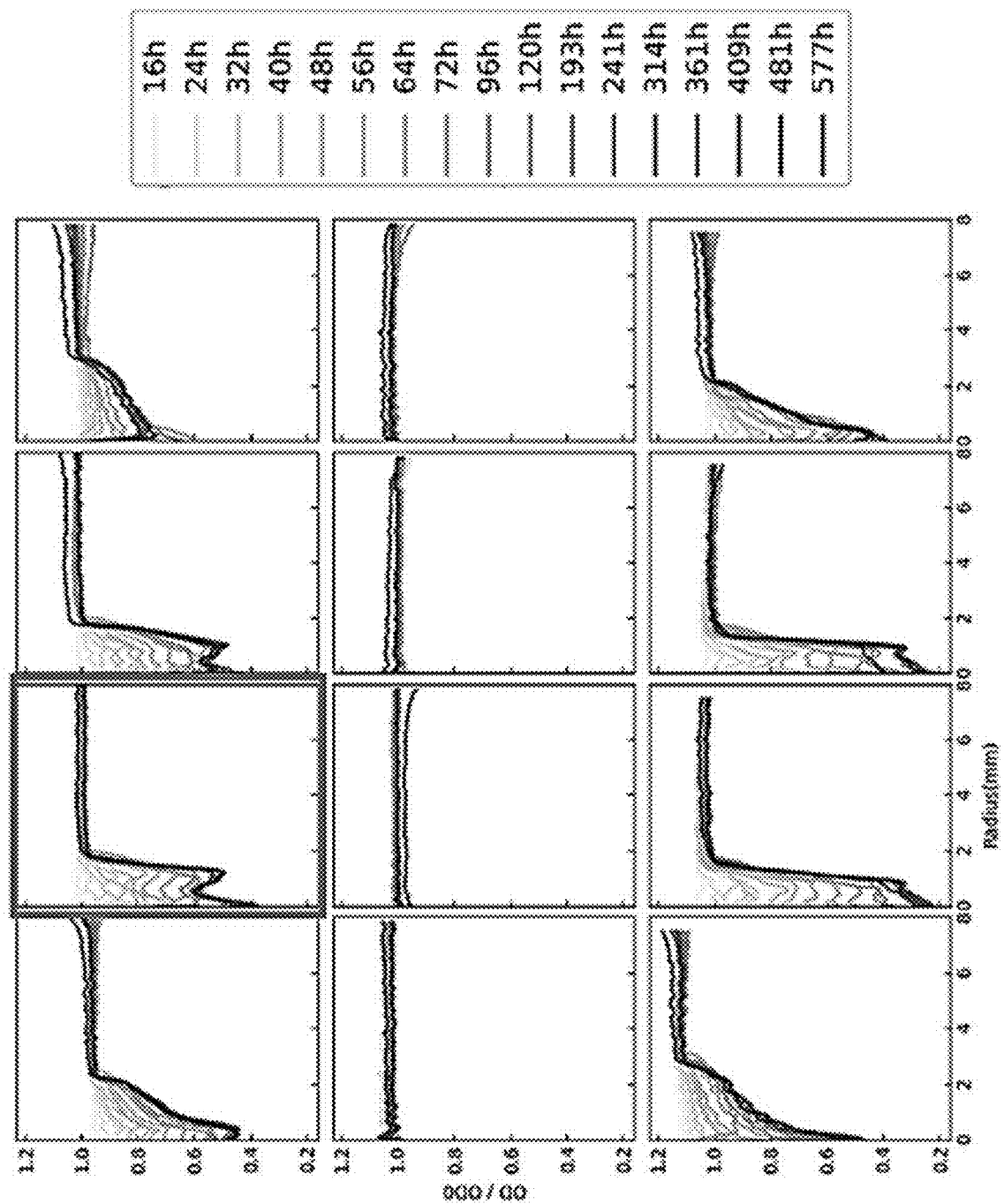
FIG. 18 shows a bacterial clear zone propagation for P[3HP$_{80}$-co-6HA$_{20}$]. A representative plot is highlighted by the dark grey box (indicated).

To reduce crystallization in P[3HP], copolymers of 3HP and 6-hydroxy hexanoic acid (6HA), a linear analogue of ε-caprolactone, were synthesized by the direct polycondensation method (Table 4). It was believed that 6HA could improve the flexibility of polyesters as it contained a long hydrocarbon chain. By gradually increasing the feed ratio of 6HA to 3HP, a series of copolymers, poly[3HP$_x$-co-6HA$_y$], were prepared and extensively analyzed by TGA, DSC and XPRD to determine the thermal properties as well as the crystallinity. While P[3HP] only reached a very low molecular weight (2,218 Da) with high percent crystallinity (74%) (Table 4, entry 2), adding 6HA doubled the molecular weight and largely decreased the crystallinity of the copolymer. There were three regimes that clearly divided and represented the properties of the copolymers. When the feed ratio of 6HA was as low as 5 wt % (Table 4, entry 3), percent crystallinity of the copolymer was still as high as 65% with matching distinctive XRPD patterns to the polymorphs of P[3HP] (FIG. 2). If more 6HA was incorporated, the percent crystallinity of the polymer dropped. The physical appearance of the copolymer products also supported the sudden change of their crystallinity. When the feed ratio of 6HA was higher than 10 wt %, the copolymer was exhibited as 'gel-like' elastomer. The percent crystallinity dropped and there was only very broad dissipation observed from X-ray diffraction patterns (FIG. 2). The glass transition temperature plateaued at around 40° C. while melting temperature and crystallization temperature ($T_c$) kept decreasing (Table 4, entries 4-7). The melting temperature of the prepared copolymers decreased with increased feed ratio of 6HA, although the molecular weight leveled off at around 6,000 Da. The last regime was observed where 6HA was greater than 30 wt %. The resulting polymer was recovered as 'sol-like' elastomer with low melting temperature (below 71° C.). The crystallinity was lost and the glass transition temperature as well as the crystallization temperature were not achieved. Given the low glass transition temperature of poly(caprolactone) (PCL) at −60° C. [46], it was suspected that it would be observed below 0° C. In this region, the existence of 6HA controlled the thermo-physical properties of the copolymer.

increased polydispersity index (PDI) (FIG. 11). The shift was more considerable with PCL, and it was suspected that the incorporation of 6HA had a major effect on the thermal property of the copolymer. The change in melting temperature with different 6HA feed ratio was already observed from DSC experiment. Therefore, poly[3HP$_x$-co-6HA$_y$] demon-

TABLE 4

Reaction screening for the copolymerization of 3-hydroxypivalic acid (3HP) and 6-hydroxy hexanoic acid (6HA)

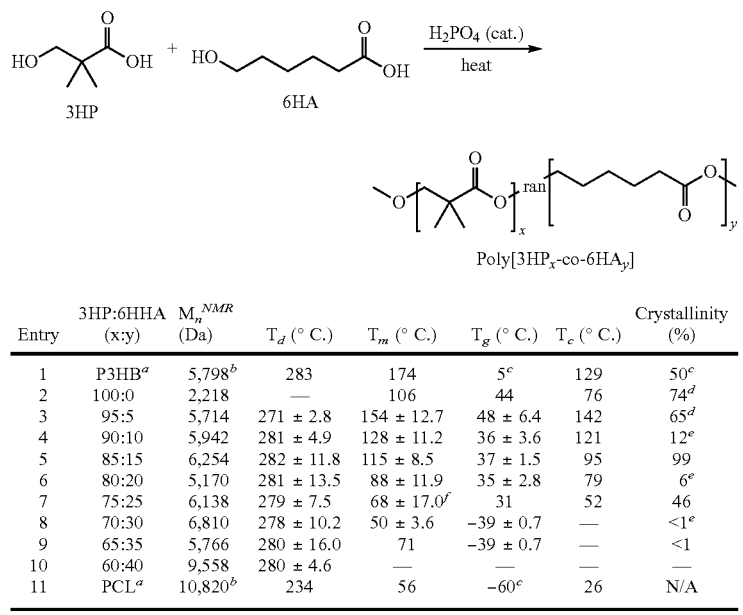

Poly[3HP$_x$-co-6HA$_y$]

| Entry | 3HP:6HHA (x:y) | $M_n^{NMR}$ (Da) | $T_d$ (° C.) | $T_m$ (° C.) | $T_g$ (° C.) | $T_c$ (° C.) | Crystallinity (%) |
|---|---|---|---|---|---|---|---|
| 1 | P3HB[a] | 5,798[b] | 283 | 174 | 5[c] | 129 | 50[c] |
| 2 | 100:0 | 2,218 | — | 106 | 44 | 76 | 74[d] |
| 3 | 95:5 | 5,714 | 271 ± 2.8 | 154 ± 12.7 | 48 ± 6.4 | 142 | 65[d] |
| 4 | 90:10 | 5,942 | 281 ± 4.9 | 128 ± 11.2 | 36 ± 3.6 | 121 | 12[e] |
| 5 | 85:15 | 6,254 | 282 ± 11.8 | 115 ± 8.5 | 37 ± 1.5 | 95 | 99 |
| 6 | 80:20 | 5,170 | 281 ± 13.5 | 88 ± 11.9 | 35 ± 2.8 | 79 | 6[e] |
| 7 | 75:25 | 6,138 | 279 ± 7.5 | 68 ± 17.0[f] | 31 | 52 | 46 |
| 8 | 70:30 | 6,810 | 278 ± 10.2 | 50 ± 3.6 | −39 ± 0.7 | — | <1[e] |
| 9 | 65:35 | 5,766 | 280 ± 16.0 | 71 | −39 ± 0.7 | — | <1 |
| 10 | 60:40 | 9,558 | 280 ± 4.6 | — | — | — | — |
| 11 | PCL[a] | 10,820[b] | 234 | 56 | −60[c] | 26 | N/A |

[a]Used as controls and purchased from Sigma-Aldrich.
[b]Determined by size exclusion chromatography (SEC).
[c]Literature report.
[d]Determined by XRPD.
[e]Determined by DSC.
[f]DSC ramp rate: 10° C./min. DSC ramp rates were 20° C./min unless noted otherwise.

While molecular weight of copolymers slightly and gradually increases as 6HA was added, the decomposition temperatures were maintained above 250° C. The glass transition temperatures were maintained but slightly decreased from 30° C. and the melting temperatures were tended to linearly decrease as contents of 6HA increased. Collectively, it enabled the possibility to take advantage of high thermal stability with wider processable temperature with decreased melting temperature.

To further demonstrate the thermal stability of poly[3HP$_x$-co-6HA$_y$], each sample was heated at 180° C. in a vial for one hour and SEC profiles were collected to compare the changes in retention and peak shape to their original samples (FIG. 11). It was first observed that there was no significant decomposition for the tested copolymers according to the retention time, which was in good agreement with high decomposition temperature reported by TGA. However, the annealed samples exhibited larger peak shape, especially with broadening at later retention time when they were compared to the refractive index (RI) of pristine samples. This was due to partial degradation of each domain in the copolymer. P3HB and PCL were used as controls and subjected them to the same annealing conditions. Both polymers displayed decreased molecular weight with strated good thermal stability when it was compared to P3HB and PCL yet there was still some minor degradation at lower molecular domain.

Photo Degradation of Copolymer

In marine environments, two of the major degradation mechanisms for polymers are photodegradation and hydrolysis. To assess the degradation of poly[3HP$_x$-co-6HHA$_y$] samples in marine environment conditions, total dissolved organic carbon (DOC) content was analyzed after photoweathering in synthetically prepared seawater for 14 days. The results showed that light had a minimal impact on initial degradation of the polymer, and significant differences were not observed between irradiated and dark control samples regardless of the copolymer composition (FIG. 3). However, there was a clear difference between the degradation of homopolymers and copolymers after the irradiation.

Figure 3A:
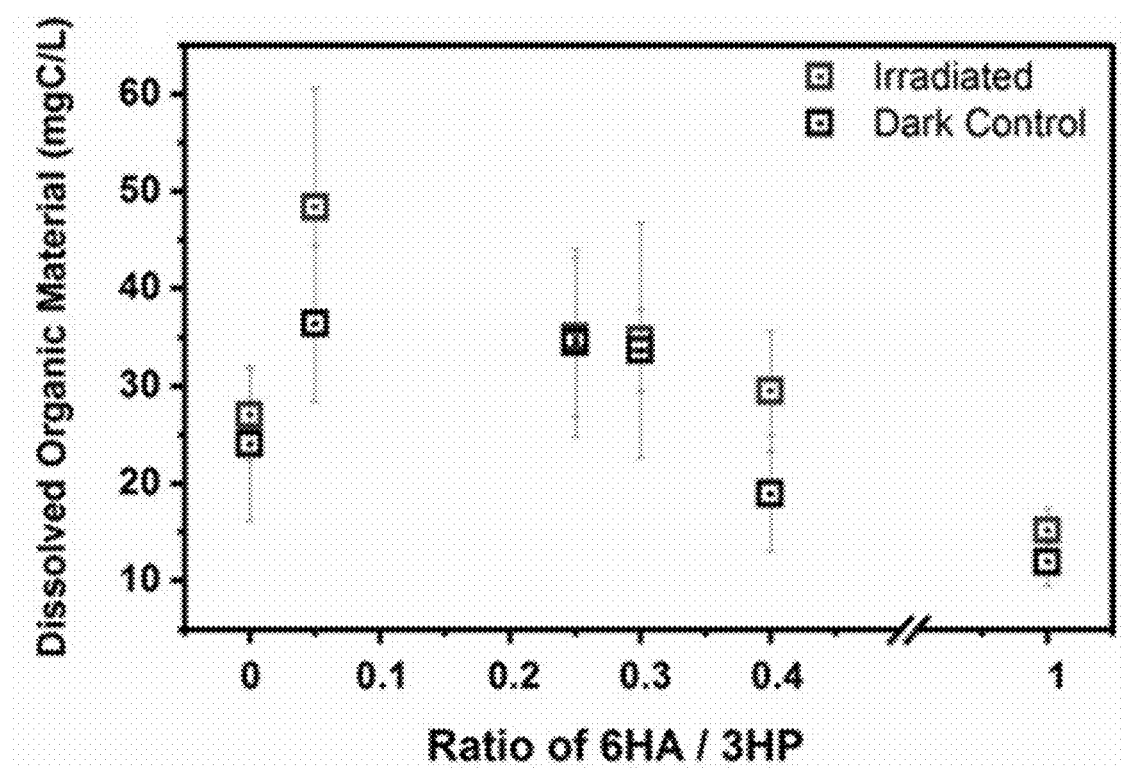
FIGS. 3A-3C show the total dissolved organic carbon and percent loss of polymer carbon after 14 days photoirradiation in the solar simulator. Only the total carbon contents in the polymer samples were used for calculations of percent loss. The error bars presented show the standard deviations of the measurements.
Figure 3B:
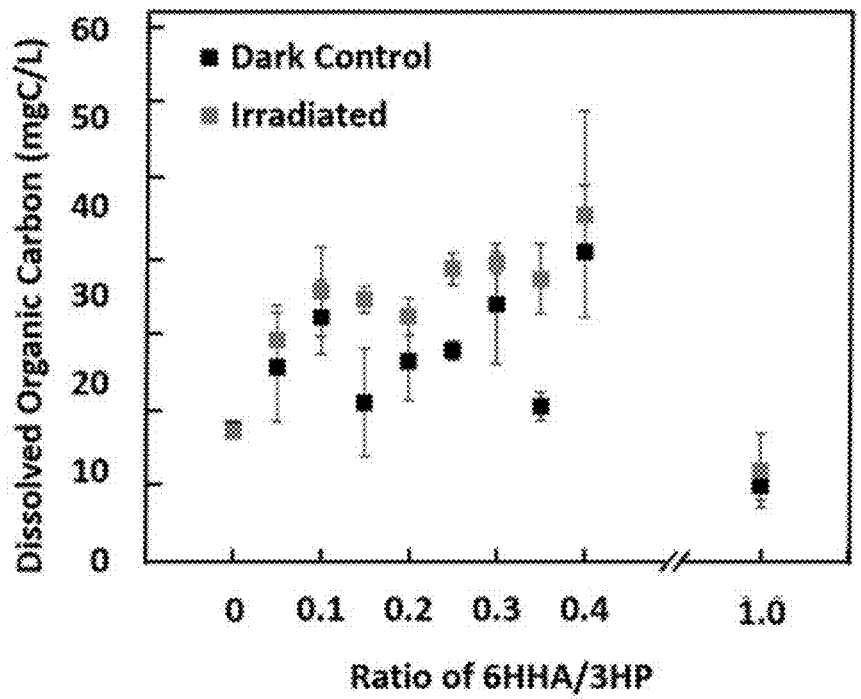
Figure 3C:
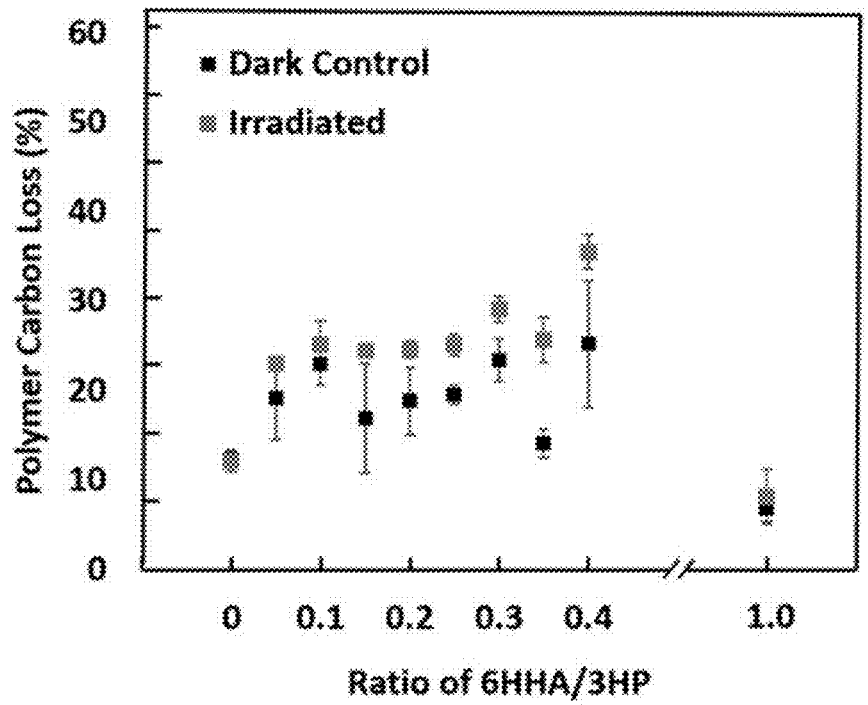
Figure 4:
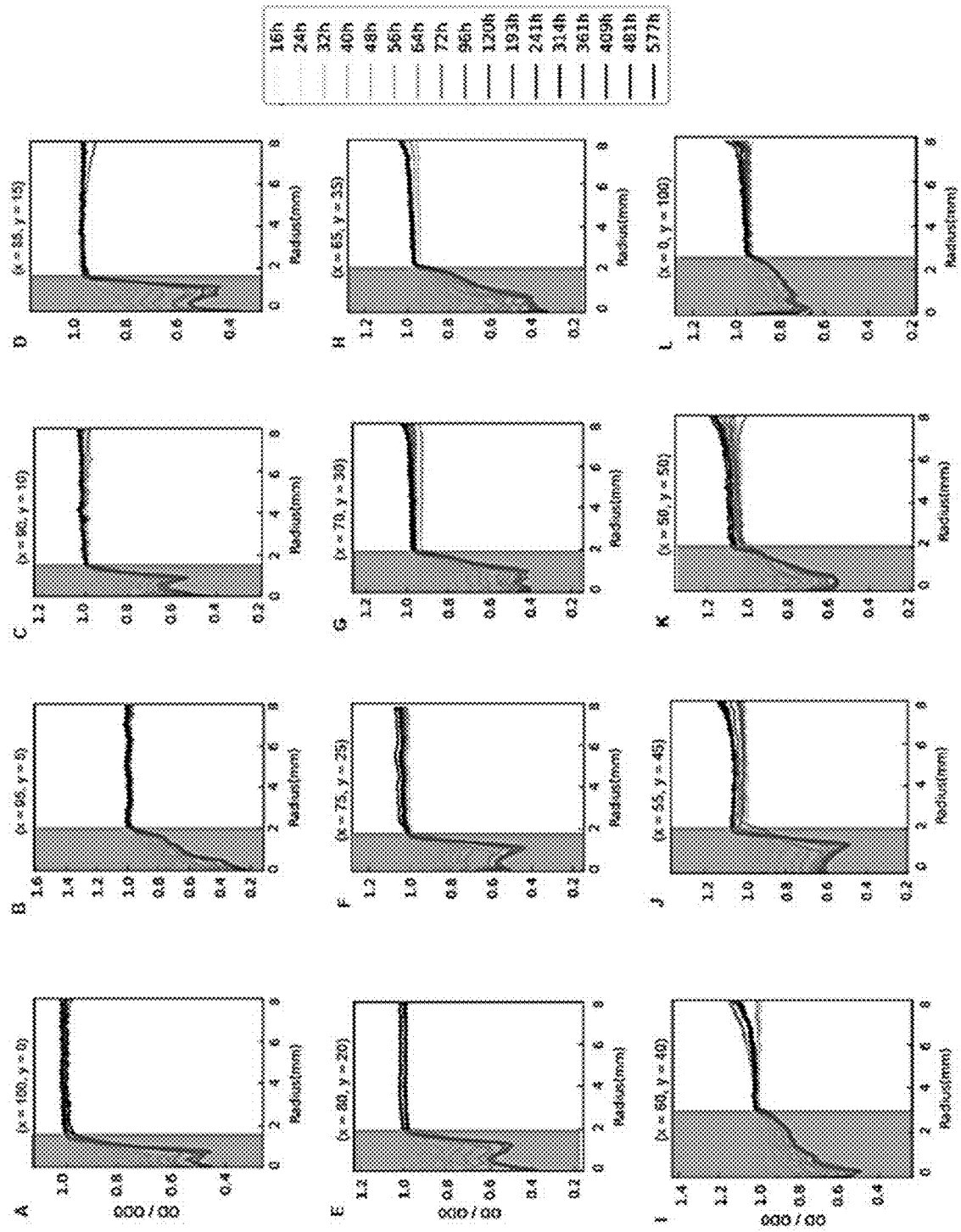
FIG. 4 shows a comparison of bacterial clear zone propagation for poly[3HP$_x$-co-6HA$_y$]. X and Y in the parenthesis refer to the percent feed ratio of 3HP and 6HA, respectively. Graphs were plotted as a function of radius (from the center of bacterial colony) and the normalized optical density (OD/OD$_0$). Shaded areas were corresponded to the bacterial colony zone. A sudden spike at 8 mm was due to meniscus effect at the edge of the well plate.

Firstly, the amount of dissolved organic carbon (DOC) that was broken down from the copolymer into the synthetic seawater was recorded (FIG. 3A). The percent polymer carbon loss were calculated thereafter by using DOC and the original amount of carbon in the polymer samples. It showed that homopolymers, poly[3HP] and poly[6HHA], exhibited slower degradation and minimal impact of light when they were compared to copolymers, poly[3HP$_x$-co-6HHA$_y$](FIG. 3B). Regardless of presence of light, poly[3HP] and poly

[6HHA] showed 12.12% (±1.17) and 8.11% (±3.09) degradation, respectively. On the other hand, photoweathered poly[3HP$_{80}$-co-6HHA$_{20}$] and poly[3HP$_{60}$-co-6HHA$_{40}$] showed 35.58% (±2.00) and 24.61% (±0.88) degradation, respectively. In absence of light, poly[3HP$_{80}$-co-6HHA$_{20}$] and poly[3HP$_{60}$-co-6HHA$_{40}$] showed 25.23% (±7.08) and 18.87% (±3.75) degradation, respectively. Considering its little effect of irradiation on homopolymers, it was believed that the initial degradation was mainly triggered by hydrolysis after which photoweathering aided the degradation of copolymers. The large error bars on some of the measurements could be attributed to the physical heterogeneity of the initial sample materials.

Biodegradation of Copolymer

Figure 19:
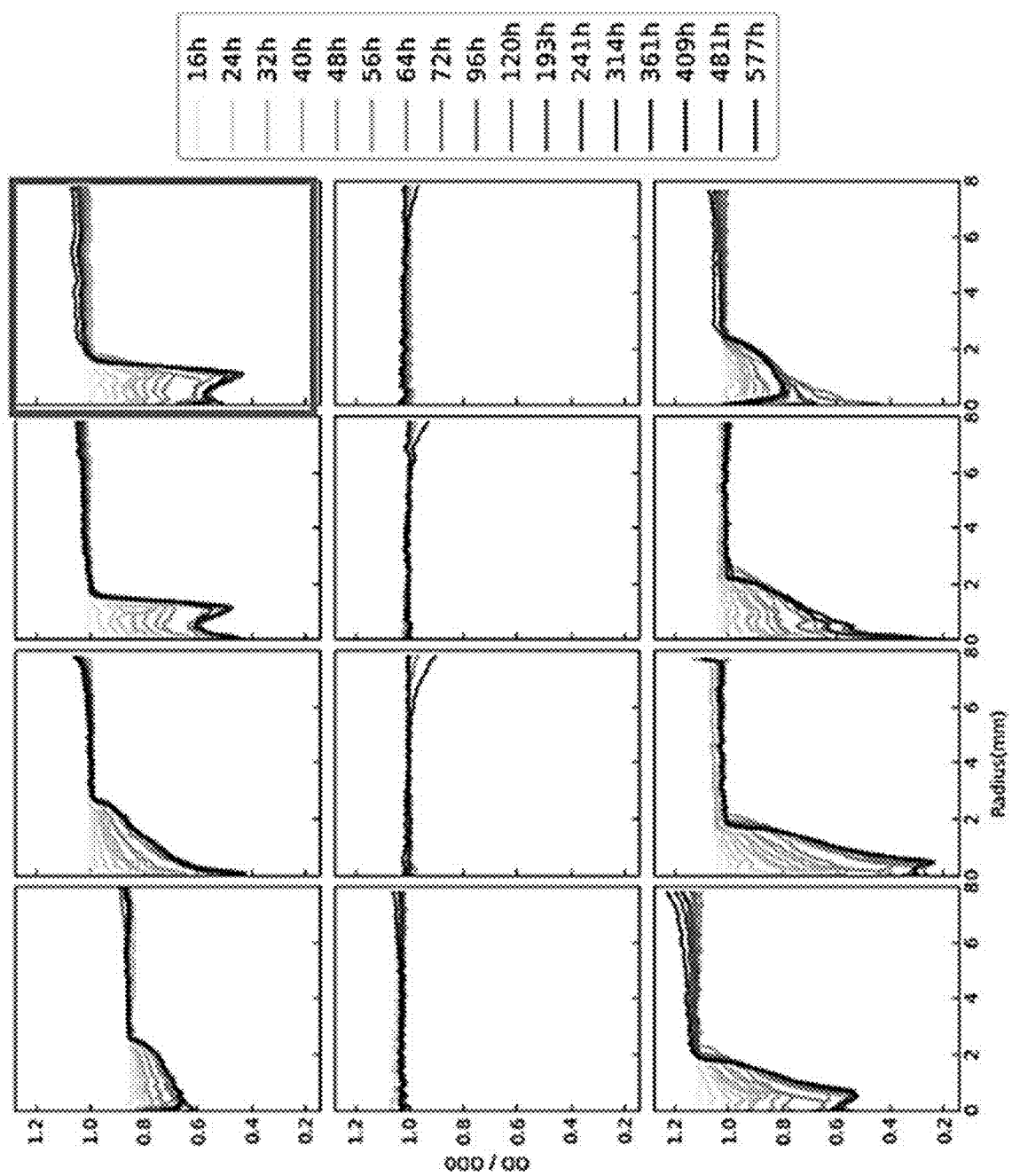
FIG. 19 shows a bacterial clear zone propagation for P[3HP$_{75}$-co-6HA$_{25}$]. A representative plot is highlighted by the dark grey box (indicated).
Figure 20:
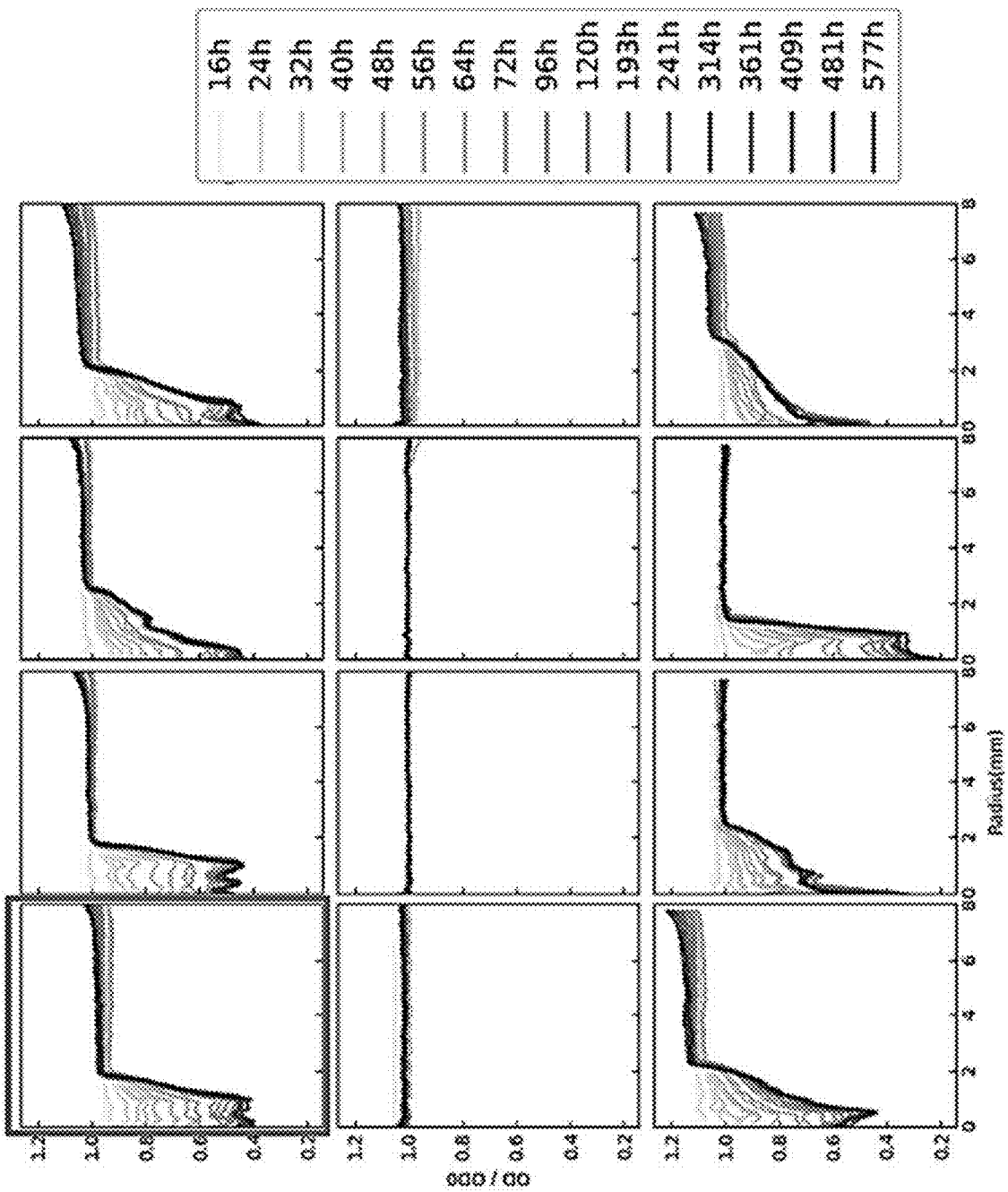
FIG. 20 shows a bacterial clear zone propagation for P[3HP$_{70}$-co-6HA$_{30}$]. A representative plot is highlighted by the dark grey box (indicated).
Figure 21:
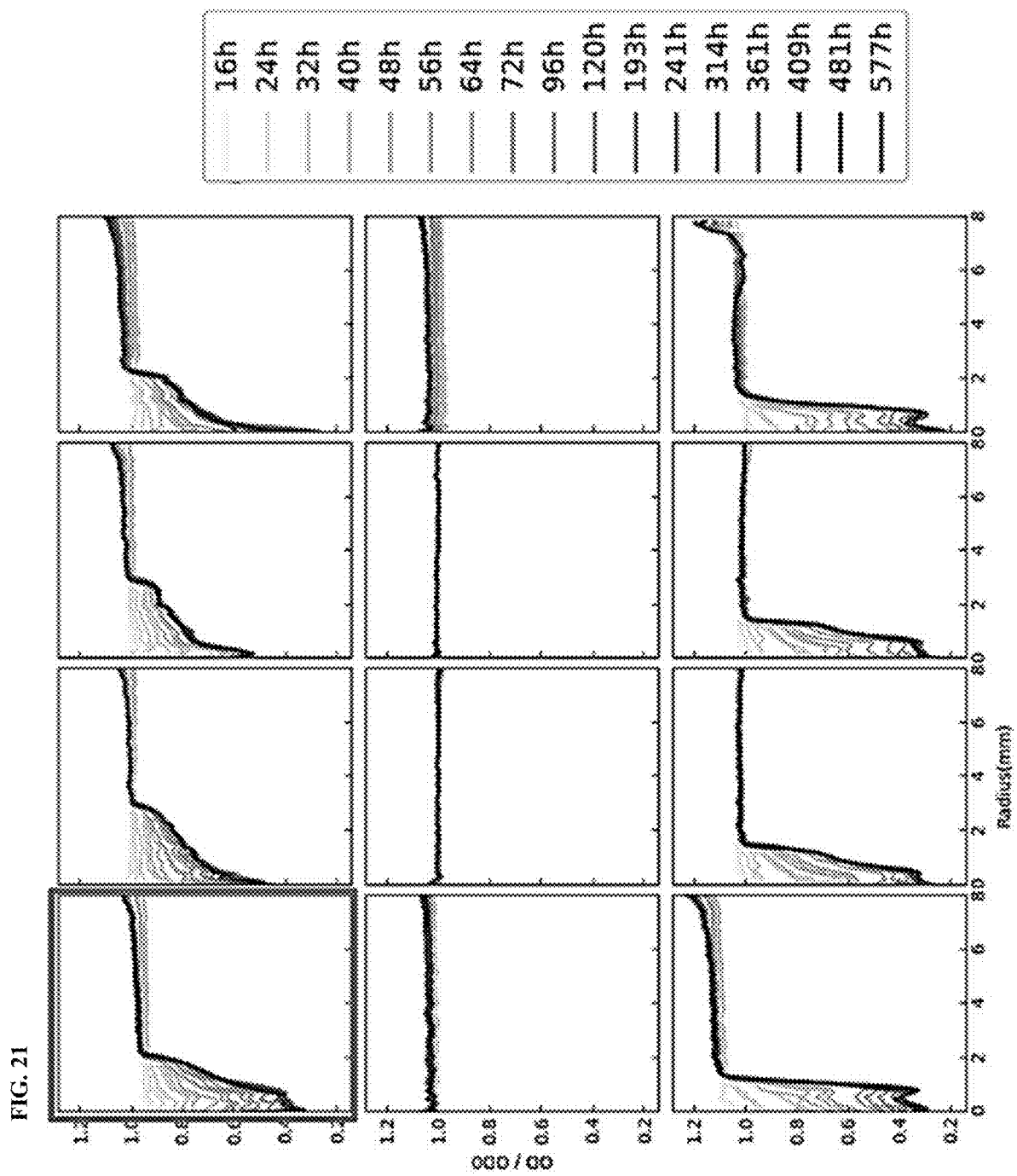
FIG. 21 shows a bacterial clear zone propagation for P[3HP$_{65}$-co-6HA$_{35}$]. A representative plot is highlighted by the dark grey box (indicated).
Figure 22:
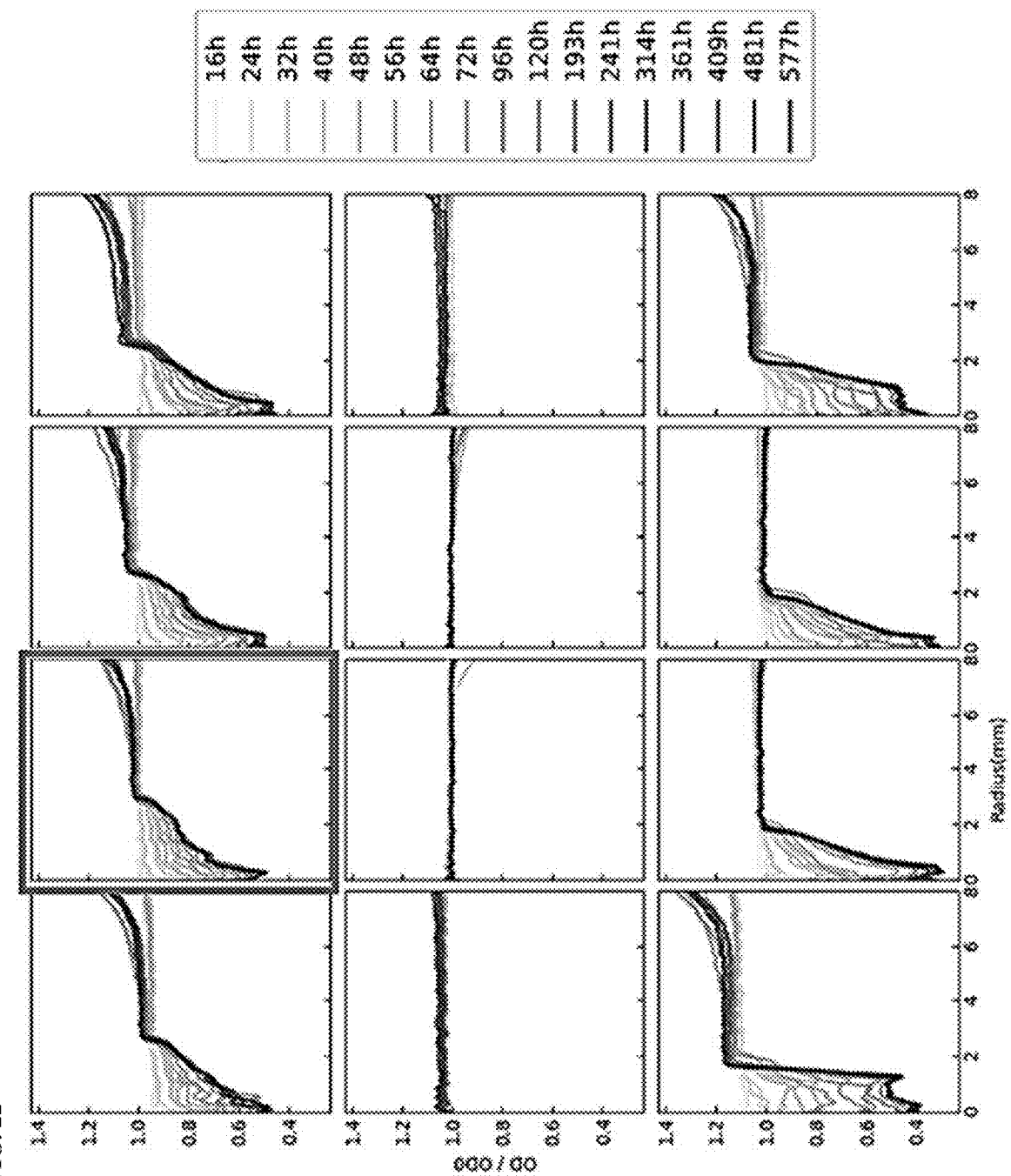
FIG. 22 shows a bacterial clear zone propagation for P[3HP$_{60}$-co-6HA$_{40}$]. A representative plot is highlighted by the dark grey box (indicated).
Figure 23:
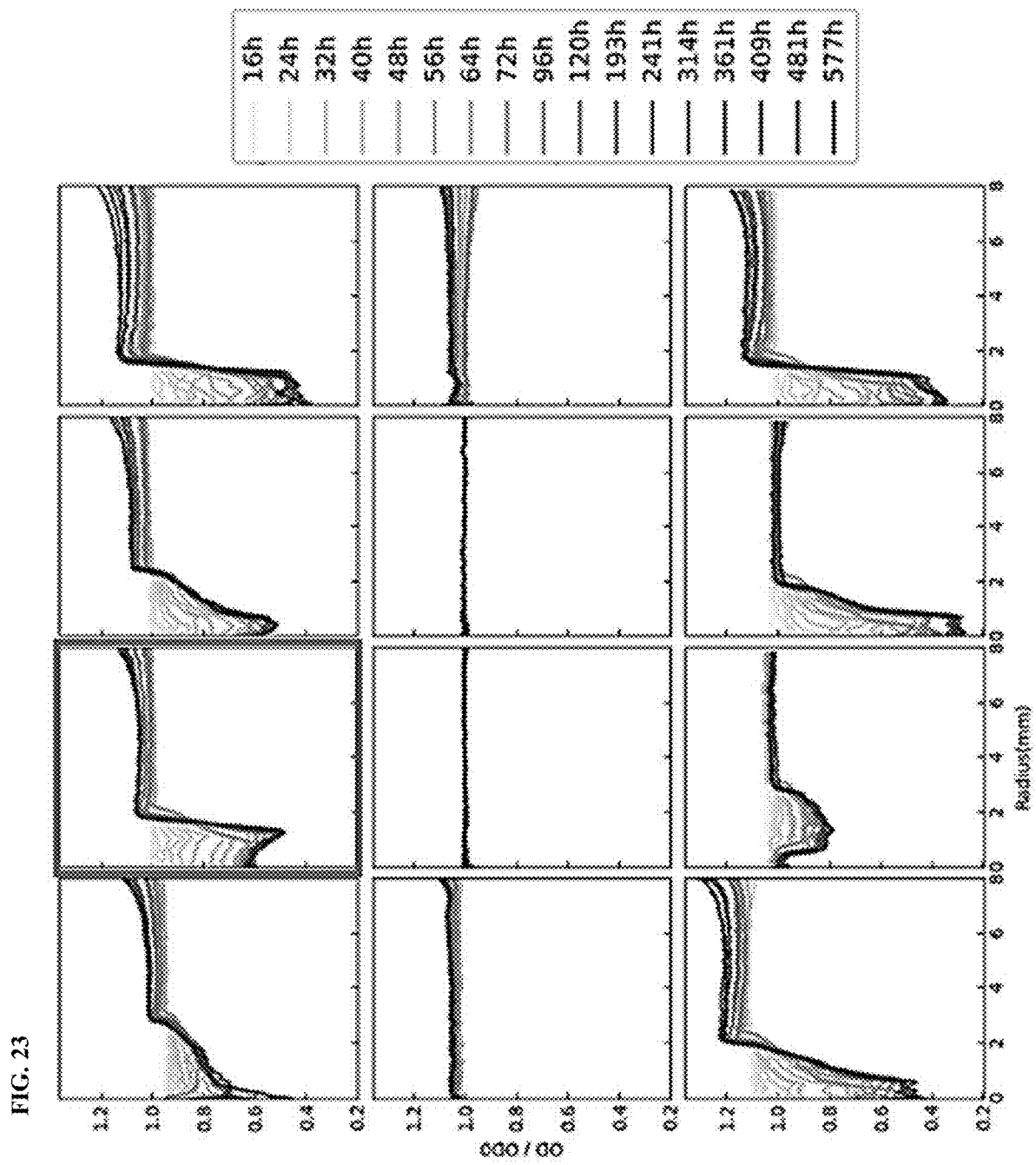
FIG. 23 shows a bacterial clear zone propagation for P[3HP$_{55}$-co-6HA$_{45}$]. A representative plot is highlighted by the dark grey box (indicated).
Figure 24:
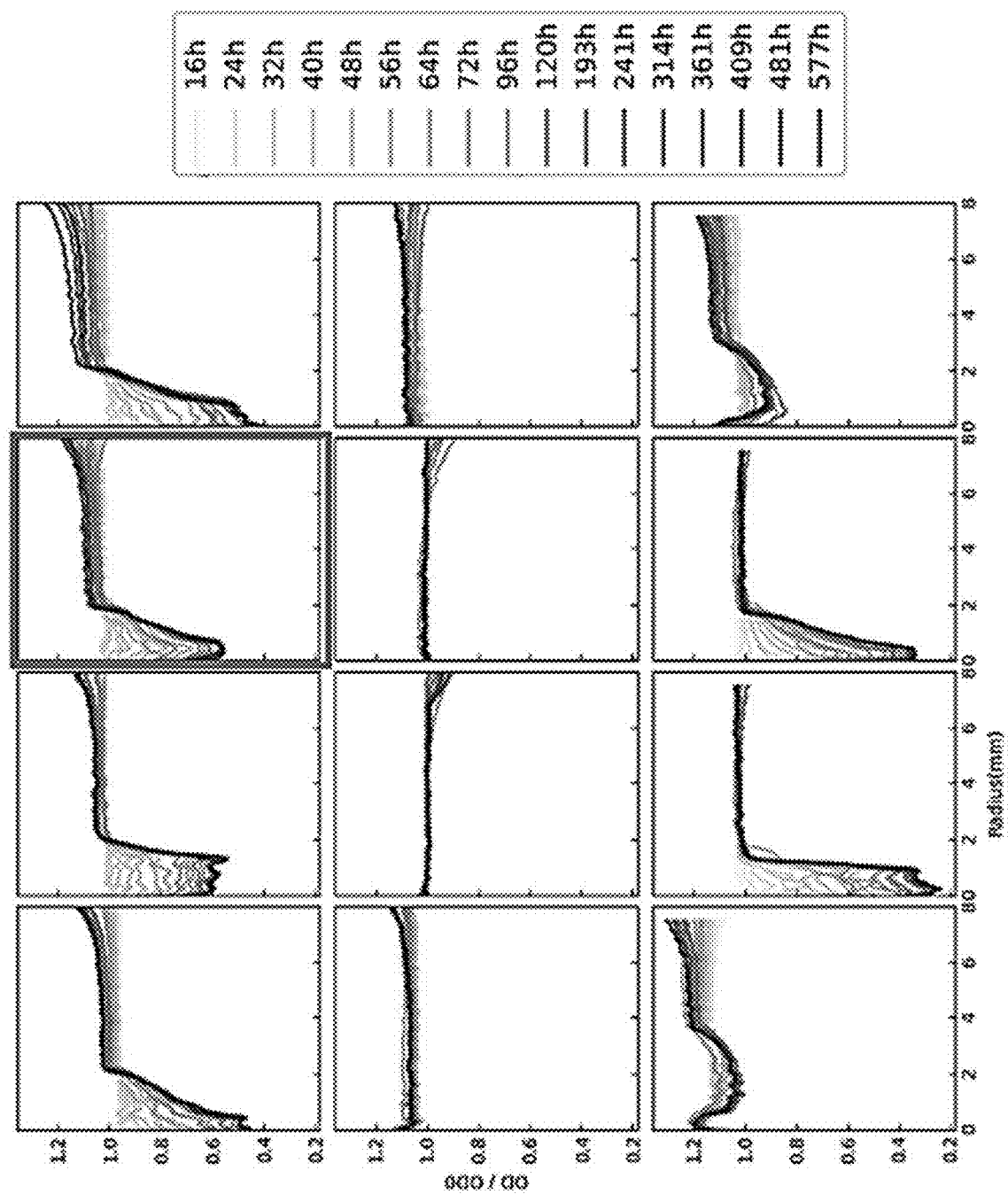
FIG. 24 shows a bacterial clear zone propagation for P[3HP$_{50}$-co-6HA$_{50}$]. A representative plot is highlighted by the dark grey box (indicated).
Figure 25:
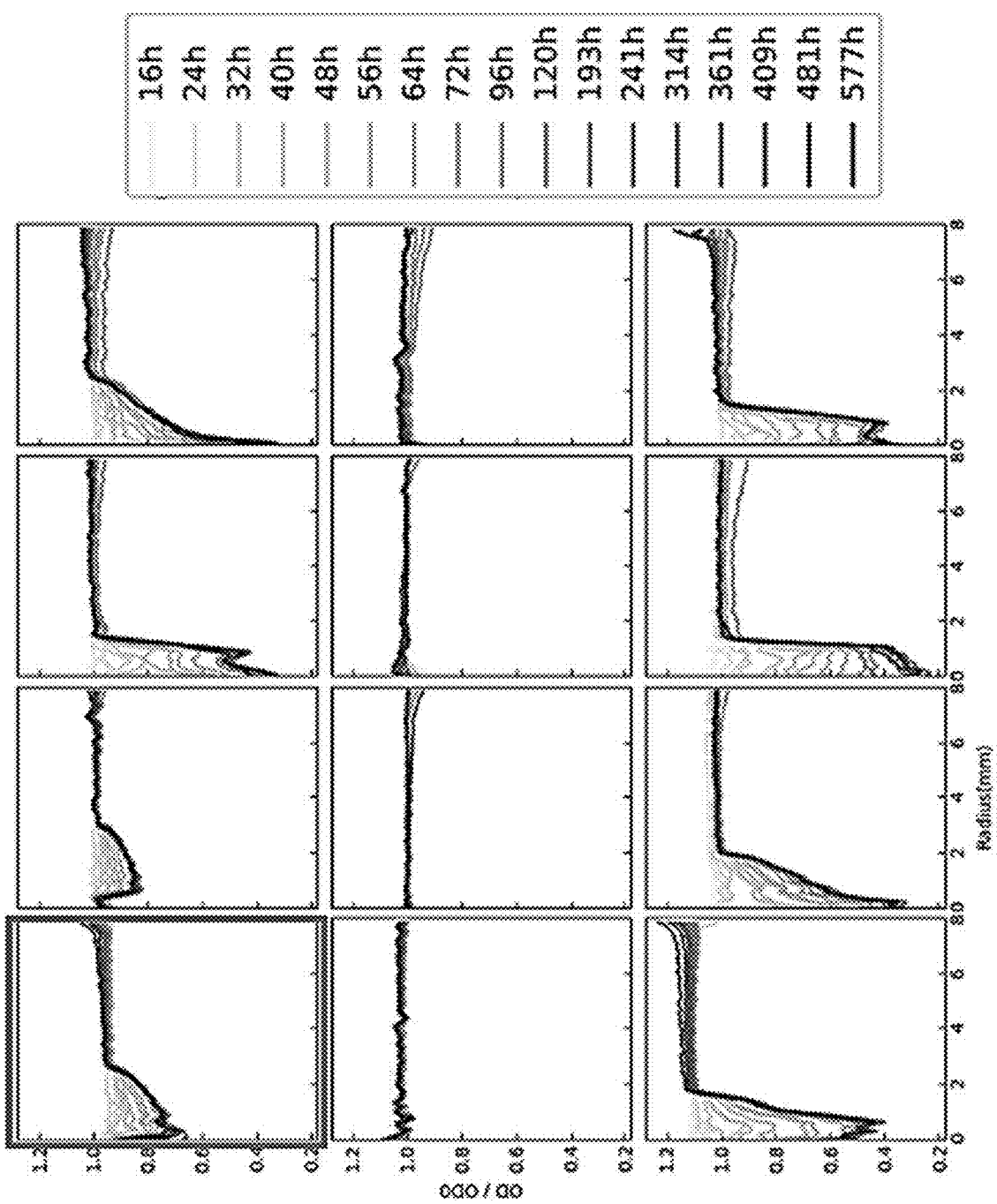
FIG. 25 shows a bacterial clear zone propagation for P[3HP$_0$-co-6HA$_{100}$]. A representative plot is highlighted by the dark grey box (indicated).
Figure 26:
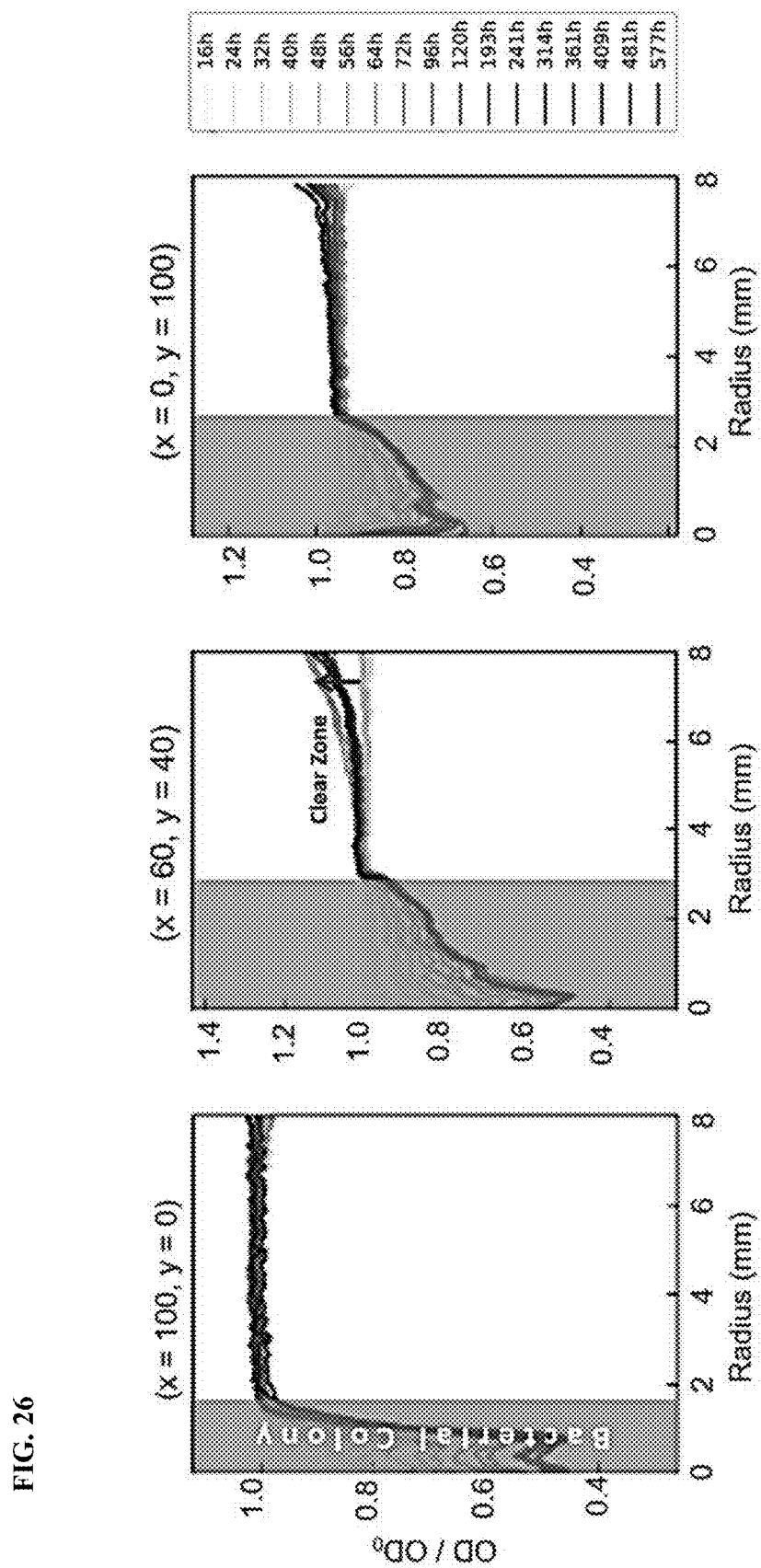
FIG. 26 shows representative graphs showing propagation of bacteria-cleared zones for poly[3HP$_x$-co-6HHA$_y$]. X and Y in the parentheses refer to the percent feed proportions of 3HP and 6HHA, respectively. The graphs were plotted as a function of radius (from the center of the bacterial colony) and the normalized optical density (OD/OD$_0$). Shaded areas corresponded to the bacterial colony zones. A sudden spike at 8 mm was due to the meniscus effect at the edge of the well plate.

The P(3HP-co-6HHA) polymers also showed biodegradation rates as a function of their monomer composition. There are many reports of PCL biodegradation; however, the observed biodegradation times ranged from a few months to several years depending on the environmental conditions. In addition, there has been no report on successful biodegradation of P[3HP], in spite of the known biodegradability other 3-hydroxyacid-based polyesters. To enable rapid evaluation of biodegradability, a bacterial clear zone assay was pursued to investigate biodegradation of poly[3HP$_x$-co-6HHA$_y$]. This method was useful because it required only small amounts of samples and could easily be performed in a multi-well plate, which could enable high-throughput screening and simultaneous analyzes of multiple samples with little capital equipment. *Paucimonas lemoignei*, a gram-negative soil bacterium that can be isolated from poly-beta-hydroxybutyrate (PHB)-enriched soil, was used as a model organism for biodegradation studies. When *Paucimonas lemoignei* was incubated with poly[3HP$_x$-co-6HHA$_y$] with low 6HHA content, no clearing of the polymer solution was observed over time, indicating no biodegradation (FIGS. 14-17 and 26). However, when the ratio of 6HHA surpassed 25%, clear zones started to appear and slowly became larger (FIGS. 19-21). It was obvious that with a higher percent of 6HHA, biodegradation of the copolymer by *Paucimonas lemoignei* occurred (FIGS. 22 & 26).

Figure 27:
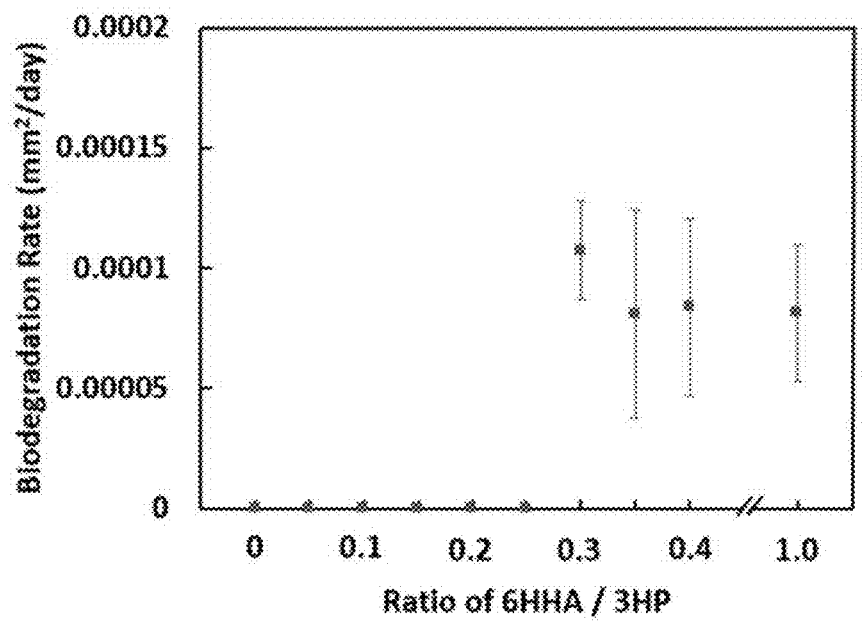
FIG. 27 shows that the degradation rate is dependent on the copolymer composition.

Biodegradation rate dependence on the copolymer composition also supported what was observed from the bacteria clear zone assay. There was no observed biodegradation rate of poly[3HP$_x$-co-6HHA$_y$] when the ratio of 6HHA was in between 0-25%. However, apparent biodegradation rate was seen when the 6HHA content exceeded 30% and the rate was remained at a steady level regardless of the content thereafter (FIG. 27). It was noteworthy that the rate was not linearly increased as the feed ratio of 6HHA increased. Instead, there was a sudden change at certain threshold to trigger the biodegradation of the copolymer. This may be understood by long-standing opinion that crystallinity slows enzymatic degradation of polymers. It could be confirmed by no biodegradation rate with regard to detectable crystallinity (Table 4, entries 2-5), while visible biodegradation rate with copolymers with negligible crystallinity (Table 4 entries 6-8). It was interesting to note that when pure PCL was incubated, it also displayed comparable biodegradation rate to the copolymers with higher percent of 6HHA.

The exact mechanism for biodegradation of these copolymers by *Paucimonas lemoignei* remains unclear, but it was suspected to involve 'pseudohomogeneous' biodegradation: in this case, diffusion of excreted enzymes that degrade the polymer is faster than the degradation rate, as evidenced by a homogeneous increase in transmission throughout the plate (see FIGS. 13-25 for the full images of clear zone analysis). While hydrolysis likely forms a part of this mechanism, the key role of enzymes is established since no degradation is observed in the bacteria-free controls.

SUMMARY

This work aimed to develop novel poly(3-hydroxyacid) polymers with improved thermal processing window through exploration of renewable monomers produced from bio sources. After screening the literature, alpha-substituted 3-hydroxyacids became the focus of the study due to the elimination of alpha protons. 3HP was chosen as a representative hydroxyacid monomer due to its easy access in laboratory settings and the prospect of biosynthesis with few engineering steps. P[3HP] was synthesized by conventional polycondensation to test the polymerizability of 3HP. Subsequently, successful preparation of poly[3HP$_x$-co-6HHA$_y$] with different feed ratios was reported. The copolymers had good thermal stability with decreasing melting temperatures as more 6HHA was added, enabling tuning of the processing window as a function of composition. Glass transition remained approximately invariant with co-monomer composition. With this copolymerization strategy, it was possible to modulate the thermal properties of these copolymers containing highly crystalline 3HP domains. Photo degradation experiments in seawater showed no effect of irradiation but strong degradation in aqueous conditions, confirming the key role of hydrolysis in degradation. In addition, a clear zone assay revealed growing consumption of polymer particles by the bacterium *Paucimonas lemoignei*. Moreover, degradation rate dependence on the copolymer composition manifested the inclusion of amorphous 6HHA domain to crystalline 3HP not only has an impact on the polymerization, but also regulates the biodegradation susceptibility. Therefore, this study indicates that alpha-substituted hydroxyacids can provide thermostable alternatives to P3HB and related polymers, with copolymerization used to manage the melting temperature to obtain a wide processing window. The polymers are hydrolysable and biodegradable for many of the useful monomer compositions.

Example 2: Degradation of Exemplary Polymers $CO_2$ is often a minor product of polymer degradation in standard tests, and one of the primary products of abiotic degradation is dissolved organic carbon (DOC). A handful of studies have investigated the bioavailability of DOC leached from polymers during abiotic degradation, particularly photo degradation and hydrolysis. Romera-Castillo et al. were the first to investigate the bioavailability of DOC leached from low density polyethylene (LDPE), high density polyethylene (HDPE), polyethylene standard (PE) and polypropylene (PP) packaging for marine microbes. Their study estimated that up to 23,600 metric tons (MT) of DOC is released from plastic debris in the ocean per year; importantly, up to 60% of this is bioavailable for microorganisms in the first 5 days. In a similar study, Zhu et al. concluded that DOC leached from expanded polystyrene (EPS), PP and LDPE was 76%, 59% and 22% bioavailable within 92 days of inoculation with marine microbes, respectively. These results imply that mobilized DOC should be included in the quantification of bioavailable, polymer-derived carbon, and that DOC formation is a critical step in polymer breakdown.

It is disclosed herein that DOC generation in response to abiotic degradation (i.e. photo degradation and hydrolysis)

gives a larger and more distributed set of degradation rates, leads to a better understanding of polymer degradation mechanism, and allows for more informed decisions during material development phase. In addition, it is shown that up to 100% of leached DOC can be bioavailable for marine microbes after only 14-days of inoculation with marine microbes. Furthermore, it is demonstrated that light has a net positive impact on mobilizing carbon from discarded polymer material. Finally, also disclosed is a new way to capture the rate of biotic and abiotic degradation allowing for a better assessment of degradation mechanism of new materials, ultimately with the goal of informing design.

Materials and Methods

Samples Preparation and Storage

Figure 28A:
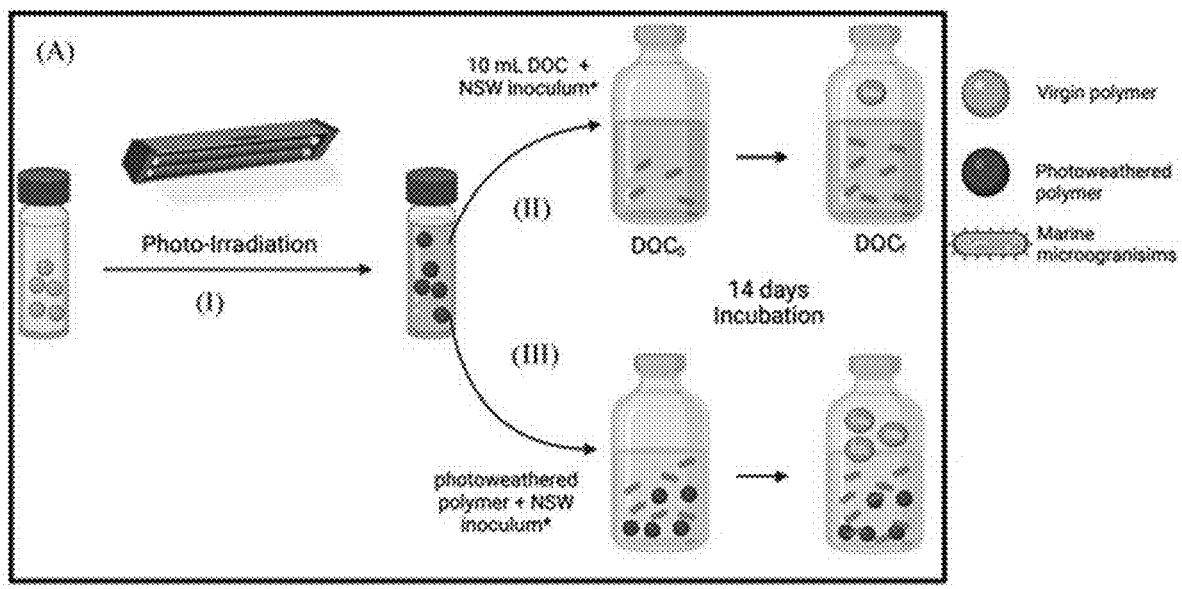
FIGS. 28A and 28B show a schematic for polymer photo degradation followed by biodegradation experiments. Polymers were irradiated for 14 days under simulated sunlight (I), then the dissolved and particulate fractions were separated and incubated with natural sea water (NSW) for 14 additional days (II and III, respectively). A traditional biodegradation test of the polymer was conducted in parallel according to ISO 23977-1 standard (B; 28 days). Dissolved organic carbon (DOC) measurements were conducted to evaluate the percent carbon mobilization into synthetic sea water (I) and percent of DOC assimilated by microorganisms after incubation (II). Carbon dioxide ($CO_2$) measurements were conducted on all biodegradation tests (A (II, III) and B). NSW inoculum* added did not exceed 20% of the total organic carbon after the addition of the test item. Virgin polymers are new, non-weathered polymers; photo weathered polymer are weathered polymer particles after 14-days of irradiation under simulated sunlight; marine microorganisms are microorganisms present in the collected NSW.
Figure 28B:
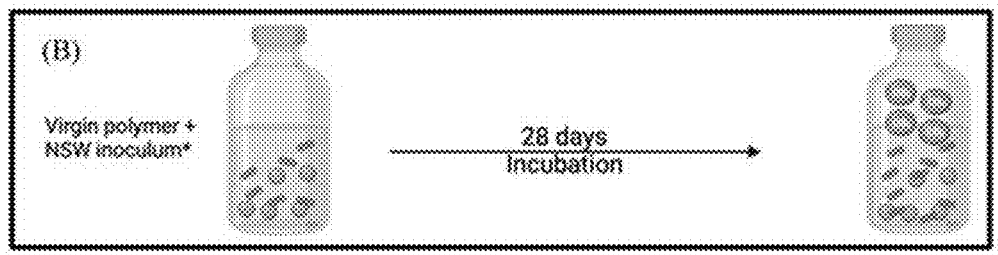

Test materials included a suite of petroleum-based polymers, commercially available biopolymers, and lab-synthesized mixtures of variable composition. Pre-combusted (450° C. in air for 8 hours) sample quartz cuvettes (Technical Glass Products, OH, USA (3 cm dia.×10 cm length)) were filled with 5 mg of test polymer, 30-mL of synthetic sea water (prepared according to ASTM D1141-98[20]), then closed with a Teflon-lined polypropylene cap, and held horizontally in the solar simulators on the orbital shakers for 14 days. For each polymer material, six total samples (three irradiated and three covered with aluminum foil as dark controls) were prepared. At day 14, the samples were collected and filtered using 0.22-um (pre-combusted glass fiber filters (GFF) to separate the dissolved from the non-dissolved polymer material. Aliquot samples were split, where 10 mL was transferred to 60-mL serum borosilicate bottles (Wheaton) for further experimentation (see Biodegradation testing section) and the remainder were stored in pre-combusted 40-mL EPA VOA vials at 4° C. for further experimentation and TOC analysis (FIG. 28). Collected filters, along with any remaining particles, were transferred into 60-mL serum bottles for further experimentation.

Photo Weathering of Polymers

The primary focus of this series of experiments was to quantify DOC leached from studied polymers due to photo degradation and hydrolysis and determine the effect of those processes on bioavailability relative to traditional biodegradation testing (FIG. 28. All photo degradation experiments were conducted in a custom-built solar simulator equipped with standard UVA-340 (Q-lab, 40 W, 48", T12, n=10) and LumiFlex 700 Pro Toshiba-SSC Visible LED strip Sunlinke CR197 6500 k (n=5, total length 5 meters). Prefabricated aluminum shelving materials were used, and all sides were covered with aluminum reflective sheets (ClearBrite, 3 um decorative anodic layer). The bottom aluminum sheet (facing the light source on top) was cut to accommodate two cooling fans (AC Infinity AXIAL 1225; Speed: 1800 RPM; Dimension: 12 cm×12 cm), one on the back left side and one on the front right side. Quartz cuvette reactor vials were exposed to incident simulated sunlight from overhead; vials were mounted on 54 bulldog metal spring grip clamps affixed to two 50 cm×50 cm aluminum reflective sheets, attached via 3M double side tape to each of two Thermo-Scientific orbital shakers (70 rpm).

Biodegradation Testing

Biodegradation experiments were conducted on photo weathered polymer, leached DOC, and unweathered polymers using natural seawater collected on 12/10/2021 and 04/01/2022 from Boston, MA (42°19'49.9"N 71°00'54.8"W) according to ISO 5667-3 standard. Briefly, a 500-mL sample was first collected and purged to reach a stabilized pH, temperature, and specific conductance (YSI 556 handheld Multiparameter Instrument). Then, seawater was collected in two pre-combusted, 3-L Duran glass media bottles and returned to the laboratory. Within an hour of collection, the collected seawater was filtered into new clean pre-combusted 3-L glass media bottles using a paper filter (Whatman, England; Cat. No. 1440 090) to remove coarse particles. The bottles of filtered seawater were left slightly ajar and placed on a shaker table (80 RPM) for 7 days to reduce background natural dissolved organic matter (DOM) and/or enable enrichment of microbial culture. On day 7, 0.1 g/L and 0.05 g/L of monopotassium phosphate ($KH_2(PO_4)$) and ammonium chloride ($NH_4Cl$) were added as inorganic nutrients, respectively. All blanks and experiments were conducted in triplicates. These were performed in 60-mL serum bottles sealed with bromobutyl rubber septa (Bellco Glass, NJ) and locked using aluminum Crimp Cap (Supetco) for 14 or 28 days as described below.

Following 14-days of photo weathering (see photo weathering of polymers section) (FIG. 28), the samples were filtered using 0.22-um GFF and transferred the filter along with any remaining particles into a clean 60-mL serum bottle and 10-mL aliquot of post-filtration DOC to another clean 60-mL serum bottle. To preserve a low available carbon to native seawater carbon ratio of less than 20% (recommended by ISO 23977-1), 0.5 mL of natural seawater was added to the DOC samples, brought to a final volume of 18 mL using artificial seawater, and 18 mL of natural seawater was added to the collected weathered polymer particles. $CO_2$ measurements were taken at 5, 7 and 14 days. At day 14, after taking the $CO_2$ measurement, serum bottles were opened and the solution was filtered using 0.22-urn GFF to measure total DOC loss during the biodegradation, where the change in DOC concentration was attributed to mineralization and biomass formation.

As a point of comparison, unweathered polymers were subjected to traditional biodegradation testing over 28 days (ISO 23977-1); these samples combined 5 mg of native polymer materials (Table 5) and 18 mL of natural seawater inoculum.

TABLE 5

List of all materials used in the degradation experiments.

| Polymer (Material) name | Label | Structure |
| --- | --- | --- |
| Hydroxypivalic acid | 3 HA | |
| Hydroxyhexanoic acid | 6 HA | |
| Poly(hydroxypivalic acid) | P(3HA$_{100}$-co-6HA$_{00}$) | |
| Poly(hydroxyhexanoic acid) | P(3HA$_{00}$-co-6HA$_{100}$) | |
| Poly[(hydroxypivalic acid)-r-(hexanoic acid)]* | P(3HA$_{xx}$-co-6HA$_{yy}$) | |
| Low density polyethylene | LDPE | |
| Poly[(R)-3-hydroxybutyric acid] | P3HB | |
| Commercial Polylactic acid | NPLA | |
| Polypropylene | PP | |
| Poly (ethylene terephthalate) | PET | |
| Polystyrene | PS | |
| Commercial Phade straws (Polyhydroxyalkanoates)** | PHA | |
| Tire rubber*** | TR | |
| Maltodextrin: Acrylic acid (water soluble) | MA | |

*Poly[(hydroxypivalic acid)-r-(hexanoic acid)] is a polymer formed by the copolymerization of hydroxypivalic acid and hydrodxyhexanoic acid, "r" is a qualifier used to denote that a polymer made of more than one monomer (i.e., copolymer).
**Commercial polyhydroxyalkanoate Phade straws were purchased and cut in small square shape pieces using new and acetone washed razor blade.
***Tire rubber was obtained from BASF chemicals.

Analytical Methods

To monitor the change in DOC, an Elementar Vario-EL analyzer modified was used to introduce liquid samples. The DOC calibration curve was constructed using a potassium hydrogen phthalate standard solution (LabCem, USA). Samples were analyzed directly after collection. The samples were first filtered through 0.22 μm GFF (Kinesis KX, Canada) and diluted 5 times with in-lab produced milli-Q water to reduce salts content. The samples were then acidified with 3 drops of 37% hydrochloric acid and analyzed. The analysis program included triplicate injections with 0.5 mL per injection. After each run, a flush sequence was conducted to eliminate cross-contamination between samples. The limit of detection and limit of quantification were determined to be 0.01 ug/L and 0.25 ug/L, respectively (computed according to Harris et al, 2020).

Mineralization to $CO_2$ was measured by extracting a 1-mL of headspace using a gas-tight syringe (Hamilton Company) and replacing the displaced volume with lab air. Headspace $CO_2$ concentration was quantified using a 50-uL standard loop injection onto an SRI 8610C gas chromatograph (GC) equipped with a flame ionization detection calibrated with authentic gas standards.

Results and Discussion

The Importance of Considering Abiotic Degradation Processes

Figure 29A:
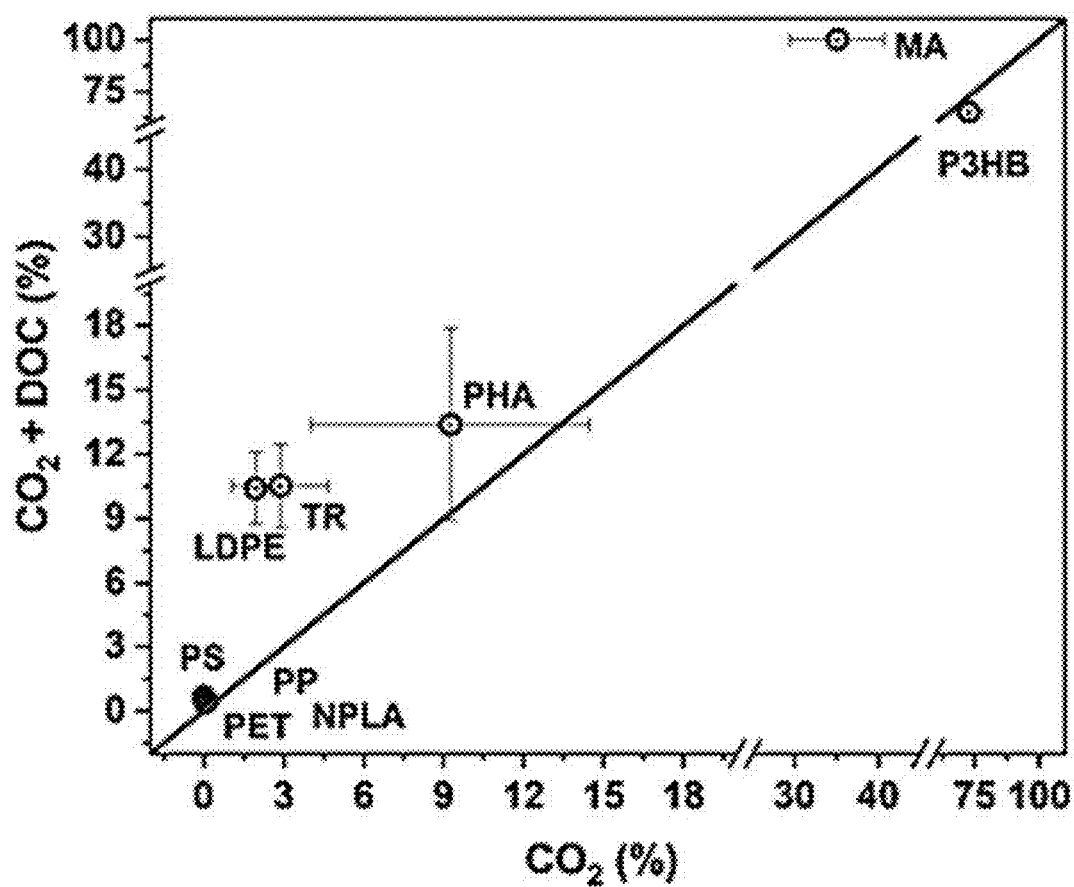
FIGS. 29A and 29B show polymer degradation measured as mineralization to $CO_2$ and dissolved organic carbon versus mineralization to $CO_2$ alone for commercially available polymers and laboratory-synthesized polymers.
Figure 29B:
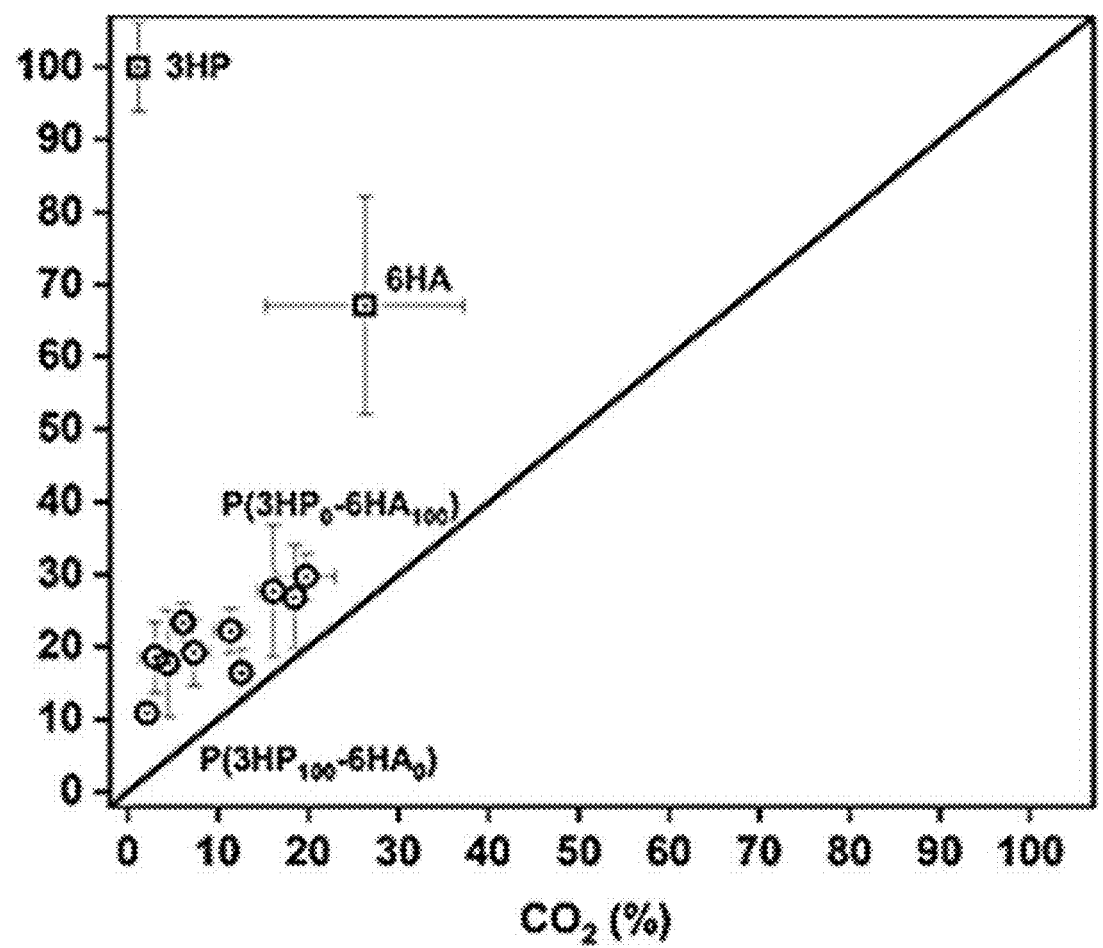

Due to the simplicity and low cost of the analysis, the majority of standard biodegradation assays rely on the measurement of $CO_2$ production or $O_2$ consumption alone as an indicator of polymer remineralization. Applying one such standard approach with a natural sea water inoculum, it was found that less than 3% (by mass) mineralization to $CO_2$ over 28 days of commodity polymers poly(ethylene) terephthalate (PET), polystyrene (PS), LDPE, PP, and tire rubber (TR) (FIG. 29). Similarly, one commercially available biopolymer, poly(lactic acid) (PLA) was recalcitrant in this marine inoculum. In contrast, the polymers polyhydroxyalkanoate (PHA, a biopolymer) straw fragment, maltodextrin: acrylic acid (MA, a water soluble polymer), and poly(R-3-hydroxybutyric acid) (P3HB, a biopolymer), showed 9.3%±5.2%, 35.1%±5.6%, and 72.7%±5.7% mineralization to $CO_2$, respectively. While these results are consistent with previous understanding of broad categories of degradation (i.e., more or less biodegradable), $CO_2$ generation represents only a single possible product of polymer-derived carbon, and excludes the possibility that carbon mobilized from the polymer as dissolved organic matter (DOC; e.g., by leaching, photoreaction, chemo-mechanical breakdown, or hydrolysis) will be bioavailable as well. It is well established that nearly up to 90% of marine dissolved organic matter is bioavailable over some timescale, and to account for this carbon mobilization pathway, the polymers were subjected to 14 days of photo weathering to quantify the possible transfer of solid carbon to DOC via photolysis, hydrolysis, or desorption (i.e., leaching). Accounting for this pathway, LDPE, TR, and PHA all showed enhanced carbon release, where LDPE and TR underwent more than 3-fold increase (from 1.9±0.2% and 2.9±1.8% to 10.4±1.7% and 10.5±1.9%, respectively) and PHA mobilization increased modestly (from 9.3±5.2 to 13.4±4.5%). Note that MA is a water-soluble polymer, so accounting for solubilization via a DOC measurement indicates this polymer is 100% mobilized to the aqueous phase (versus 35.1±5.6%) when accounting for $CO_2$ mineralization alone). In contrast, there was no measurable photochemical, hydrolytic, or desorptive enhancement of carbon transfer from the particles to the dissolved phase for PET, PS, PP, or NPLA (Note that, whenever possible, high-purity polymers were used, so additive leachate should be minimized. The limit of quantification of the DOC quantification tool was 0.25 ug/L, so release of any carbon above 0.001% of the added polymer would have been detectable). There are two noteworthy implications of these findings: first, accounting for $CO_2$ mineralization alone may give a false indication of what is truly degradable in the environment, as DOC formation is an important step on the path to remineralization of C-derived plastics (see subsequent discussion of DOC bioavailability and fate). Second, accounting for carbon mobilization to the dissolved phase may produce a wider distribution of degradation rates, which is necessary to inform design. Specifically, elucidating the fundamental mechanisms of environmental degradation that can be related to material structure will ultimately require a broad spectrum of polymers with variable structural or physicochemical properties and a measurable distinction in transformation rates.

To explore the possibility that systematic variation in chemical structure could lead to measurable, and someday predictable, modifications in degradation rate, a series of polymers of variable hydroxypivalic acid (3HP) and hexanoic acid (6HA) loading were procued. The shorthand $P(3HP_{xx}\text{-}6HA_{yy})$ indicates the relative proportions (by mass) of 3HP (given by x) and 6HA (given by y) used to produce the series of poly[(hydroxypivalic acid)-r-(hexanoic acid)] materials. Increasing the fraction of hexanoic acid led to systematically increasing rates of bioavailablity, as measured by $CO_2$ generation ranging from 2.1%±1.0% and 19.8%±3.2% mineralization for $P(3HP_{100}\text{-}6HA_{00})$ and $P(3HP_{00}\text{-}6HA_{100})$, respectively (FIG. 29). The impact of 6HA on increasing mineralization may result from the structure of bioavailable carbon; 6HA contains a linear alkane chain, whereas 3HP includes a branched structure at the alpha carbon position. Linear alkanes are known to be more bioavailable to marine organisms than branched structures, which tend to be more persistent. This is presumed to be due to steric limitations on enzymatic processing of branched structures. These structural differences could account for the higher $CO_2$ generation in polymers with greater 6HA content. Accounting for the formation of DOC produced from a similar trend as $CO_2$ generation, where total carbon released from the polymers increased with 6HA content, varying form 10.9%±1.4% and 29.8%±3.2% for $P(3HP_{100}\text{-}6HA_{00})$ and $P(3HP_{00}\text{-}6HA_{100})$, respectively. Note that both 3HP and 6HA introduce ester linkages throughout the polymer, and hydrolysis of either ester should increase the DOC pool if the resultant products are released from the polymer, as observed. No particular moiety enhanced DOC formation in a systematic way; for example, $P(3HP_{95}\text{-}6HA_{05})$, $P(3HP_{90}\text{-}6HA_{10})$, $P(3HP_{85}\text{-}6HA_{15})$ and $P(3HP_{80}\text{-}6HA_{20})$ showed approximately equivalent enhancements of 5-, 6-, 4- and 4-fold higher carbon mobilization, respectively. While hydrolysis of esters is well documented, their ability to augment dissolved carbon released from polymers is less well understood. Plastic debris in the ocean is estimated to release 57,000 metric tons of DOC annually[16], and it is unclear what fraction of this polymer-sourced carbon is bioavailable for marine production or mineralization.

Fate of Polymer Leached DOC

Figure 30:
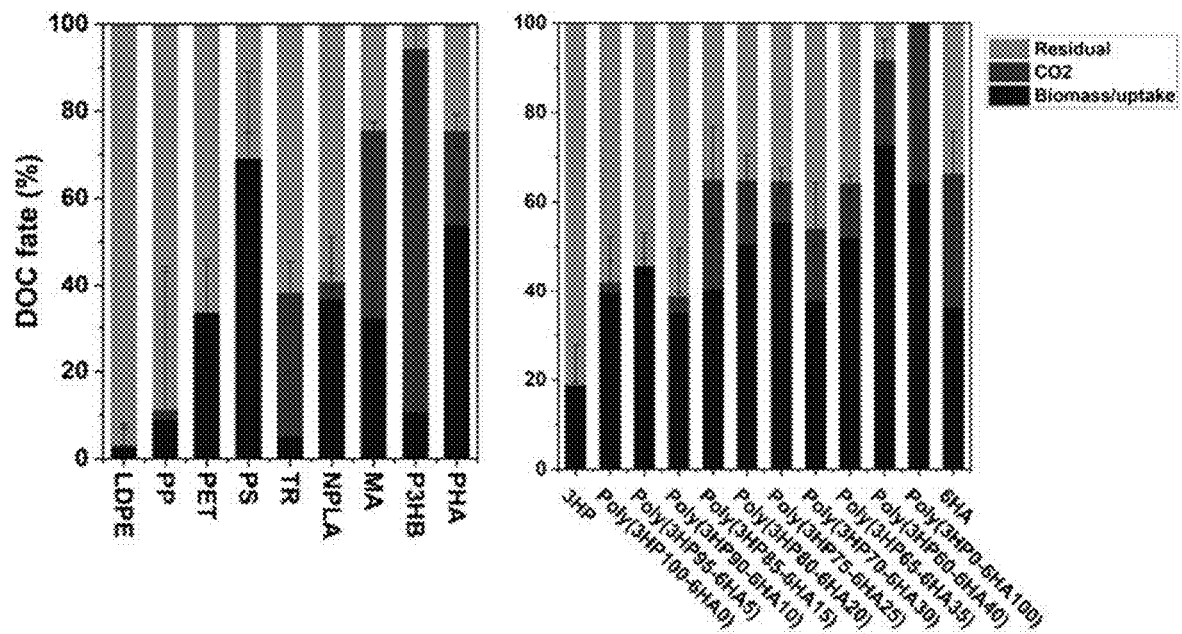
FIG. 30 shows the biological fate of DOC leached from polymers after photo-weathering for 14-days. DOC fate is measured as biomass/uptake, mineralization to $CO_2$ and residual. Biomass/uptake was calculated as the amount of DOC consumed minus mineralization. Residual is the difference between initial concentration of DOC added minus remaining. In the left panel, PET is poly(ethylene) terephthalate; PP is polypropylene; PS is polystyrene; LDPE is low density polyethylene; PHA is Polyhydroxyalkanoate straw fragment; MA is malodexterin: acrylic acid polymer; TR is tire rubber; P3HB is Poly(3-Hydroxybutyrate); NPLA is Nature Works PLA. The right panel, polymers of variable hydroxypivalic acid (3HP) and hexanoic acid (6HA) loading were prepared, and the shorthand P(3HP$_x$-6HA$_y$) indicates the relative proportions (by mass) of 3HP (given by x) and 6HA (given by y) in a series of poly[(hydroxypivalic acid)-r-(hexanoic acid)]. Error bars represent standard deviation on triplicate measures.

To develop a quantitative understanding of the bioavailability of DOC leached from polymers, a series of experiments were conducted in which the DOC before and after incubation with marine inoculum was quantified, as well as evolved $CO_2$ to develop a mass balance. The influence of biologically generated DOC was accounted for by conducting a control experiment where only natural sea water inoculum was added to the synthetic sea water. Bioavailability was defined as the uptake into the marine biomass plus $CO_2$ mineralization and report this as a percentage of the original DOC. Among nine tested commercially available polymers, bioavailability ranged from 3.1%±5.2% to 94.4%±21.2 (FIG. 30). DOC leached from LDPE showed the lowest bioavailability at 3.1%±5.2%, followed by 11.24%±8.15%, 33.6%±12.3%, 38.2%±12.8%, 40.9%±14.3%, 69.1%±19.1%, 75.5%±9.0%, 75.6%±8.2% and 94.4%±17.6% for PP, PET, TR, NPLA, PS, PHA and P3HB, respectively. Considering the total fraction of carbon taken up as biomass or mineralized to $CO_2$ illustrates that relatively large fractions of DOC are bioavailable, and residual fractions can range from less than 5.6% for P3HB-derived DOC to nearly 96.9% for LDPE-derived DOC.

Our results are not entirely consistent with previous work. First, Zhu et al found that up to 76%±8% of DOC derived from expanded PS is bioavailable in 96 days, in contrast to the 69.1%±19.1% over 14 days following a 14-day initial leach. Furthermore, Romera-Castillo et al found that DOC leached from PLA lacked elevated bioavailability relative to petrol-based polymers (i.e., LDPE, PS and EPS), dramatically contrasting these results that all bio-based polymers were more bioavailable in these experiments. The broad heterogeneity among biodegradation studies could result from many influences: variability in polymer formulations (e.g., unknown additives), geometry of test materials, and known variability in marine microbial consortia in space, time, and competing carbon substrates. Thus, it is important that all biodegradation studies benchmark material environmental performance with well-known standards (e.g., both a recalcitrant and labile polymer) prior to declaring materials as stable or bioavailable. Further, inter-comparison studies that inform design principles or machine learning models relating structure to absolute transformation rate should be cautious to draw from datasets influenced by highly variable biological or chemical factors.

As for the newly developed polymers, the results show an increasing leached DOC bioavailability with increasing 6HA loading in the polymers structure. The least bioavailable polymer derived DOC was 38.9%±14.3% and the most bioavailable was 100%±9.9% in 14-days. In addition, these results show that polymerizing the monomers increased DOC bioavailability (FIG. 30). This is evident in the cases of both 3HP and 6HA. $P(3HP_{100}\text{-}6HA_{00})$ and 3HP showed 42.1%±13.4% and 18.9%±8.9%, respectively. Similarly, $P(3HP_{00}\text{-}6HA_{100})$ and 6HA showed 100.0%±16.3% and 66.3%±20.7%, respectively. This is important as it highlights that even though monomer bioavailability is a strong indication of the polymer bioavailability, polymers environmental performance could be different and should be analyzed. Furthermore, this work showed that excessive addition of bioavailable copolymer doesn't necessarily significantly enhance the bioavailability of DOC leached from polymers. For instance, the bioavailability of DOC leached from $P(3HP_{85}\text{-}6HA_{15})$ and $P(3HP_{65}\text{-}6HA_{35})$ are 65.1%±19.55% and 64.2%±10.4%, respectively. Finally, there is a non-linear relationship between the addition of bioavailable monomer and leached DOC bioavailability. For instance, increasing 6HA loading from $P(3HP_{85}\text{-}6HA_{15})$ to $P(3HP_{65}\text{-}6HA_{35})$ and from $P(3HP_{60}\text{-}6HA_{40})$ to $P(3HP_{00}\text{-}6HA_{100})$ didn't result in an increase of leached DOC bioavailability. However, the addition of an extra 5% of 6HA from $P(3HP_{65}\text{-}6HA_{35})$ to $P(3HP_{60}\text{-}6HA_{40})$ enhanced DOC bioavailability from 64.2%±10.4% to 91.7%±8.2%, respectively.

Marine microbes adapt and employ different metabolic mechanisms according to the resources available in their surrounding environment. Specifically, depending on the carbon source available, marine microbes can favor biomass formation or energy production ($CO_2$). To explain, in the case of P3HB, 83.8%±11.9% of DOC was converted to $CO_2$ while 10.6%±21.2% was uptook by microorganisms. As for MA and PHA, 43.47%±1.8% and 21.5%±3.7% of DOC leached was converted to $CO_2$ while 32.12%±8.4% and 54.0%±9.7% was uptook by marine microorganisms, respectively. These observations are even more evident in the case of the new $P(3HP_{xx}\text{-}6HA_{yy})$ polymers, where increasing 6HA copolymer loading resulted in higher fraction of DOC to be converted to $CO_2$. These findings question the basic assumption in plastics aerobic biodegradation testing, which assumes that only a minor fraction is converted to biomass and that the majority of carbon is converted into $CO_2$. Therefore, there is a great need for more work to address this knowledge gap and incorporate the learning principles into new materials design.

Impact of Sunlight on Polymers Bioavailability

To investigate the impact of photo-weathering on the overall percent of carbon mobilized from the test materials and its impact on the growth of the surrounding marine microbes, a series of experiments were conducted in parallel as dark controls (i.e., polymer samples were not photo-weathered prior to biotic degradation testing). The obtained results show that there is no evidence of negative impact of sunlight on polymers bioavailability (FIG. 31). Specifically, it was possible to measure an overall enhanced polymer bioavailability in MA, PHA, TR, P3HB and $P(3HP_{60}\text{-}6HA_{40})$ of 13.2%±11.5%, 5.5%±1.3%, 3.4%±2.8%, 6.6%±2.6% and 14.9%±5.1%, respectively. As for the other polymers, no measurable positive or negative overall polymer bioavailability difference between photo-weathered polymers and dark controls (i.e., within error range) was found.

Figure 31A:
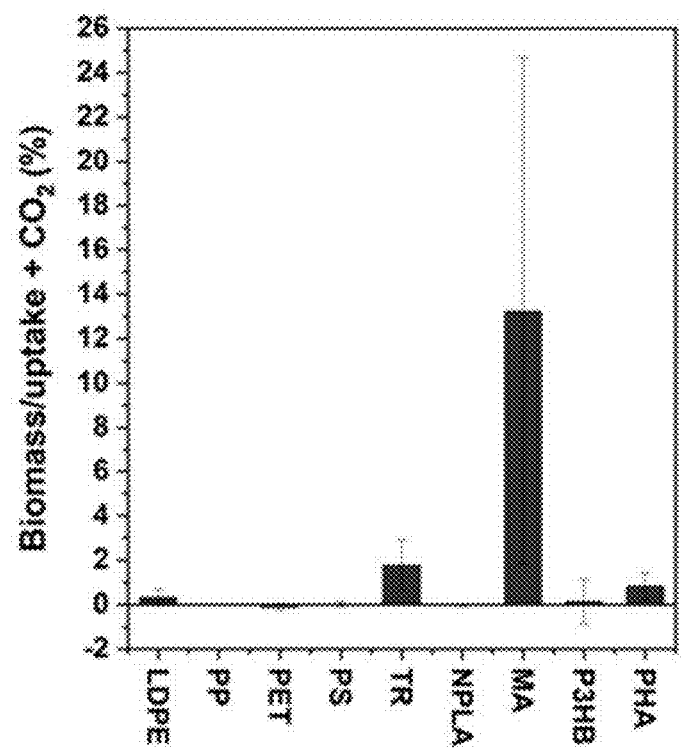
FIGS. 31A-31D show the impact of photo weathering on the polymers bioavailability. The presented figures show the calculated bioavailability difference between photo-weathered polymers minus dark controls (light—dark).
Figure 31B:
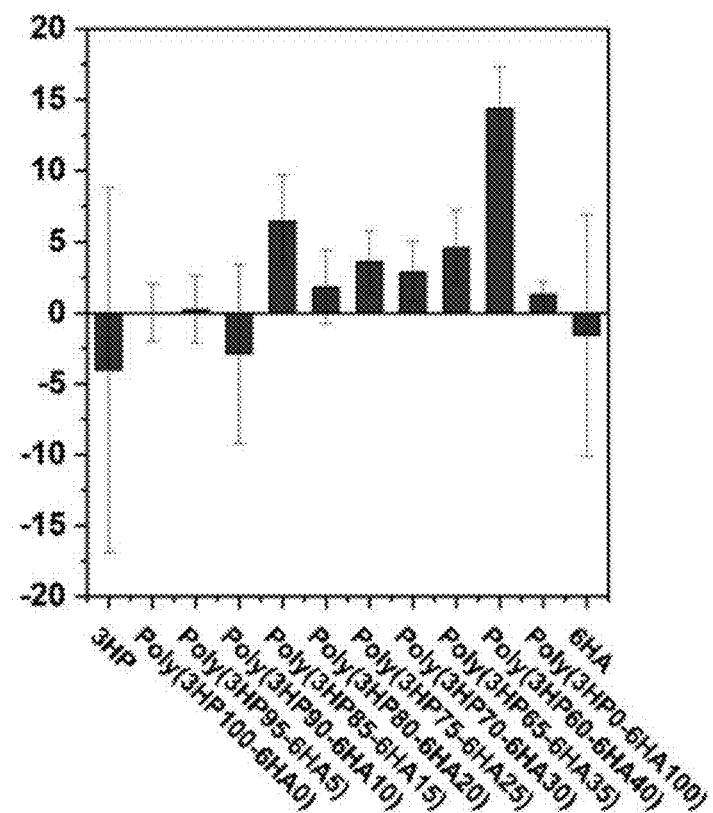

To further assess bioavailability of DOC leached from photo-weathered polymers, the difference in DOC consumed by marine microorganisms between photo-weathered polymers and dark controls were computed. The collected data showed that (1) photo-transformations in DOC did not result in a reduced bioavailability compared to dark controls and (2) sunlight contributed to a net enhanced carbon mobilization from polymers as DOC, which is more bioavailable (FIGS. 31A & 31B). To elaborate, an overall enhanced polymer bioavailability due to DOC generation in four commercial polymers (MA, PHA, TR and P3HB at 13.2%±11.5%, 5.5%±1.3%, 3.4%±2.8%, 6.6%±2.6%, respectively) and six of the new polymers ($P(3HP_{85}\text{-}6HA_{15})$, $P(3HP_{75}\text{-}6HA_{25})$, $P(3HP_{70}\text{-}6HA_{30})$, $P(3HP_{65}\text{-}6HA_{35})$, $P(3HP_{60}\text{-}6HA_{40})$ and $P(3HP_{00}\text{-}6HA_{100})$ at 6.5%±3.2%, 3.6%±2.2%, 2.9%±2.2%, 4.6%±2.6%, 14.4%±2.9% and 1.3%±0.9%, respectively) was quantified.

The presented results are the most comprehensive study conducted to date in the literature. The fate of DOC and impact of photo-transformations in DOC remains an ongoing area of work. For instance, in 2018, Romera-Castillo et al. first reported that the rate of microbial consumption of photo-weathered DOC is slower compared to non-photoweathered DOC. This finding was further echoed by Zhu et al. where they hypothesized that photo-weathered DOC leached from PE could have inhibitory effect on marine microbial community growth. Later more work was directed to understand the impact of DOC leached from polymers on marine microorganisms' growth. The findings in these studies show inconsistent conclusions where plastic leachate was found to impair growth and oxygen production in Prochlorococcus photosynthesis bacteria, and enhance photosynthesis in four marine microalgal species. Furthermore, in 2022, Romera-Castillo et al. reported that they quantified higher leached DOC bioavailability in irradiated samples, contradicting their conclusions in reported 2018. The results for all 19 polymers tested indicate no measurable negative impact of photo-weathered DOC on microbial activity. Furthermore, ten out of the 19 tested polymers showed that irradiation for only 14-days caused the mobilization of up to 14.4%±2.9 more carbon, which eventually was more bioavailable for marine microbes.

Figure 31C:
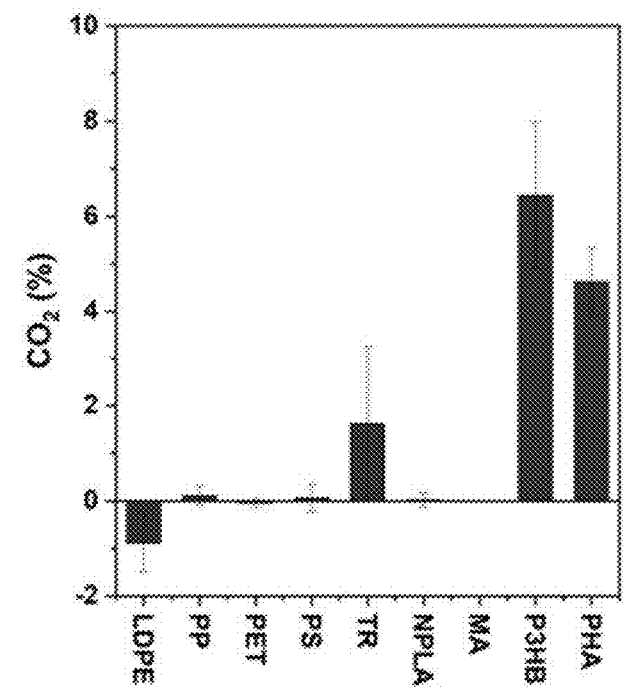
Figure 31D:
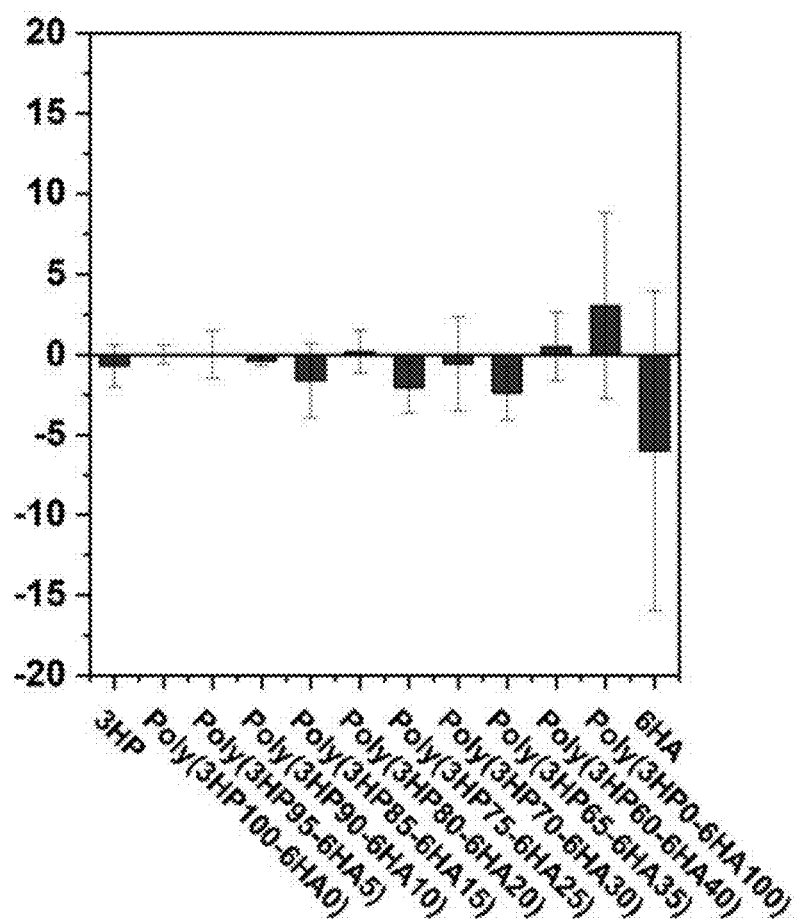

As for the recovered photo-weathered polymer particles, a similar trend was observed where there was no negative impact of photo-weathering on particles bioavailability except for LDPE (−0.9%±0.6%). The data showed enhanced polymer lability in TR, P3HB and PHA at 1.6%±1.5%, 6.4%±1.5% and 4.6%±0.7%, respectively (FIGS. 31C & 31D). No measurable positive or negative impact were observed for the other tested polymers (i.e., within error range). The obtained results support previous evidence that photo-degradation accelerates the rate of microplastics, nanoplastics and DOC formation, which are more bioavailable compared to macroplastics. To conclude, the presented results show that sunlight is an important degradation process of polymers in the environment and that photo-weathering enhances polymers overall bioavailability.

Comprehensive Polymer Degradation Assessment

Figure 32A:
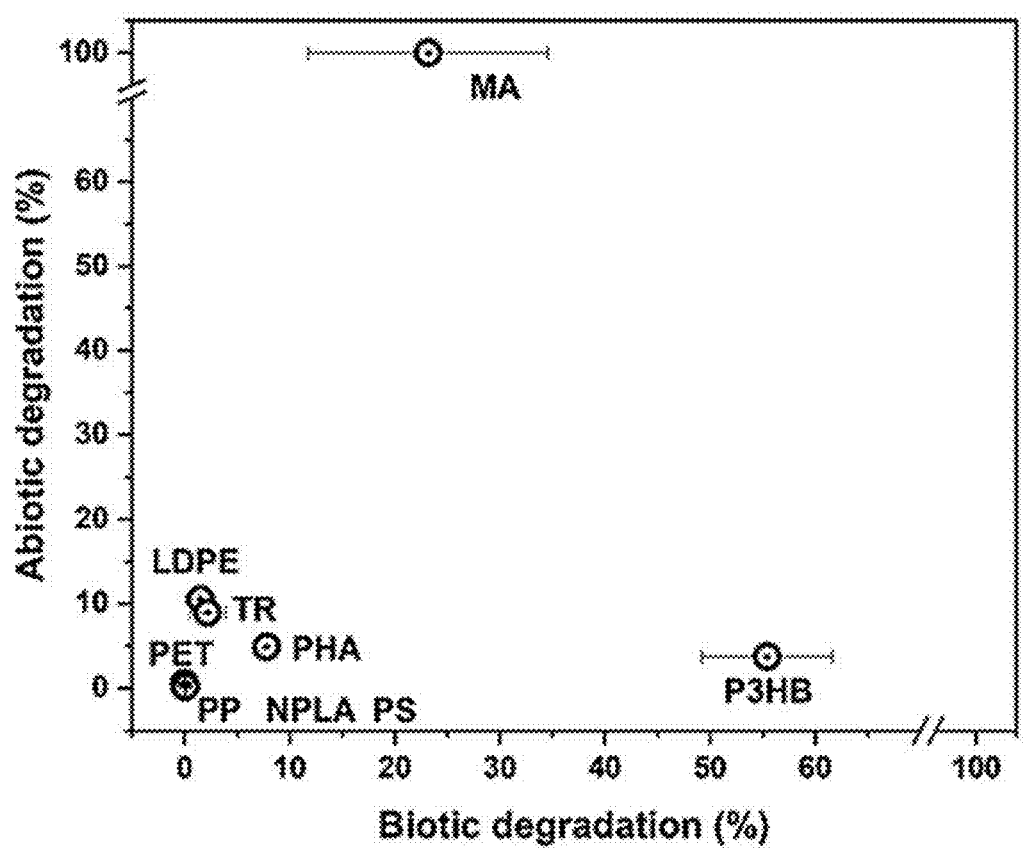
FIGS. 32A and 32B show a summary of biotic and abiotic polymer degradation data. Abiotic degradation is defined as the percent of carbon mobilized from virgin polymers as DOC after 14-days photo weathering under simulated sunlight. Biotic degradation is defined as the percent of carbon consumed as $CO_2$ from virgin polymers by natural marine microorganisms after 14-days of incubation.

Abiotic and biotic degradation was defined as the percent of carbon mobilized from the original polymer material as DOC and $CO_2$, respectively. A simple 2D plot showing the relationship between biotic and abiotic degradation (FIG. 32) is proposed. In this plot, it is possible to identify 4 quadrants encoding information about the biotic and abiotic degradation mechanism of each material. On the lower left quadrant of the plot are polymers with most resistance to marine degradation (i.e., NPLA and PP). On the lower right quadrant of the plot, it can be seen that the polymers that are most susceptible to biotic degradation and resistant to abiotic degradation (i.e., P3HB). On the upper left quadrant of the plot, it can been seen that the most abiotically degradable polymers such as water-soluble polymers but with limited biotic degradation. Finally, on the upper right quadrant of the plot, it can been seen that the polymers that are most susceptible to biotic and abiotic degradation.

Figure 32B:
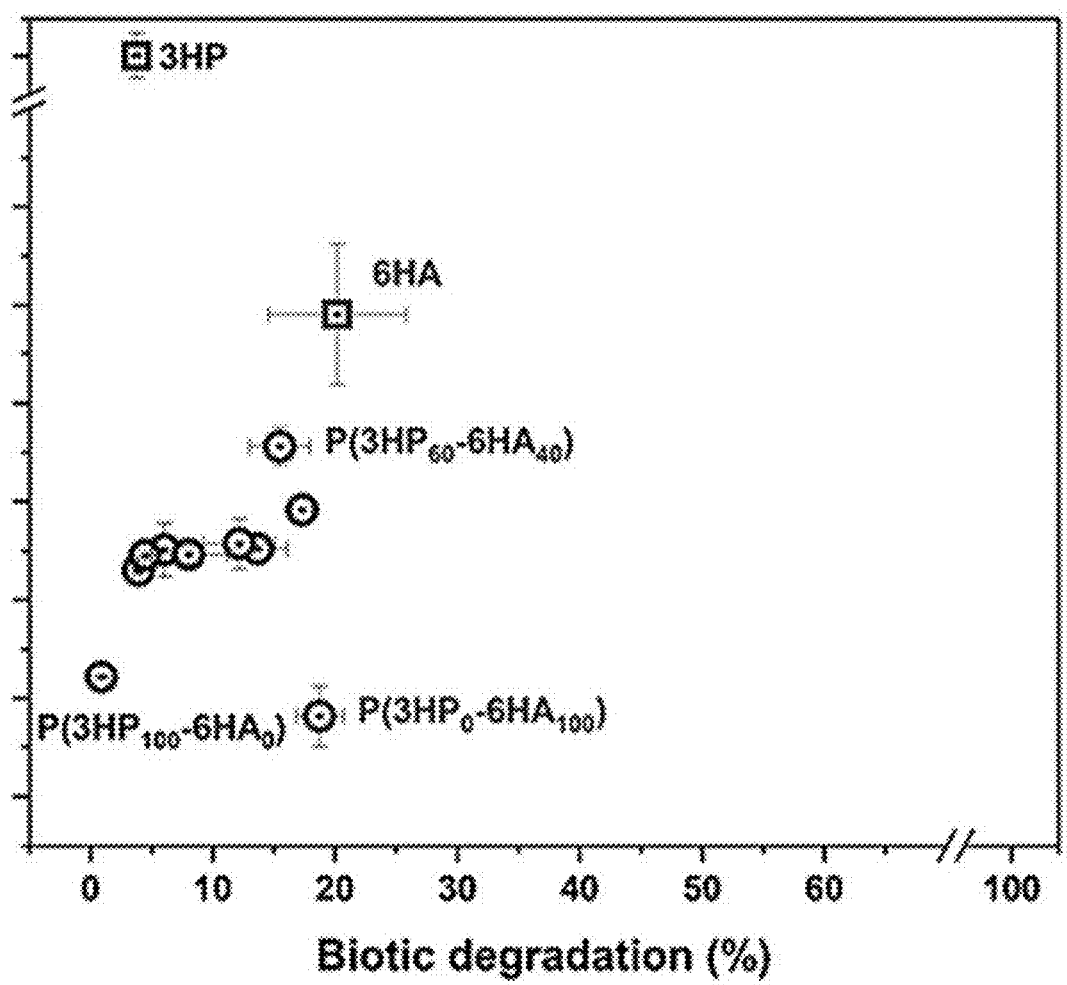

Plotting abiotic vs biotic degradation data allows for easier comprehensive and comparative analysis between related materials (FIG. 32B). It also provides a new dimension to explore and optimize new ways to enhance the overall potential degradability of new materials.

For example, when looking at abiotic and biotic degradation data of $P(3HP_{xx}-6HA_{yy})$ polymers, it can be concluded that the (1) addition of 6HA loading in the polymer structure improves its biotic degradability and (2) heteropolymers (i.e., mixed polymers made of 3HP and 6HA) show ~2.6-folds improved abiotic degradability compared to homopolymers (i.e., $P(3HP_{100}-6HA_{00})$ and $P(3HP_{00}-6HA_{100})$). For example, a positive correlation was found between increasing biotic degradability and 6HA loading in the tested polymer from 3.9%±0.4% for $P(3HP_{95}-6HA_{05})$ to 15.5%±2.5% for $P(3HP_{60}-6HA_{40})$. Furthermore, homopolymers show similar abiotic degradation of 10.1%±3.3% while heteropolymers 26.6%±4.8%, ~2.6 times higher in 14-days.

SUMMARY

Polymer materials are one of most used products in modern life. They play a fundamental role in key technologies like water treatment and renewable energy. However, the assessment of their environmental fate is often poorly understood due to the diversity of polymers physiochemical properties, complex ocean environment and multiple simultaneous degradation mechanisms. These results provide further evidence of the importance of considering abiotic degradation along with biotic during material development phase. The obtained results demonstrate that photodegradation has a net positive impact on carbon mobilization in ten out of the 19 tested polymers. Additionally, it was shown that polymer-leached DOC is bioavailable. Finally, this disclosure highlights the need for developing a series of easy, quick, and accessible polymer degradation standard tests to get an understanding of how controlling chemical composition influences material fate and inform new design principles.

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

We claim:

1. A copolymer comprising a plurality of repeat units; wherein:
the repeat units comprise a first hydroxy acid and a second hydroxy acid;
the ratio of the first hydroxy acid to second hydroxy acid is about 95:5, about 90:10, about 85:15, about 80:20, about 75:25, about 73:30, about 75:35, or about 60:40;
the first hydroxy acid and the second hydroxy acid are each independently selected from the group consisting of 2-hydroxybutanedioic acid, 2-hydroxypropanoic acid, 2-hydroxybutanoic acid, 2-hydroxy-3-methylbutanoic acid, 2-hydroxypentanoic acid, 2-hydroxy-3-methylpentanoic acid, 2-hydroxy-4-methylpentanoic acid, 2-hydroxyacetic acid, 2,3-dihydroxybutanoic acid, 2,4-dihydroxybutanoic acid, 2,3-dihydroxypropanoic acid, 2-hydroxyhexanoic acid, 2-hydroxydecanoic acid, 2-hydroxydodecanoic acid, 2-hydroxytetradecanoic acid, 2-hydroxyhexadecanoic acid, (2R)-2-hydroxypentanedioic acid, 2-hydroxyhexanedioic acid, (2E,4Z)-2-hydroxyhexa-2,4-dienedioic acid, (2R)-2- hydroxyoctadecanoic acid, 2-amino-3-hydroxy-2-(hydroxymethyl)propanoic acid, (2S)-2-ethyl-2-hydroxy-3-oxobutanoic acid, (2S)-2-hydroxy-2-methyl-3-oxobutanoic acid, (2E,4Z)-2-hydroxyhexa-2,4-dienoic acid, 3-hydroxypropanoic acid, 3-hydroxybutyric acid, 3-Hydroxypentanoic acid, 3-hydroxyhexanoic acid, 3-hydroxyheptanoic acid, 3-hydroxyoctanoic acid, 3-hydroxynonanoic acid, 3-hydroxydecanoic acid, 3-hydroxyundecanoic acid, 3-hydroxydodecanoic acid, 3-hydroxytetradecanoic acid, 3-hydroxyhexadecanoic acid, 3-hydroxy-4-pentenoic acid, 3-hydroxyhex-4-enoic acid, 3-hydroxy-5-hexenoic acid, 3-hydroxy-6-octenoic acid, 3-hydroxy-7-octenoic acid, 3-hydroxy-8-nonenoic acid, 3-hydroxy-9-decenoic acid, 3-hydroxy-5-dodecenoic acid, 3-hydroxy-6-dodecenoic acid, 3-hydroxy-5-cis-tetradecanoic acid, 3-hydroxy-7-cis-tetradecanoic acid, 3-hydroxy-5,8-cis,cis-tetradecenoic acid, 3-hydroxy-4-methylpentanoic acid, 3-hydroxy-4-methylhexanoic acid, 3-hydroxy-5-methylhexanoic acid, 3-hydroxy-6-methylheptanoic acid, 3-hydroxy-4-methyloctanoic acid, 3-hydroxy-5-methyloctanoic acid, 3-hydroxy-6-methyloctanoic acid, 3-hydroxy-7-methyloctanoic acid, 3-hydroxy-6-methylnonanoic acid, 3-hydroxy-7-methylnonanoic acid, 3-hydroxy-8-methylnonanoic acid, 3-hydroxy-7-methyldecanoic acid, 3-hydroxy-9-methyldecanoic acid, 3-hydroxy-7-methyl-6-octenoic acid, 3-hydroxy-4-methoxy-4-oxobutanoic acid, 3-hydroxy-6-methoxy-6-oxohexanoic acid, 3-Hydroxy-8-methoxy-8-oxooctanoic acid, 3-hydroxy-10-methoxy-10-oxodecanoic acid, 8-ethoxy-3-hydroxy-8-oxooctanoic acid, 10-ethoxy-3-hydroxy-10-oxodecanoic acid, 3-hydroxy-7-oxo-7-propoxyheptanoic acid, 8-acetoxy-3-hydroxyoctanoic acid, 9-acetoxy-3-hydroxynonanoic acid, 3,12-dihydroxydodecanoic acid, 3,8-dihydroxy-5-cis-tetradecenoic acid, 3-hydroxy-2-methylbutanoic acid, 3-hydroxy-2-methylvaleric acid, 3-hydroxy-2,6-dimethylhept-5-enoic acid, 3-hydroxybut-2-enoic acid, 3,4-dihydroxybutanoic acid, 3,6-dihydroxydodecanoic acid, 3-hydroxy-2,2-dimethylpropanoic acid, 3-hydroxy-7-oxooctanoic acid, 3-hydroxy-5-oxohexanoic acid, 6-acetoxy-3-hydroxyhexanoic acid, 4-acetoxy-3-hydroxybutyric acid, 3-hydroxyoctadecanoic acid, 3-hydroxy-5-methylheptanoic acid, 3-hydroxy-5-methylnonanoic acid, 3-hydroxy-methylpropionic acid, 3-hydroxy-5-methylundecanoic acid, 3-hydroxy-6-methylundecanoic acid, 3-hydroxy-7-methylundecanoic acid, 3-hydroxy-8-methylundecanoic acid, 3-hydroxy-9-methylundecanoic acid, 3-hydroxy-10-methylundecanoic acid, 3-hydroxy-5-methyltridecanoic acid, 3-hydroxy-6-methyltridecanoic acid, 3-hydroxy-7-methyltridecanoic acid, 3-hydroxy-8-methyltridecanoic acid, 3-hydroxy-9-methyltridecanoic acid, 3-hydroxy-10-methyltridecanoic acid, 3-hydroxy-11-methyltridecanoic acid, 3-hydroxy-2-oxopropanoic acid, 3-hydroxy-3-methyl-2-oxobutanoic acid, (R)-3-hydroxy-3-methyl-2-oxopentanoic acid, 5-hydroxypentanoic acid, 6-hydroxydodecanoic acid, 6-hydroxy-3-dodecenoic acid, 7-hydroxyheptanoic acid, 6-hydroxyhexanoic acid, and 5-hydroxy-2,4-dioxopentanoic acid; and the first hydroxy acid and the second hydroxy acid are distinct.

2. The copolymer of claim 1, wherein the repeat units comprise three, four, five, or six distinct hydroxy acids.

3. The copolymer of claim 1, wherein the first hydroxy acid is 3-hydroxypivalic acid.

4. The copolymer of claim 1, wherein the second hydroxy acid is 6-hydroxy hexanoic acid.

5. The copolymer of claim 1, wherein the copolymer comprises poly[3HP$_x$-co-6HA$_y$], wherein x and y are each independently 1-10,000.

6. The copolymer of claim 5, wherein the ratio of 3HP to 6HA is about 95:5, about 10:90, about 15:85, about 20:80, about 25:75, or about 30:70.

7. The copolymer of claim 5, wherein the content of 6HA in the copolymer does not exceed 15 w/w %, about 20 w/w %, about 25 w/w % or about 30 w/w %.

8. The copolymer of claim 1, wherein the molecular weight of the copolymer is about 500 to about 100,000 Daltons.

9. The copolymer of claim 1, wherein the copolymer is biodegradable as measured by incubation with *Paucimonas lemoignei*.

10. The copolymer of claim 1, wherein the decomposition temperature of the copolymer is substantially higher than the melting temperature of the copolymer.

11. The copolymer of claim 1, wherein the polymer comprises 25-500 repeat units.

12. The copolymer of claim 1, wherein the copolymer further comprises a plurality of repeat units comprising a non-hydroxy acid.

13. The copolymer of claim 1, wherein the copolymer is (P(3HP$_{85}$-6HA$_{15}$), P(3HP$_{75}$-6HA$_{25}$), P(3HP$_{70}$-6HA$_{30}$), P(3HP$_{65}$-6HA$_{35}$), or P(3HP$_{60}$-6HA$_{40}$).

14. The copolymer of claim 1, wherein the copolymer is a random or statistical copolymer.

15. The copolymer of claim 1, wherein:
the copolymer is biodegradable as measured by incubation with *Paucimonas lemoignei*; and
the decomposition temperature of the copolymer is substantially higher than the melting temperature of the copolymer.

16. A method of synthesizing the copolymer of claim 1, comprising:
contacting a first hydroxy acid with a second hydroxy acid, thereby forming a mixture of two acids; and
contacting the mixture of two acids with a polymerization initiator, thereby forming the copolymer.

17. The copolymer of claim 1, wherein the ratio of the first hydroxy acid to the second hydroxy acid is about 95:5, about 90:10, about 85:15, about 80:20, or about 85:25.

18. The copolymer of claim 5, wherein x is about 25, about 50, about 75, about 100, about 200, about 300, about 400, or about 500.

19. The copolymer of claim 5, wherein y is about 25, about 50, about 75, about 100, about 200, about 300, about 400, or about 500.

20. The copolymer of claim 1, wherein the copolymer is an elastomer.

* * * * *